(12) United States Patent
Shao et al.

(10) Patent No.: US 11,937,281 B2
(45) Date of Patent: Mar. 19, 2024

(54) COMMUNICATIONS METHOD AND APPARATUS

(71) Applicant: HUAWEI TECHNOLOGIES CO., LTD., Shenzhen (CN)

(72) Inventors: Jiafeng Shao, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 521 days.

(21) Appl. No.: 17/193,210

(22) Filed: Mar. 5, 2021

(65) Prior Publication Data

US 2021/0204293 A1    Jul. 1, 2021

Related U.S. Application Data

(63) Continuation of application No. PCT/CN2019/104368, filed on Sep. 4, 2019.

(30) Foreign Application Priority Data

Sep. 7, 2018   (CN) .......................... 201811042617.4

(51) Int. Cl.
*H04L 5/00* (2006.01)
*H04W 72/0446* (2023.01)
(Continued)

(52) U.S. Cl.
CPC ............ *H04W 72/53* (2023.01); *H04L 5/0051* (2013.01); *H04W 72/0446* (2013.01); *H04W 72/23* (2023.01); *H04W 76/11* (2018.02)

(58) Field of Classification Search
None
See application file for complete search history.

(56) References Cited

U.S. PATENT DOCUMENTS

2015/0312927 A1*  10/2015  Ko .......................... H04B 7/024
                                                          370/336
2016/0057757 A1    2/2016  Papasakellariou et al.
(Continued)

FOREIGN PATENT DOCUMENTS

CN          103944665 A      7/2014
CN          104125186 A     10/2014
(Continued)

OTHER PUBLICATIONS

Nokia, CR to 38.214 capturing the RAN1#94 meeting agreements. 3GPP TSG-RAN1 Meeting #94, Gothenburg, Sweden, Aug. 20, 2018, R1-1810021, 3 pages.
(Continued)

*Primary Examiner* — Ajit Patel
(74) *Attorney, Agent, or Firm* — Rimon PC

(57) ABSTRACT

This application discloses a communications method and apparatus. The method includes: obtaining one or more candidate time domain resources for transmitting a reference signal in one or more time units; and receiving downlink control information, where the downlink control information includes first indication information and transmission information of a first channel, and the first indication information is used to indicate different situations about time domain reference signal resources in the one or more time units. A network device can accurately indicate a flexibly configured time domain resource for transmitting a reference signal by using relatively low overheads, and a terminal device can accurately determine information about the flexibly configured time domain reference signal resource, thereby improving system transmission efficiency.

20 Claims, 13 Drawing Sheets

(51) Int. Cl.
H04W 72/23 (2023.01)
H04W 72/53 (2023.01)
H04W 76/11 (2018.01)

(56) References Cited

U.S. PATENT DOCUMENTS

| | | | |
|---|---|---|---|
| 2016/0080121 A1* | 3/2016 | Kim | H04W 56/0015 |
| | | | 370/329 |
| 2016/0212735 A1 | 7/2016 | Nogami et al. | |
| 2016/0323901 A1* | 11/2016 | Yum | H04W 72/542 |
| 2017/0318568 A1 | 11/2017 | Nimbalker et al. | |

FOREIGN PATENT DOCUMENTS

| | | |
|---|---|---|
| CN | 106549745 A | 3/2017 |
| CN | 104081872 B | 1/2018 |
| CN | 107733613 A | 2/2018 |
| CN | 108023698 A | 5/2018 |
| CN | 108400848 A | 8/2018 |
| IN | 107770866 A | 3/2018 |
| WO | 2018084588 A1 | 5/2018 |

OTHER PUBLICATIONS

3GPP TS 38.211 V15.2.0 (Jul. 1, 2018), 3rd Generation Partnership Project; Technical Specification Group Radio Access Network; NR; Physical channels and modulation (Release 15), 96 pages.

* cited by examiner

| | | |
|---|---|---|
| PUSCH mapping type B<br>Frequency hopping is not performed on a PUSCH | $l_0$ on each PUSCH is used to transmit a front-loaded reference signal | A front-loaded reference signal needs to be transmitted on the 1st symbol of a PUSCH<br><br>\| F0 \| F1 \| F2 \| F3 \| F4 \| F5 \| F6 \| F7 \| F8 \| F9 \| F10 \| F11 \| F12 \| F13 \| |
| | A physical uplink shared channel PUSCH occupies five to seven time domain symbols | Default front-loaded reference signal — A PUSCH occupies at most four time domain symbols, and a value of uplink DMRS additional position indication information ranges from 1 to 3<br><br>A PUSCH occupies 2 to 14 time domain symbols, and a value of uplink DMRS additional position indication information is 0<br><br>\| F0 \| F1 \| F2 \| F3 \| F4 \| F5 \| F6 \|  — A value of uplink demodulation reference signal DMRS additional position indication information ranges from 1 to 3 |
| | A PUSCH occupies eight to nine time domain symbols | \| F0 \| F1 \| F2 \| F3 \| F4 \| F5 \| F6 \| F7 \| F8 \| — A value of uplink DMRS additional position indication information is 1<br><br>\| F0 \| F1 \| F2 \| F3 \| F4 \| F5 \| F6 \| F7 \| F8 \| — A value of uplink DMRS additional position indication information ranges from 2 to 3 |
| | A PUSCH occupies 10 to 11 time domain symbols | \| F0 \| F1 \| F2 \| F3 \| F4 \| F5 \| F6 \| F7 \| F8 \| F9 \| F10 \| — A value of uplink DMRS additional position indication information is 1<br><br>\| F0 \| F1 \| F2 \| F3 \| F4 \| F5 \| F6 \| F7 \| F8 \| F9 \| F10 \| — A value of uplink DMRS additional position indication information is 2<br><br>\| F0 \| F1 \| F2 \| F3 \| F4 \| F5 \| F6 \| F7 \| F8 \| F9 \| F10 \| — A value of uplink DMRS additional position indication information is 3 |
| | A PUSCH occupies 12 to 14 time domain symbols | \| F0 \| F1 \| F2 \| F3 \| F4 \| F5 \| F6 \| F7 \| F8 \| F9 \| F10 \| F11 \| F12 \| F13 \| — A value of uplink DMRS additional position indication information is 1<br><br>\| F0 \| F1 \| F2 \| F3 \| F4 \| F5 \| F6 \| F7 \| F8 \| F9 \| F10 \| F11 \| F12 \| F13 \| — A value of uplink DMRS additional position indication information is 2<br><br>\| F0 \| F1 \| F2 \| F3 \| F4 \| F5 \| F6 \| F7 \| F8 \| F9 \| F10 \| F11 \| F12 \| F13 \| — A value of uplink DMRS additional position indication information is 3 |

FIG. 2b

COMMUNICATIONS METHOD AND APPARATUS

CROSS-REFERENCE TO RELATED APPLICATIONS

This application is a continuation of International Patent Application No. PCT/CN2019/104368, filed on Sep. 4, 2019, which claims priority to Chinese Patent Application No. 201811042617.4, filed on Sep. 7, 2018. The disclosures of the aforementioned applications are hereby incorporated by reference in their entireties.

TECHNICAL FIELD

This application relates to the field of communications technologies, and in particular, to a communications method and apparatus.

BACKGROUND

Currently, a flexible time domain resource is used for uplink or downlink transmission in a new radio (NR) system. Specifically, in the NR system, the length of a time domain resource of a physical downlink shared channel (PDSCH), a physical uplink shared channel (PUSCH), a physical downlink control channel (PDCCH), or a physical uplink control channel (PUCCH) can be set to a plurality of symbol lengths. In uplink or downlink transmission, a reference signal (RS) needs to be transmitted for channel estimation.

However, currently, in the NR system, the position of the reference signal in uplink or downlink transmission of a same symbol length is predefined or notified using higher layer signaling. In such case, the position of the reference signal remains fixed or can only be changed slowly, so it is not suitable to a rapidly changing channel condition and system requirement. Therefore, it is necessary to resolve the problem of how to accurately indicate a time domain resource of a reference signal by using relatively low overhead in the NR system, to improve system transmission efficiency.

SUMMARY

This application provides a communications method and apparatus, to accurately indicate a flexibly configured time domain resource of a reference signal by using relatively low overheads.

According to a first aspect, a communications method is provided. The communications method includes: obtaining one or more candidate time domain resources for transmitting a reference signal in one or more time units; and receiving downlink control information, where the downlink control information includes first indication information and transmission information of a first channel, and the first indication information is used to indicate one or more pieces of the following information: a time domain resource of a first reference signal, where the time domain resource of the first reference signal is one or more time domain resources in the one or more candidate time domain resources; a time domain resource of a second reference signal, where the time domain resource of the second reference signal is one or more symbols in a time domain resource on which the first channel is located; or a time domain resource on which no reference signal exists in the one or more time units.

In this aspect, a network device can accurately indicate a flexibly configured time domain resource of reference signal by using relatively low overheads, and a terminal device can accurately determine the flexibly configured time domain resource of reference signal, thereby improving system transmission efficiency.

With reference to the first aspect, in a possible implementation, when the one or more candidate time domain resources include a time domain resource determined based on a symbol configuration set in the one or more time units, the method further includes: dividing the symbol configuration set into one or more symbol configuration subsets; and determining the one or more candidate time domain resources based on the one or more symbol configuration subsets.

In this implementation, through division into the symbol configuration subset, the one or more candidate time domain resources can be determined based on the symbol configuration subset, and the corresponding one or more candidate time domain resources of reference signal can be determined provided that the first indication information indicates only the symbol configuration subset, thereby reducing overheads of the first indication information.

With reference to the first aspect, in another possible implementation, the method further includes: receiving first configuration information, where the first configuration information is used to configure a terminal device to support transmission of reference signal on the one or more candidate time domain resources.

In this implementation, the network device enables, by using the first configuration information, the terminal device to select a time domain resource of reference signal to transmit the reference signal by using the solution in this application.

With reference to the first aspect, in still another possible implementation, the method further includes: receiving second configuration information, where the second configuration information is used to configure the terminal device to support a case in which there is no reference signal on the time domain resource of the first channel.

In this implementation, after the terminal device receives the second configuration information, the first indication information received by the terminal device may indicate the time domain resource on which no reference signal exists in the one or more time units.

According to a second aspect, a communications method is provided. The communications method includes: sending downlink control information, where the downlink control information includes first indication information and transmission information of a first channel, and the first indication information is used to indicate one or more pieces of the following information: a time domain resource of a first reference signal, where the time domain resource of the first reference signal is one or more time domain resources in one or more candidate time domain resources of reference signal; a time domain resource of a second reference signal, where the time domain resource of the second reference signal is one or more symbols in a time domain resource on which the first channel is located; or a time domain resource on which no reference signal exists in one or more time units; and transmitting the reference signal based on the first indication information.

With reference to the second aspect, in a possible implementation, when the one or more candidate time domain resources include a time domain resource determined based on a symbol configuration set in the one or more time units, the method further includes: dividing the symbol configuration set into one or more symbol configuration subsets; and determining the one or more candidate time domain resources based on the one or more symbol configuration subsets.

With reference to the second aspect, in another possible implementation, the method further includes: sending first configuration information, where the first configuration information is used to configure a network device to support transmission of the reference signal on the one or more candidate time domain resources.

With reference to the second aspect, in still another possible implementation, the method further includes: sending second configuration information, where the second configuration information is used to configure a terminal device to support a case in which there is no reference signal on the time domain resource of the first channel.

According to a third aspect, a communications method is provided. The communications method includes: A terminal device obtains information about one or more time units; the terminal device determines a symbol configuration set in the one or more time units based on the information about the one or more time units; the terminal device determines one or more candidate time domain resources for transmitting a reference signal based on the symbol configuration set in the one or more time units; the terminal device receives downlink control information, where the downlink control information includes first indication information, and the first indication information is used to indicate one or more pieces of the following information: a time domain resource of a first reference signal, where the time domain resource of the first reference signal is one or more time domain resources in the one or more candidate time domain resources; a time domain resource of a second reference signal, where the time domain resource of the second reference signal is one or more symbols in a time domain resource on which a first channel is located; or a time domain resource on which no reference signal exists in the one or more time units; and the terminal device transmits the first channel and the reference signal based on the downlink control information.

In this aspect, when a plurality of PUSCH or PDSCH lengths are flexibly configured in an NR system, an effective symbol configuration is used to determine the one or more candidate time domain resources, to avoid a reverse symbol position (for example, a PDSCH avoids an uplink symbol and a PUSCH avoids a downlink symbol), so that a position of a reference signal can be flexibly changed.

With reference to the third aspect, in a possible implementation, that the terminal device determines one or more candidate time domain resources for transmitting a reference signal based on the symbol configuration set in the one or more time units includes: dividing the symbol configuration set into one or more symbol configuration subsets; and determining the one or more candidate time domain resources based on the one or more symbol configuration subsets.

According to a fourth aspect, a communications method is provided. The communications method includes: A network device sends downlink control information, where the downlink control information includes first indication information, and the first indication information is used to indicate one or more pieces of the following information: a time domain resource of a first reference signal, where the time domain resource of the first reference signal is one or more time domain resources in the one or more candidate time domain resources; a time domain resource of a second reference signal, where the time domain resource of the second reference signal is one or more symbols in a time domain resource on which a first channel is located; or a time domain resource on which no reference signal exists in one or more time units; and the network device transmits the first channel and the reference signal based on the downlink control information.

According to a fifth aspect, a communications method is provided. The communications method includes: A terminal device receives first information, where the first information is used to indicate the terminal device to transmit N first channels; and the terminal device transmits a reference signal based on a second channel, where the second channel is the $X^{th}$ first channel in the N first channels in time domain order in one time unit, X is an integer greater than or equal to 1, N is an integer greater than or equal to 2, X is less than or equal to N, and a time domain resource of the reference signal is in a time domain resource on which the second channel is located or a time domain resource of the reference signal is before a time domain resource on which the second channel is located.

In this aspect, a network device sends first information, the first information indicates two or more first channels, and a reference signal is transmitted on a time domain resource of the reference signal on one second channel in the two or more first channels, so that the network device can accurately indicate the time domain resource of the reference signal by using relatively low overheads, and the network device/terminal device transmits the reference signal on the time domain resource of the reference signal, thereby improving system transmission efficiency.

With reference to the fifth aspect, in a first possible implementation, that the terminal device transmits a reference signal based on a second channel includes: The terminal device transmits, based on the second channel, the reference signal on a first symbol of the time domain resource on which the second channel is located; or the terminal device transmits, based on the second channel, the reference signal on a first symbol before the time domain resource on which the second channel is located, where the first symbol is the $Y^{th}$ symbol in time domain order, Y is a positive integer greater than or equal to 1, and a quantity of first symbols is less than or equal to N.

In this implementation, a symbol for transmitting the reference signal is specifically determined, and the symbol may be predefined.

With reference to the fifth aspect or the first possible implementation of the fifth aspect, in a second possible implementation, the method further includes: The terminal device sends capability information to a network device, where the capability information is used to indicate that the terminal device has a capability of transmitting the reference signal on some of the N first channels.

In this implementation, the terminal device reports the capability information to the network device, so that the network device can configure, based on the capability of the terminal device, the second channel for transmitting the reference signal for the terminal device.

With reference to the fifth aspect, the first possible implementation of the fifth aspect, or the second possible implementation of the fifth aspect, in a third possible implementation, the method further includes: The terminal device receives second information, where the second information is used to indicate the terminal device to transmit the reference signal on some of the N first channels.

According to a sixth aspect, a communications method is provided. The communications method includes: A network device sends first information, where the first information is used to indicate a terminal device to transmit N first channels; and the network device transmits a reference signal based on a second channel, where the second channel is the $X^{th}$ first channel in the N first channels in time domain order in one time unit, X is an integer greater than or equal to 1, N is an integer greater than or equal to 2, X is less than or equal to N, and a time domain resource of the reference signal is in a time domain resource on which the second channel is located or a time domain resource of the reference signal is before a time domain resource on which the second channel is located.

With reference to the sixth aspect, in a first possible implementation, that the network device transmits a reference signal based on a second channel includes: The network device transmits, based on the second channel, the reference signal on a first symbol of the time domain resource on which the second channel is located; or the network device transmits, based on the second channel, the reference signal on a first symbol before the time domain resource on which the second channel is located, where the first symbol is the $Y^{th}$ symbol in time domain order, Y is a positive integer greater than or equal to 1, and a quantity of first symbols is less than or equal to N.

With reference to the sixth aspect or the first possible implementation of the sixth aspect, in a second possible implementation, the method further includes: The network device receives capability information from the terminal device, where the capability information is used to indicate that the terminal device has a capability of transmitting the reference signal on some of the N first channels.

With reference to the sixth aspect, the first possible implementation of the sixth aspect, or the second possible implementation of the sixth aspect, in a third possible implementation, the method further includes: The network device sends second information, where the second information is used to indicate that some of the N first channels are available to the terminal device to transmit the reference signal.

With reference to any one of the fifth aspect, the sixth aspect, the implementations of the fifth aspect, and the implementations of the sixth aspect, in a fourth possible implementation, the N first channels carry a same transport block.

In this implementation, when the first channel is repeatedly transmitted, the reference signal does not need to be transmitted on each first channel, thereby reducing system overheads, and improving transmission efficiency.

With reference to any one of the fifth aspect, the sixth aspect, the implementations of the fifth aspect, and the implementations of the sixth aspect, in a fifth possible implementation, the second channel corresponds to a first redundancy version.

With reference to the fifth possible implementation, in a sixth possible implementation, the first redundancy version is a redundancy version 0 and/or a redundancy version 3.

In this implementation, in an NR system, a redundancy version 0 and a redundancy version 3 correspond to data transmission that carries all decoding information. Therefore, the data transmission corresponding to the redundancy version 0 and the redundancy version 3 is relatively important. In other words, a first channel corresponding to the two redundancy versions needs to carry the reference signal, so that a receiving device demodulates and decodes the data transmission by using the reference signal.

With reference to any one of the fifth aspect, the sixth aspect, the implementations of the fifth aspect, and the implementations of the sixth aspect, in a seventh possible implementation, the second channel is the $X^{th}$ first channel in the N first channels in time domain order in each time unit.

With reference to any one of the fifth aspect, the sixth aspect, the implementations of the fifth aspect, and the implementations of the sixth aspect, in an eighth possible implementation, a symbol interval between start symbols of time domain resources on which two adjacent first channels in the N first channels are located is less than 14 symbols, or in two adjacent first channels in the N first channels, a start symbol of a time domain resource on which the latter first channel is located is the $1^{st}$ symbol after an end symbol of a time domain resource on which the former first channel is located.

With reference to any one of the fifth aspect, the sixth aspect, the implementations of the fifth aspect, and the implementations of the sixth aspect, in a ninth possible implementation, the first channel is an effective uplink channel, and a time domain resource on which the effective uplink channel is located does not include any downlink symbol; or the first channel is an effective downlink channel, and a time domain resource on which the effective downlink channel is located does not include any uplink symbol.

With reference to any one of the fifth aspect, the sixth aspect, the implementations of the fifth aspect, and the implementations of the sixth aspect, in a tenth possible implementation, when the first channel is an uplink channel, the first symbol is an uplink symbol; or when the first channel is a downlink channel, the first symbol is a downlink symbol.

With reference to any one of the fifth aspect, the sixth aspect, the implementations of the fifth aspect, and the implementations of the sixth aspect, in an eleventh possible implementation, the first information includes a repetition quantity of the first channel and/or information about a time domain resource on which one or more of the N first channels are located.

In this implementation, the network device indicates the repetition quantity of the first channel, and when the first channel is repeatedly transmitted, the reference signal does not need to be transmitted on each first channel, thereby reducing system overheads, and improving transmission efficiency. In addition, information about time domain resources on which a plurality of first channels are located may be the same. Therefore, the first information may include information about a time domain resource on which one first channel is located.

According to a seventh aspect, a communications method is provided. The communications method includes: A terminal device obtains one or more candidate time domain resources of reference signal in one or more time units; the terminal device receives downlink control information, where the downlink control information includes first indication information, and the first indication information is used to indicate one or more pieces of the following information: a time domain resource of a first reference signal, where the time domain resource of the first reference signal is one or more time domain resources in the one or more candidate time domain resources; a time domain resource of a second reference signal, where the time domain resource of the second reference signal is one or more symbols in a time domain resource on which a first channel is located; or a time domain resource on which no reference signal exists in the one or more time units; and the terminal device transmits the reference signal based on the first indication information.

In this aspect, a network device indicates, by using the downlink control information, a time domain resource used to transmit the reference signal; or the time domain resource on which no reference signal exists in the one or more time units. The network device can accurately indicate a flexibly configured time domain resource of a reference signal by using relatively low overheads, and the terminal device can accurately determine information about the flexibly configured time domain resource of the reference signal, thereby improving system transmission efficiency.

According to an eighth aspect, a communications method is provided. The communications method includes: A network device sends downlink control information, where the downlink control information includes first indication information, and the first indication information is used to indicate one or more pieces of the following information: a time domain resource of a first reference signal, where the time domain resource of the first reference signal is one or more time domain resources in the one or more candidate time domain resources; a time domain resource of a second reference signal, where the time domain resource of the second reference signal is one or more symbols in a time domain resource on which a first channel is located; or a time domain resource on which no reference signal exists in one or more time units; and the network device transmits the reference signal based on the first indication information.

With reference to the first aspect to the eighth aspect, in a possible implementation, the one or more candidate time domain resources include one or more of the following time domain resources: a time domain resource configured by using higher layer signaling; a predefined time domain resource; or a time domain resource determined based on a symbol configuration set in the one or more time units, where the symbol configuration set is a subset or a universal set of a symbol configuration list.

In this implementation, there are a plurality of manners of setting the one or more candidate time domain resources, and correspondingly, there are a plurality of manners in which a terminal device obtains the one or more candidate time domain resources.

With reference to the first aspect to the eighth aspect, in another possible implementation, a quantity of bits of the first indication information is related to a quantity of candidate time domain resources for transmitting a reference signal.

In this implementation, a larger quantity of specified candidate time domain resources of reference signal indicates a larger quantity of bits of the first indication information. There is a correspondence between a quantity of bits of the first indication information and a quantity of candidate time domain resources for transmitting a reference signal, and the one or more candidate time domain resources can be determined based on a value of the first indication information.

With reference to the first aspect to the eighth aspect, in still another possible implementation, there are ceiling(log 2(1+Z1)) bits or ceiling(log 2(2+Z1)) bits of the first indication information, where ceiling means rounding up, and Z1 is the quantity of candidate time domain resources of reference signal.

In this implementation, there is a specific correspondence between a quantity of bits of the first indication information and a quantity of candidate time domain resources for transmitting a reference signal, and the one or more candidate time domain resources can be determined based on a value of the first indication information.

With reference to the first aspect to the eighth aspect, in still another possible implementation, a quantity of bits of the first indication information is related to a quantity of symbol configuration subsets.

In this implementation, there is a correspondence between a quantity of bits of the first indication information and a quantity of symbol configuration subsets, and a corresponding symbol configuration subset can be determined based on a value of the first indication information, so as to determine the time domain resource of the reference signal.

With reference to the first aspect to the eighth aspect, in still another possible implementation, there are ceiling(log 2(1+Z2)) bits or ceiling(log 2(2+Z2)) bits of the first indication information, where ceiling means rounding up, and Z2 is a quantity of symbol configuration subsets.

In this implementation, there is a specific correspondence between a quantity of bits of the first indication information and a quantity of symbol configuration subsets.

With reference to the first aspect to the eighth aspect, in still another possible implementation, when the first indication information is used to indicate the time domain resource of the first reference signal, a bit state value corresponding to the first indication information is related to the time domain resource of the first reference signal.

In this implementation, the time domain resource of the first reference signal can be determined based on the bit state value corresponding to the first indication information.

With reference to the first aspect to the eighth aspect, in still another possible implementation, a bit state value corresponding to the first indication information is related to a time sequence of the time domain resource of the first reference signal in the one or more candidate time domain resources.

With reference to the first aspect to the eighth aspect, in still another possible implementation, when the first indication information is used to indicate the time domain resource of the first reference signal, a bit state value corresponding to the first indication information is related to an index of a symbol configuration subset in which the time domain resource of the first reference signal is located.

With reference to the first aspect to the eighth aspect, in still another possible implementation, the downlink control information further includes: a first bit state value corresponding to the first indication information, where the first bit state value is used to indicate that there is no reference signal in the one or more time units, and the first bit state value is predefined; and/or a second bit state value corresponding to the first indication information, where the second bit state value is used to indicate the time domain resource of the second reference signal, and the second bit state value is predefined.

With reference to the first aspect to the eighth aspect, in still another possible implementation, one or more bits in the bits of the first indication information are in a one-to-one correspondence with the symbol configuration subsets.

With reference to the first aspect to the eighth aspect, in still another possible implementation, the first indication information is used to indicate the time domain resource of the first reference signal, the first indication information further includes an offset value, and the offset value includes one or more of the following: a slot offset value between a slot in which the time domain resource of the first reference signal is located and a slot in which the first channel is located; a symbol offset value between a start symbol of the time domain resource of the first reference signal and a start symbol of the first channel; a symbol offset value between a start symbol of the time domain resource of the first reference signal and an end symbol of the first channel; and a symbol offset value between an end symbol of the time domain resource of the first reference signal and an end symbol of the first channel.

In this implementation, the time domain resource of the first reference signal may be a relative time domain resource; to be specific, relative to the time domain resource of the first channel. The time domain resource includes slot information and/or symbol information.

With reference to the first aspect to the eighth aspect, in still another possible implementation, the one or more candidate time domain resources include the time domain resource configured by using higher layer signaling and/or the predefined time domain resource, the first indication information is used to indicate the time domain resource of the first reference signal, the first indication information includes symbol information and/or slot information, the symbol information is one or more of the following: an absolute symbol index, a symbol offset index relative to a start symbol of the first channel, and a symbol offset index relative to an end symbol of the first channel, and the slot information is one or more of the following: an absolute slot index and a slot offset index relative to a slot in which the first channel is located.

In this implementation, the time domain resource of the first reference signal may be a relative time domain resource; to be specific, relative to the time domain resource of the first channel; or may be an absolute time domain resource. The time domain resource includes slot information and/or symbol information.

With reference to the first aspect to the eighth aspect, in still another possible implementation, the one or more candidate time domain resources include a time domain resource that is of a reference signal and that is configured by using higher layer signaling, and the time domain resource that is of a reference signal and that is configured by using higher layer signaling includes one or more of the following: a time domain resource configured for a slot by using higher layer signaling; a time domain resource configured for a downlink control information format by using higher layer signaling; a time domain resource configured for a radio network temporary identifier RNTI by using higher layer signaling; a time domain resource configured for a mapping type of the first channel by using higher layer signaling; or a time domain resource configured for a search space of the downlink control information by using higher layer signaling.

In this implementation, the network device can configure, for a slot transmission direction and/or a slot set, a time domain resource used to transmit the reference signal. The time domain resource of the reference signal can be configured more flexibly. For example, an uplink transmission requirement and a downlink transmission requirement are different. Therefore, the time domain resource of the reference signal can be configured differently. If system resources of different slots are used differently, the time domain resource of the reference signal can be configured differently.

The network device may configure, for a downlink control information format, a time domain resource used to transmit the reference signal. The network device preconfigures a correspondence between a DCI format and a reference signal, and different time domain resources of the reference signal can be implicitly indicated by using the DCI format. In this way, an indicated range of the time domain resource of the reference signal is increased without further increasing a quantity of bits in the DCI. Therefore, system flexibility is improved, and system efficiency is improved.

The network device may configure, for the RNTI, a time domain resource used to transmit the reference signal. The network device preconfigures a correspondence between an RNTI and a reference signal, and different time domain resources of the reference signal can be implicitly indicated by using the RNTI. In this way, an indicated range of the time domain resource of the reference signal is increased without further increasing a quantity of bits in the DCI. Therefore, system flexibility is improved, and system efficiency is improved.

The network device may configure, for a mapping type of the first channel, a time domain resource used to transmit the reference signal. The network device preconfigures a correspondence between a mapping type and a reference signal, and different time domain resources of the reference signal can be implicitly indicated by using the mapping type. In this way, an indicated range of the time domain resource of the reference signal is increased without further increasing a quantity of bits in the DCI. Therefore, system flexibility is improved, and system efficiency is improved.

The network device may also configure, for the search space of the downlink control information, a time domain resource used to transmit the reference signal.

With reference to the first aspect to the eighth aspect, in still another possible implementation, the one or more candidate time domain resources are one or more of the following symbols in the one or more time units: the $1^{st}$ symbol in the earliest time unit in the one or more time units; the last symbol in the last time unit of the one or more time units; the one or more predefined symbols in the one or more time units; or the one or more symbols configured by using higher layer signaling in the one or more time units.

According to a ninth aspect, a communications apparatus is provided. The apparatus can implement the communications method according to the first aspect, the third aspect, the fifth aspect, or the seventh aspect. For example, the communications apparatus may be a chip (for example, a baseband chip or a communications chip) or a terminal device. The apparatus may implement the foregoing methods by using software, hardware, or by hardware executing corresponding software.

In a possible implementation, a structure of the communications apparatus includes a processor and a memory. The processor is configured to support the apparatus to perform a corresponding function in the foregoing communications method. The memory is configured to: be coupled to the processor, and store a program (an instruction) and/or data necessary for the apparatus. Optionally, the communications apparatus may further include a communications interface, configured to support communication between the apparatus and another network element.

In another possible implementation, the communications apparatus may include a unit or a module that performs a corresponding action in the foregoing method.

In still another possible implementation, the communications apparatus includes a processor and a transceiver apparatus. The processor is coupled to the transceiver apparatus. The processor is configured to execute a computer program or instruction, to control the transceiver apparatus to receive and send information. When the processor executes the computer program or instruction, the processor is further configured to implement the foregoing method. The transceiver apparatus may be a transceiver, a transceiver circuit, or an input/output interface. When the communications apparatus is a chip, the transceiver apparatus is a transceiver circuit or an input/output interface.

In still another possible implementation, a structure of the communications apparatus includes a processor. The processor is configured to support the apparatus to perform a corresponding function in the foregoing communications method.

When the communications apparatus is a chip, a transceiver unit may be an input/output unit, for example, an input/output circuit or a communications interface. When the communications apparatus is a terminal device, the transceiver unit may be a transmitter and a receiver.

According to a tenth aspect, a communications apparatus is provided. The communications apparatus can implement the communications method according to the second aspect, the fourth aspect, the sixth aspect, or the eighth aspect. For example, the communications apparatus may be a chip (for example, a baseband chip or a communications chip) or a network device. The apparatus may implement the foregoing methods by using software, hardware, or by hardware executing corresponding software.

In a possible implementation, a structure of the communications apparatus includes a processor and a memory. The processor is configured to support the apparatus to perform a corresponding function in the foregoing communications method. The memory is configured to: be coupled to the processor, and store a program (an instruction) and data necessary for the apparatus. Optionally, the communications apparatus may further include a communications interface, configured to support communication between the apparatus and another network element.

In another possible implementation, the communications apparatus may include a unit or a module that performs a corresponding action in the foregoing method.

In still another possible implementation, the communications apparatus includes a processor and a transceiver apparatus. The processor is coupled to the transceiver apparatus. The processor is configured to execute a computer program or instruction, to control the transceiver apparatus to receive and send information. When the processor executes the computer program or instruction, the processor is further configured to implement the foregoing method. The transceiver apparatus may be a transceiver, a transceiver circuit, or an input/output interface. When the communications apparatus is a chip, the transceiver apparatus is a transceiver circuit or an input/output interface.

In still another possible implementation, a structure of the communications apparatus includes a processor. The processor is configured to support the apparatus to perform a corresponding function in the foregoing communications method.

When the communications apparatus is a chip, a transceiver unit may be an input/output unit, for example, an input/output circuit or a communications interface. When the communications apparatus is a network device, a transceiver unit may be a transmitter and a receiver.

According to an eleventh aspect, a computer-readable storage medium is provided. The computer-readable storage medium stores a computer program or instruction. When the computer program or instruction is executed, the methods in the foregoing aspects are implemented.

According to a twelfth aspect, a computer program product including an instruction is provided. When the instruction is run on a computer, the computer is enabled to perform the methods in the foregoing aspects.

According to a thirteenth aspect, a communications system is provided. The communications system includes the communications apparatuses in the ninth aspect and the tenth aspect.

BRIEF DESCRIPTION OF DRAWINGS

FIG. 2b is a schematic diagram of an example position of a DMRS of a PUSCH mapping type B;

DESCRIPTION OF EMBODIMENTS

The following describes embodiments of this application with reference to accompanying drawings in the embodiments of this application.

Figure 1:
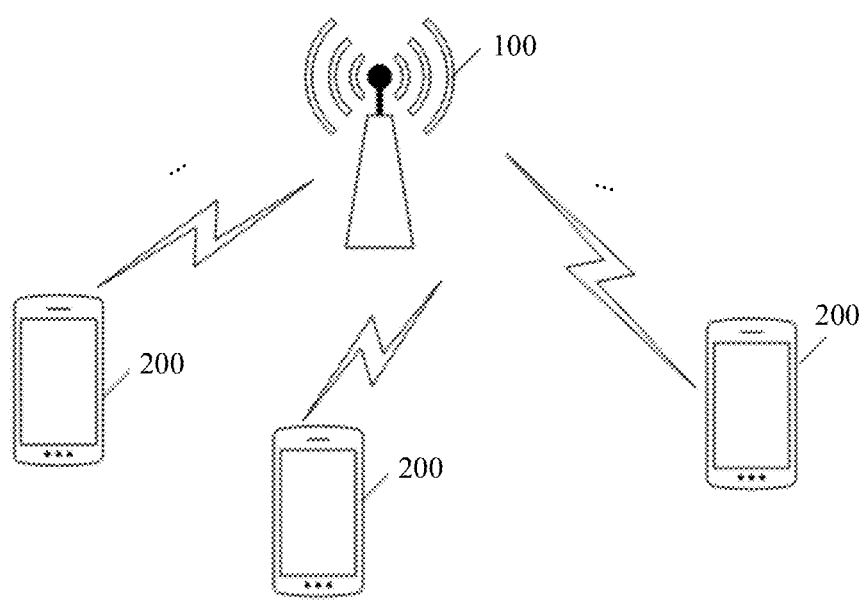
FIG. 1 is a schematic diagram of a communications system according to this application.

FIG. 1 is a schematic diagram of a communications system according to this application. The communications system may include one or more network devices 100 (only one network device 100 is shown) and one or more terminal devices 200 connected to the network device 100.

The network device 100 may be a device that can communicate with the terminal device 200. The network device 100 may be any device having a wireless transceiver function. The device includes but is not limited to a NodeB (NodeB), an evolved NodeB (eNodeB), a base station (for example, a gNB) in a 5th generation (5G) communications system, a base station or a network device in a future communications system, an access node in a Wi-Fi system, a wireless relay node, a wireless backhaul node, and the like. The network device 100 may alternatively be a radio controller in a cloud radio access network (CRAN) scenario. The network device 100 may alternatively be a small cell, a transmission/reception node (TRP), or the like. In the embodiments of this application, a specific technology and a specific device form used by the network device are not limited.

The terminal device 200 is a device having a wireless transceiver function. The device may be deployed on land, including an indoor or outdoor device, a hand-held device, a wearable or vehicle-mounted device; may be deployed on a water surface, for example, on a ship; or may be deployed in air, for example, on an aircraft, a balloon, and a satellite. The terminal device may be a mobile phone, a tablet computer, a computer having a wireless transceiver function, a virtual reality (VR) terminal device, an augmented reality (AR) terminal device, a wireless terminal in industrial control, a wireless terminal in self driving, a wireless terminal in TeleMedicine (remote medical), a wireless terminal in smart grid, a wireless terminal in transportation safety, a wireless terminal in smart city, a wireless terminal in smart home, or the like. An application scenario is not limited in the embodiments of this application. Sometimes, the terminal device is also referred to as user equipment (UE), an access terminal device, a UE unit, a mobile station, a mobile console, a remote station, a remote terminal device, a mobile device, a terminal, a wireless communications device, a UE agent, a UE apparatus, or the like.

It should be noted that the terms "system" and "network" in the embodiments of this application may be used interchangeably. "Plurality" means two or more. In view of this, "plurality" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects. Descriptions such as "first" and "second" in the embodiments of this application are only used to indicate and distinguish between described objects, do not indicate a sequence, do not indicate that a quantity of devices is particularly limited in the embodiments of this application, and cannot constitute any restriction on the embodiments of this application.

Higher layer signaling in the embodiments of this application may be signaling that is at a higher-layer protocol layer and that is sent by a network device. The higher-layer protocol layer is a protocol layer above a physical layer. The higher-layer protocol layer may be specifically one or more of the following protocol layers: a medium access control layer, a radio link control layer, a packet data convergence protocol layer, a radio resource control layer, and a non-access stratum.

Reference signals in the embodiments of this application include an uplink reference signal and a downlink reference signal. Specifically, the uplink reference signal may be a demodulation reference signal (DMRS), a phase tracking reference signal (PT-RS), a sounding reference signal (SRS), or another reference signal. This is not particularly limited herein in this application. DMRSs may be further divided into a PUSCH demodulation reference signal (PUSCH DMRS) and a PUCCH demodulation reference signal (PUCCH DMRS). The downlink reference signal may be a DMRS, a PT-RS, a channel state information-reference signal (CSI-RS), a synchronization sequence or physical broadcast channel block (SSB), or another reference signal. DMRSs may be further divided into a PDSCH demodulation reference signal (PDSCH DMRS), a PDCCH demodulation reference signal (PDCCH DMRS), and a physical broadcast channel (PBCH) demodulation reference signal (PBCH DMRS).

In the embodiments of this application, a method for determining a time domain resource of the uplink reference signal may have the following listed implementation. It may be understood that the following implementation is merely an example. The method for determining a time domain resource of the uplink reference signal is not limited in the embodiments of this application.

The PUSCH DMRS is used as an example. A time domain resource of the PUSCH DMRS is related to the following parameters: a PUSCH mapping type, uplink DMRS additional position indication information (UL-DMRS-add-pos), a quantity of time domain symbols occupied by a PUSCH in one slot, a DMRS corresponding to each DMRS time domain resource index occupies one or two symbols, and whether frequency hopping (frequency hopping) is performed on the PUSCH.

(1) PUSCH mapping types include a PUSCH mapping type A and a PUSCH mapping type B.

a. A relationship between the PUSCH mapping type A and a time domain resource of a reference signal is as follows: As shown in Table 1 and Table 2, when frequency-hopping transmission is not performed on the PUSCH, $I_0$ is a symbol 2 or a symbol 3. In this case, a time domain resource index in Table 1 and Table 2 is an absolute symbol index. In other words, the time domain resource index is used to notify an absolute symbol position in a slot in which the PUSCH is located. The symbol 2 or the symbol 3 is determined based on higher layer signaling. As shown in Table 3, when frequency-hopping transmission is performed on the PUSCH, $I_0$ is the $1^{st}$ symbol of each frequency-hopping portion of the PUSCH. In this case, a time domain resource index in Table 3 is a relative symbol index. In other words, the time domain resource index is used to notify a symbol position relative to the $1^{st}$ symbol of each frequency-hopping portion.

b. A relationship between the PUSCH mapping type B and a time domain resource of a reference signal is as follows: As shown in Table 1 and Table 2, when frequency-hopping transmission is not performed on the PUSCH, $I_0$ is the $1^{st}$ symbol in a time domain resource on which the PUSCH is located. In this case, a time domain resource index in Table 1 and Table 2 is a relative symbol index. In other words, the time domain resource index is used to notify a symbol position relative to the $1^{st}$ symbol of the PUSCH. As shown in Table 3, when frequency-hopping transmission is performed on the PUSCH, $I_0$ is the $1^{st}$ symbol of each portion of the PUSCH. In this case, a time domain resource index in Table 3 is a relative symbol index. In other words, the time domain resource index is used to notify a symbol position relative to the $1^{st}$ symbol of each frequency-hopping portion.

length of the PUSCH is eight symbols. When frequency hopping is performed on the PUSCH, the PUSCH of the eight symbols is divided into PUSCHs of two frequency-hopping portions whose lengths are four symbols. A PUSCH of each frequency-hopping portion may be referred to as per hop PUSCH. The two PUSCHs whose lengths are four symbols are respectively transmitted on different frequency domain resources. The frequency domain resource may be one or more resource blocks (RB), one or more resource elements (RE), one or more carriers/cells, one or more bandwidth parts (BWP), one or more RBs on one or more BWPs on one or more carriers, or one or more REs on one or more RBs on one or more BWPs on one or more carriers.

The following describes an example of a table for determining a DMRS time domain resource:

TABLE 1 shows a DMRS time domain resource index when each DMRS time domain resource index corresponds to one symbol and frequency hopping is not performed

| Quantity of time domain symbols occupied by a PUSCH | DMRS time domain resource index $\bar{I}$ | | | | | | | |
|---|---|---|---|---|---|---|---|---|
| | PUSCH mapping type A Uplink DMRS additional position indication information | | | | PUSCH mapping type B Uplink DMRS additional position indication information | | | |
| | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, [4] | $l_0$, [4] | $l_0$, [4] |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, [7] | $l_0$, [7] | $l_0$, [7] | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$ 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

(2) A value of the uplink DMRS additional position indication information may be 0, 1, 2, or 3, and is notified by using higher layer signaling.

(3) The DMRS corresponding to each DMRS time domain resource index occupies one or two symbols. A time domain resource of the DMRS can be determined based on a DMRS time domain resource index in Table 1 to Table 3 and the quantity of symbols occupied by the DMRS. For example, an uplink DMRS time domain resource index 1 is determined according to Table 1 to Table 3. As shown in Table 1 and Table 3, when the DMRS corresponding to each DMRS time domain resource index occupies one symbol, an uplink DMRS time domain resource index corresponds to $I_0+I'$, $I'=0$. As shown in Table 2, when the DMRS corresponding to each DMRS time domain resource index occupies two symbols, an uplink DMRS time domain resource index corresponds to $I_0+I'$, $I'=0$ and 1.

Figure 2A:
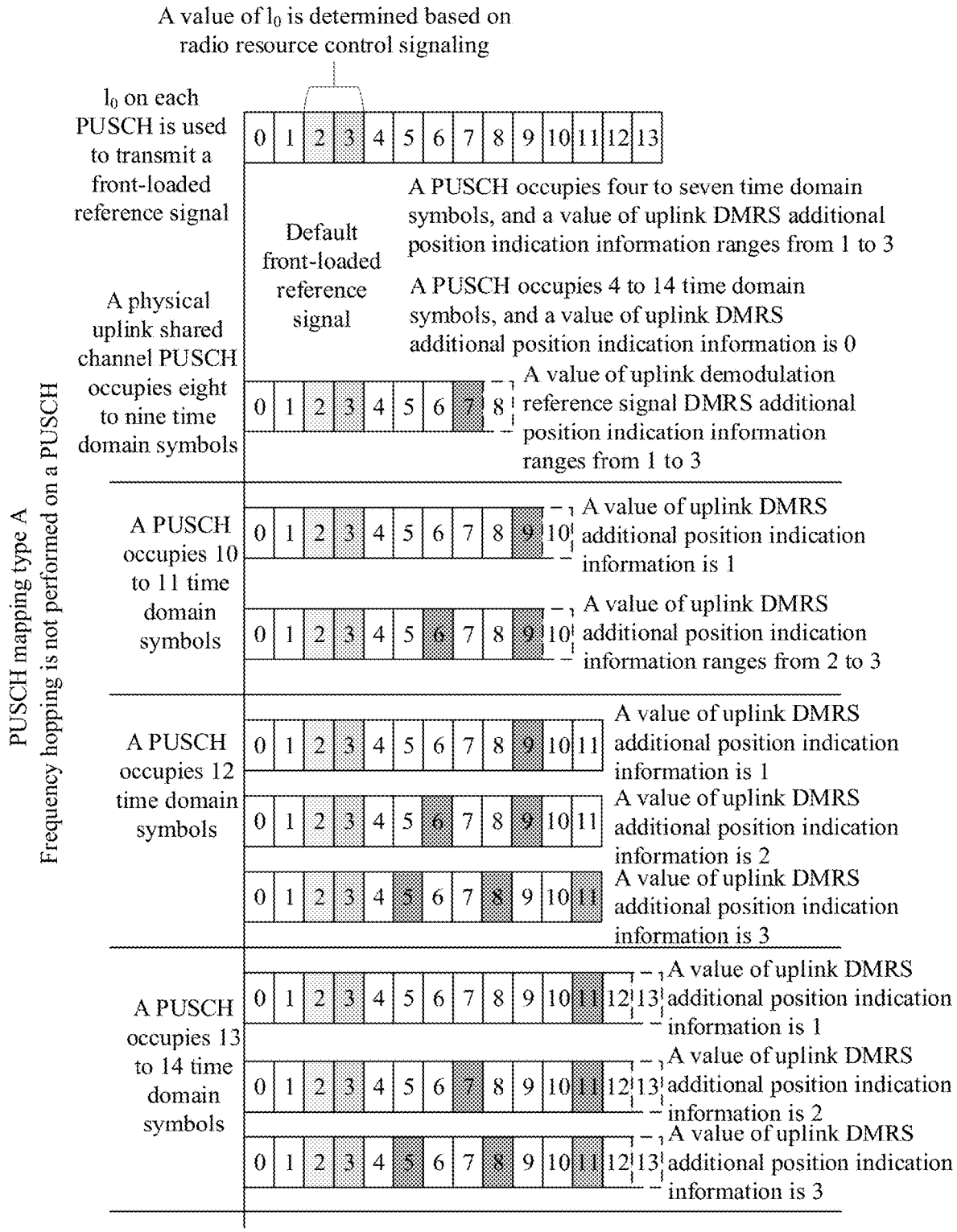
FIG. 2a is a schematic diagram of an example position of a DMRS of a PUSCH mapping type A.

(4) Whether frequency hopping is performed on the PUSCH. Frequency hopping on the PUSCH means that in a predefined manner, the PUSCH is divided into two parts of time domain lengths in time domain, and PUSCHs of both frequency-hopping portions are transmitted on different frequency domain resources. For example, a time domain Further, a DMRS time domain resource index corresponding to the PUSCH mapping type A in Table 1 is shown in FIG. 2a. A DMRS time domain resource index corresponding to the PUSCH mapping type B in Table 1 is shown in FIG. 2b. It can be learned from FIG. 2a that $I_0$ is a symbol 2 or a symbol 3. In this case, time domain resource indexes 0 to 13 are absolute symbol indexes. It can be learned from FIG. 2b that $I_0$ is the $1^{st}$ symbol in the time domain resource on which the PUSCH is located. In this case, time domain resource indexes F0 to F13 are relative symbol indexes. Further, in FIG. 2a, when the PUSCH occupies eight to nine time domain symbols (duration), there are two DMRS time domain resource indexes $I_0$ and 7; when a time domain resource length is 10 to 11, there are three DMRS time domain resource indexes $I_0$, 6, and 9; and so on. In FIG. 2b, when the time domain resource length is 5 to 7, there are two DMRS time domain resource indexes F0 and F4; when the time domain resource length is 8 to 9, there are three DMRS time domain resource indexes F0, F3, and F6; and so on.

TABLE 2 shows a DMRS time domain resource index when a DMRS corresponding to each DMRS time domain resource index occupies two symbols and frequency hopping is not performed on a PUSCH

| Quantity of time domain symbols occupied by a PUSCH | DMRS time domain resource index $\bar{l}$ | | | | | | | |
|---|---|---|---|---|---|---|---|---|
| | PUSCH mapping type A Uplink DMRS additional position indication information | | | | PUSCH mapping type B Uplink DMRS additional position indication information | | | |
| | 0 | 1 | 2 | 3 | 0 | 1 | 2 | 3 |
| <4 | — | — | | | — | — | | |
| 4 | $l_0$ | $l_0$ | | | — | — | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0$, 5 | | |
| 9 | $l_0$ | $l_0$ | | | $l_0$ | $l_0$, 5 | | |
| 10 | $l_0$ | $l_0$, 8 | | | $l_0$ | $l_0$, 7 | | |
| 11 | $l_0$ | $l_0$, 8 | | | $l_0$ | $l_0$, 7 | | |
| 12 | $l_0$ | $l_0$, 8 | | | $l_0$ | $l_0$, 9 | | |
| 13 | $l_0$ | $l_0$, 10 | | | $l_0$ | $l_0$, 9 | | |
| 14 | $l_0$ | $l_0$, 10 | | | $l_0$ | $l_0$, 9 | | |

TABLE 3 shows a DMRS time domain resource index when a DMRS corresponding to each DMRS time domain resource index occupies one symbol and frequency hopping is performed on a PUSCH

| Quantity of time domain symbols occupied by a PUSCH | DMRS time domain resource index $\bar{l}$ | | | | | | | |
|---|---|---|---|---|---|---|---|---|
| | PUSCH mapping type A Uplink DMRS additional position indication information | | | | PUSCH mapping type B Uplink DMRS additional position indication information | | | |
| | 0 | | 1 | | 0 | | 1 | |
| | First frequency hopping | Second frequency hopping | First frequency hopping | Second frequency hopping | First frequency hopping | Second frequency hopping | First frequency hopping | Second frequency hopping |
| ≤3 | — | — | — | — | $l_0$ | 0 | — | — |
| 4 | $l_0$ | 0 | — | — | $l_0$ | 0 | — | — |
| 5, 6 | $l_0$ | 0 | — | — | $l_0$ | 0 | $l_0$, $l_0 + 4$ | 0, 4 |
| 7 | $l_0$ | 0 | $l_0$, $l_0 + 4$ | 0, 4 | $l_0$ | 0 | $l_0$, $l_0 + 4$ | 0, 4 |

In the embodiments of this application, a method for determining a time domain resource of a downlink reference signal may have the following listed implementation. It may be understood that the following implementation is merely an example. The method for determining a time domain resource of the downlink reference signal is not limited in the embodiments of this application.

The PDSCH DMRS is used as an example. A time domain resource of the PDSCH DMRS is related to the following parameters: a PDSCH mapping type, downlink DMRS additional position indication information (DL-DMRS-add-pos), a quantity of time domain symbols occupied by a PDSCH in one slot, and a DMRS corresponding to each DMRS time domain resource index occupies one or two symbols. It should be noted that there is no downlink frequency hopping.

(1) PDSCH mapping types include a PDSCH mapping type A and a PDSCH mapping type B.

a. A relationship between the PDSCH mapping type A and a time domain resource of a reference signal is as follows: $l_0$ is a symbol 2 or a symbol 3. The symbol 2 or the symbol 3 is determined based on higher layer signaling. In this case, a time domain resource index in Table 4 and Table 5 is an absolute symbol index. In other words, the time domain resource index is used to notify an absolute symbol position in a slot in which the PDSCH is located.

b. A relationship between the PDSCH mapping type B and a time domain resource of a reference signal is as follows: $l_0$ is the $1^{st}$ symbol in a time domain resource on which the PDSCH is located. In this case, a time domain resource index in Table 4 and Table 5 is a relative symbol index. In other words, the time domain resource index is used to notify a symbol position relative to the $1^{st}$ symbol of the time domain resource on which the PDSCH is located.

(2) A value of the downlink DMRS additional position indication information may be 1, 2, or 3, and is notified by using higher layer signaling.

(3) The DMRS corresponding to each DMRS time domain resource index occupies one or two symbols. Several existing DMRS time domain resources can be determined according to Table 4 and Table 5. For example, in Table 4, a downlink DMRS time domain resource index $I_0$ is determined. When the DMRS corresponding to each downlink DMRS time domain resource index may occupy one symbol, the downlink DMRS time domain resource index is $I_0+I'$, $I'=0$. For example, in Table 5, when the DMRS corresponding to each downlink DMRS time domain resource index may occupy two symbols, the downlink DMRS time domain resource index is $I_0+I'$, $I'=0$ and 1.

The following shows tables for determining a DMRS time domain resource in various cases:

This application provides a communications method and apparatus. A network device can accurately indicate a flexibly configured time domain resource of a reference signal by using relatively low overheads, and a terminal device can accurately determine information about the flexibly configured time domain resource of the reference signal, thereby improving system transmission efficiency.

Figure 3:
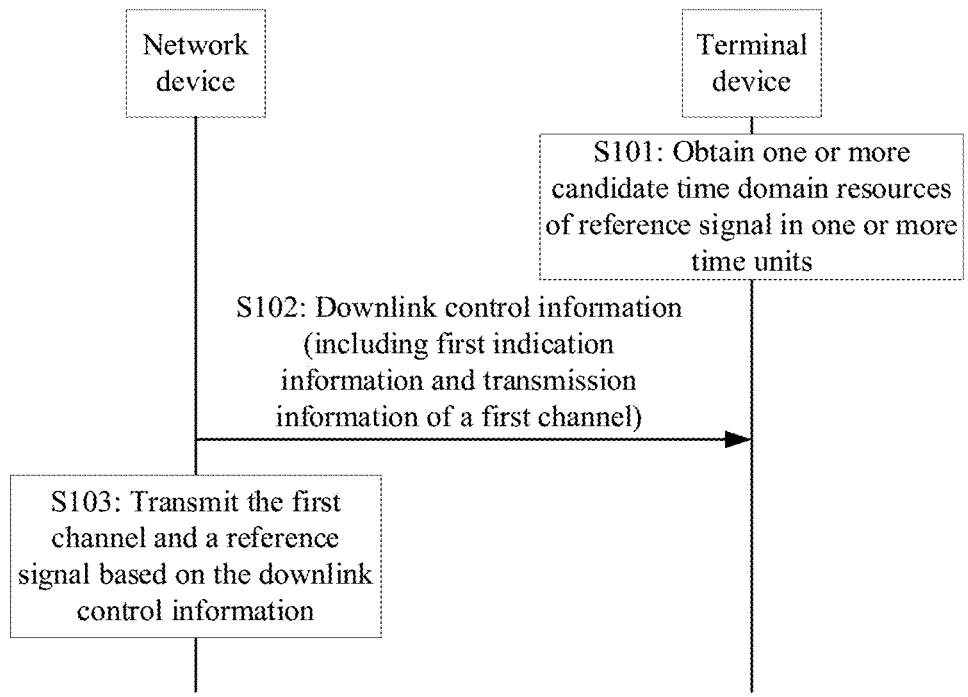
FIG. 3 is a schematic diagram of an interaction process of a communications method according to an embodiment of this application.

FIG. 3 is a schematic diagram of an interaction process of a communications method according to an embodiment of this application. The method includes the following steps.

TABLE 4 shows a PDSCH DMRS time domain resource index when a DMRS corresponding to each DMRS time domain resource index occupies one symbol

| | DMRS time domain resource index $\bar{I}$ | | | | | | | |
|---|---|---|---|---|---|---|---|---|
| | PDSCH mapping type A Downlink DMRS additional position indication information | | | | PDSCH mapping type B Downlink DMRS additional position indication information | | | |
| Quantity of time domain symbols occupied by a PDSCH | 0 | 1 | 2 | 3 | 0 | 1 | 2 | 3 |
| 2 | — | — | — | — | $l_0$ | $l_0$ | | |
| 3 | $l_0$ | $l_0$ | $l_0$ | $l_0$ | — | — | | |
| 4 | $l_0$ | $l_0$ | $l_0$ | $l_0$ | $l_0$ | $l_0$ | | |
| 5 | $l_0$ | $l_0$ | $l_0$ | $l_0$ | — | — | | |
| 6 | $l_0$ | $l_0$ | $l_0$ | $l_0$ | — | — | | |
| 7 | $l_0$ | $l_0$ | $l_0$ | $l_0$ | $l_0$ | $l_0$, 4 | | |
| 8 | $l_0$ | $l_0$, [7] | $l_0$, [7] | $l_0$, [7] | — | — | | |
| 9 | $l_0$ | $l_0$, 7 | $l_0$, 7 | $l_0$, 7 | — | — | | |
| $l_0$ | $l_0$ | $l_0$, 9 | $l_0$, 6, 9 | $l_0$, 6, 9 | — | — | | |
| 11 | $l_0$ | $l_0$, 9 | $l_0$, 6, 9 | $l_0$, 6, 9 | — | — | | |
| 12 | $l_0$ | $l_0$, 9 | $l_0$, 6, 9 | $l_0$, 5, 8, 11 | — | — | | |
| 13 | $l_0$ | $l_0$, 11 | $l_0$, 7, 11 | $l_0$, 5, 8, 11 | — | — | | |
| 14 | $l_0$ | $l_0$, 11 | $l_0$, 7, 11 | $l_0$, 5, 8, 11 | — | — | | |

TABLE 5 shows a PDSCH DMRS time domain resource index when a DMRS corresponding to each DMRS time domain resource index occupies two symbols

| | DMRS time domain resource index $\bar{I}$ | | | | | |
|---|---|---|---|---|---|---|
| | PDSCH mapping type A Downlink DMRS additional position indication information | | | PDSCH mapping type B Downlink DMRS additional position indication information | | |
| Quantity of time domain symbols occupied by a PDSCH | 0 | 1 | 2 | 0 | 1 | 2 |
| <4 | — | — | | — | — | |
| 4 | $l_0$ | $l_0$ | | — | — | |
| 5 | $l_0$ | $l_0$ | | — | — | |
| 6 | $l_0$ | $l_0$ | | — | — | |
| 7 | $l_0$ | $l_0$ | | $l_0$ | $l_0$ | |
| 8 | $l_0$ | $l_0$ | | — | — | |
| 9 | $l_0$ | $l_0$ | | — | — | |
| 10 | $l_0$ | $l_0$ | | — | — | |
| 11 | $l_0$ | $l_0$ | | — | — | |
| 12 | $l_0$ | $l_0$ | | — | — | |
| 13 | $l_0$ | $l_0$ | | — | — | |
| 14 | $l_0$ | $l_0$ | | — | - | |

S101: A terminal device obtains one or more candidate time domain resources for transmitting a reference signal in one or more time units.

As described above, in uplink or downlink transmission, when a device transmits a channel in one or more time units, a reference signal is transmitted in the one or more time units. The reference signal may be used for channel estimation. In this embodiment, in the downlink transmission, a network device sends a reference signal, the terminal device receives the reference signal, and the terminal device performs channel estimation by using the reference signal. In the uplink transmission, the terminal device sends a reference signal, the network device receives the reference signal, and the network device performs channel estimation by using the reference signal.

In the downlink transmission, the terminal device needs to receive the reference signal, and the network device needs to send the reference signal. In S101, the terminal device and/or the network device obtain/obtains the one or more candidate time domain resources in the one or more time units. Correspondingly, in uplink transmission, the terminal device needs to send a reference signal, and the network device needs to receive the reference signal. Therefore, the network device and/or the terminal device obtain/obtains the one or more candidate time domain resources in the one or more time units.

The time domain resource in this application may be one or more slots, or may be one or more symbols in one or more slots. The symbol may be an orthogonal frequency division multiplexing (OFDM) symbol. Transform precoding may or may not be used for the OFDM symbol. If transform precoding is used, the OFDM symbol may also be referred to as a single carrier-frequency division multiplexing (SC-FDM) symbol.

In this application, a length of one time unit may include one or more time domain resources. The one or more time units may be configured by using higher layer signaling, may be predefined, or may be determined based on downlink control information (DCI).

S102: The network device sends downlink control information.

Correspondingly, the terminal device receives the downlink control information.

The downlink control information includes first indication information and transmission information of a first channel.

The first channel is used to carry data and/or control information. The first channel may be one or more of a PUSCH, a PDSCH, a PUCCH, and a PDCCH. It may be understood that the description of "first channel" does not mean that only one or one type of channel is established between the terminal device and the network device. A type of the first channel and a quantity of first channels are not limited in this embodiment of this application. The transmission information of the first channel includes information such as a modulation and coding scheme and a time-frequency resource. The network device sends the transmission information, so that the terminal device receives the first channel based on the transmission information.

Figure 4A:
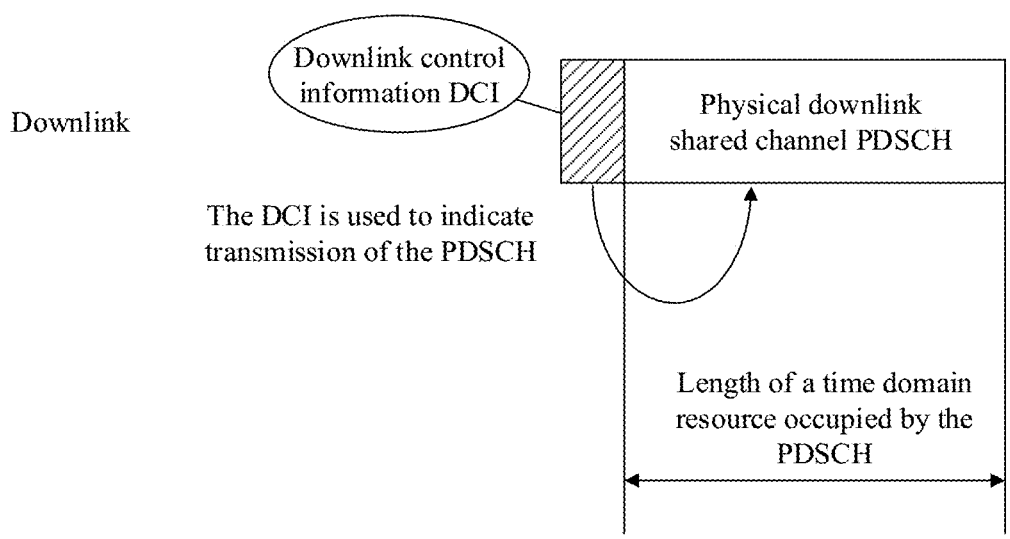
FIG. 4a is a schematic diagram of PDSCH transmission.

Specifically, for the downlink transmission, the first channel includes a PDSCH or a PDCCH. The PDSCH is used as an example. FIG. 4a is a schematic diagram of PDSCH transmission. The network device sends DCI, and the DCI includes transmission information of the PDSCH. The transmission information of the PDSCH includes indication information such as a time-frequency resource and a modulation and coding scheme of the PDSCH. After receiving the DCI, the terminal device may determine a transmission resource and a transmission mode of the PDSCH.

Figure 4B:
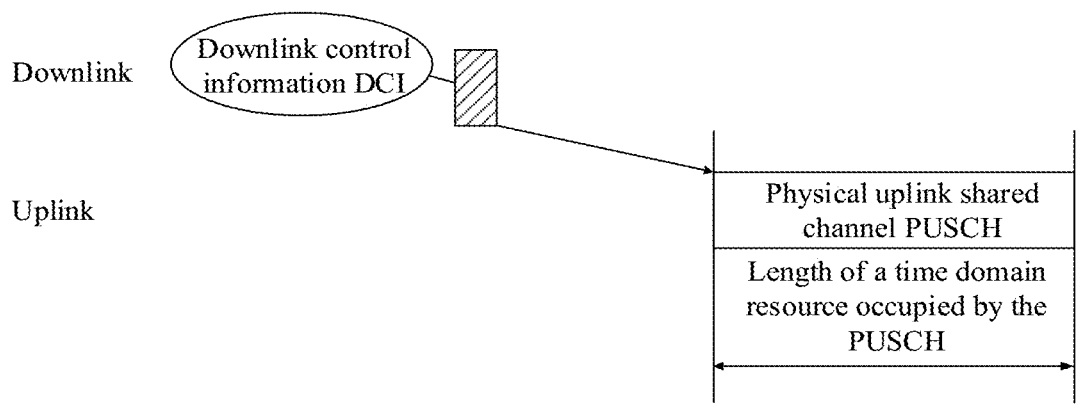
FIG. 4b is a schematic diagram of PUSCH transmission.

For the uplink transmission, the first channel includes a PUSCH or a PUCCH. The PUSCH is used as an example. FIG. 4b is a schematic diagram of PUSCH transmission. The network device sends DCI, and the DCI includes transmission information of the PUSCH. The transmission information of the PUSCH includes indication information such as a time-frequency resource and a modulation and coding scheme of the PUSCH. After receiving the DCI, the terminal device may determine a transmission resource and a transmission mode of the PUSCH.

The first indication information is used to indicate one or more pieces of the following information:

a time domain resource of a first reference signal, where the time domain resource of the first reference signal is one or more time domain resources in the one or more candidate time domain resources;

a time domain resource of a second reference signal, where the time domain resource of the second reference signal is one or more symbols in a time domain resource on which the first channel is located; or a time domain resource on which no reference signal exists in the one or more time units.

For ease of description, in this embodiment of this application, the one or more time domain resources in the one or more candidate time domain resources that are obtained in S101 are referred to as the time domain resource of the first reference signal. A time domain resource corresponding to an index of a time domain resource of a reference signal in Table 1 to Table 5 is referred to as the time domain resource of the second reference signal. Descriptions are not provided again below.

It may be understood that the first reference signal and the second reference signal are determined in different manners. Specifically, the time domain resource of the first reference signal may be predefined, may be determined by using first higher layer signaling, or may be determined by using the DCI. The time domain resource of the second reference signal is determined by using second higher layer signaling and Table 1 to Table 5. It may be understood that herein, the first higher layer signaling and the second higher layer signaling correspond to different higher layer signaling or correspond to different fields in same higher layer signaling. Further, the time domain resource of the first reference signal and the time domain resource of the second reference signal may be the same or different. This is not limited in this application.

Optionally, the time domain resource of the first reference signal may be one of the time domain resource of the second reference signal. Further, for the time domain resource of the second reference signal, when the time domain resource that is of the second reference signal and that is determined based on Table 1 to Table 5 includes a plurality of time domain resource indexes, for example, $I_0$, 7, the terminal device sends a plurality of time domain resource indexes in the uplink transmission, and the network device receives the plurality of time domain resource indexes. Similarly, on a downlink, the network device sends a plurality of time domain resource indexes, and the terminal device receives the plurality of time domain resource indexes.

For the time domain resource of the first reference signal, when the time domain resource that is of the first reference signal and that is determined based on the method in this application includes a plurality of time domain resource indexes, the terminal device does not need to send a plurality of time domain resource indexes in the uplink transmission, but may determine a time domain resource index of a to-be-sent reference signal based on the DCI or other information. The index of the time domain resource of the second reference signal in Table 1 to Table 5 is predefined, and the one or more candidate time domain resources may be obtained by the terminal device in the manner in this application before transmitting the reference signal.

In this embodiment, a time domain resource used to transmit the reference signal may be the time domain resource of the first reference signal, or may be the time domain resource of the second reference signal. In addition, there may also be a time domain resource on which no reference signal exists in the one or more time units.

In this embodiment of this application, the one or more candidate time domain resources may be configured by using higher layer signaling. The terminal device receives higher layer signaling sent by the network device, and the higher layer signaling includes the one or more candidate time domain resources.

Specifically, the network device sends configuration signaling of a time domain resource to the terminal device by using higher layer signaling. The configuration signaling includes the one or more candidate time domain resources in the one or more configured time units. The terminal device receives the configuration signaling, and obtains the one or more candidate time domain resources.

Optionally, the one or more candidate time domain resources may be predefined. Therefore, the terminal device obtains the predefined one or more candidate time domain resources from a storage area of the terminal device. Similarly, the network device obtains the predefined one or more candidate time domain resources from a storage area of the network device.

The one or more candidate time domain resources may be one or more symbols configured by using higher layer signaling or predefined in the one or more time units. Specifically, the one or more candidate time domain resources may be understood as one or more symbols in each of the one or more time units, or one or more symbols in all symbols in the one or more time units. The higher layer signaling may be used to determine a ranking of a symbol that is in each time unit and on which the one or more candidate time domain resources are located, or a ranking of a symbol in all symbols in the one or more time units, may be used to determine a symbol index and/or a slot index of the one or more candidate time domain resources in the one or more time units, or may be used to determine a period and/or a symbol index of the one or more candidate time domain resources in the one or more time units.

Optionally, the one or more candidate time domain resources are one or more of the following symbols in the one or more time units: the $1^{st}$ symbol in an earliest time unit in a time sequence in the one or more time units; the last symbol in a last time unit in the time sequence in the one or more time units; one or more predefined symbols in the one or more time units; the last symbol in the earliest time unit in the time sequence in the one or more time units; the $1^{st}$ symbol in the last time unit in the time sequence in the one or more time units; the $1^{st}$ symbol in each time unit in the one or more time units; or the last symbol in each time unit in the one or more time units. It may be understood that the one or more candidate time domain resources may be one symbol, for example, the $1^{st}$ symbol or the last symbol in a time unit; may include a plurality of symbols, for example, the $1^{st}$ symbol in each time unit in a plurality of time units; or includes the $1^{st}$ symbol in one time unit and the last symbol in another time unit. This is not particularly limited in this application.

Optionally, the one or more candidate time domain resources may be a time domain resource determined by the terminal device based on a symbol configuration set in the one or more time units. The symbol configuration set is a subset or a universal set of a symbol configuration list.

The symbol configuration list may be sent by the network device to the terminal device or a predefined symbol configuration list. The symbol configuration list includes an uplink symbol configuration list and/or a downlink symbol configuration list. A symbol configuration may be an uplink symbol configuration or a downlink symbol configuration. The symbol configuration set is determined based on the symbol configuration list.

The symbol configuration list is a configuration of a time domain resource occupied by an uplink channel or a downlink channel, so that the terminal device determines, by using higher layer signaling or the downlink control information, a time domain resource occupied by a downlink channel used for transmission. Specifically, each symbol configuration in the symbol configuration list includes index information of a start symbol, information about a quantity of consecutive symbols, and information about a slot offset value, and may further include other information. This is not limited in this application. In the uplink symbol configuration list, the information about the slot offset value is used to indicate a quantity of slots between a slot in which a downlink control channel is located and a slot in which an uplink channel corresponding to the downlink control channel is located. In the downlink symbol configuration list, the information about the slot offset value is used to indicate a quantity of slots between a slot in which a downlink control channel is located and a slot in which a downlink channel corresponding to the downlink control channel is located.

The uplink symbol configuration list is used as an example, and is shown in Table 6 below:

TABLE 6

| Symbol configuration index | Slot offset value | Start uplink symbol index S | Quantity L of consecutive symbols in symbols |
|---|---|---|---|
| 0 | 0 | 0 | 13 |
| 1 | 0 | 0 | 2 |
| 2 | 1 | 0 | 4 |
| 3 | 2 | 0 | 7 |
| 4 | 3 | 4 | 4 |
| 5 | 4 | 7 | 7 |
| 6 | 0 | 9 | 2 |
| 7 | 0 | 11 | 2 |

In this application, neither an implementation method of the symbol configuration list nor a quantity of pieces of information included in the symbol configuration list is limited. In a specific implementation, the index information of the start symbol and the information about the quantity of consecutive symbols may alternatively be determined based on information about a start and length indicator value (SLIV). An example is shown in Table 7.

TABLE 7

| Symbol configuration index | Slot offset value | Start and length indicator value SLIV |
|---|---|---|
| 0 | 0 | 29 |
| 1 | 0 | 14 |

TABLE 7-continued

| Symbol configuration index | Slot offset value | Start and length indicator value SLIV |
|---|---|---|
| 2 | 1 | 42 |
| 3 | 2 | 84 |
| 4 | 3 | 46 |
| 5 | 4 | 91 |
| 6 | 0 | 23 |
| 7 | 0 | 25 |

Optionally, a bit size of a field of the SLIV is 7 bits.

Optionally, a specific correspondence between an SLIV and a start downlink symbol index S and a quantity L of consecutive symbols in downlink symbols is as follows:

If (L−1)≤7, SLIV=14× (L−1)+S.

If (L−1)≥7, SLIV=14× (14−L+1)+14−1−S. Herein, 0<L<14−S.

It may be understood that Table 6 and Table 7 are in a one-to-one correspondence, and a difference lies in that Table 6 explicitly notifies S and L, and Table 7 indicates S and L by using an SLIV.

In this embodiment of this application, one symbol configuration corresponds to one row in the symbol configuration list. The symbol configuration set is a set of one or more symbol configurations. A specific manner of determining the symbol configuration set may be as follows.

Optionally, a union set is obtained for an effective symbol configuration set corresponding to each of the one or more time units, to obtain the symbol configuration set corresponding to the one or more time units.

Optionally, for each symbol configuration in the symbol configuration list, effectiveness of the symbol configuration in a plurality of time units corresponding to the one or more time units is compared to determine whether the symbol configuration is effective, thereby further determining a symbol configuration set corresponding to the one or more time units and including effective symbol configurations.

Specifically, if the symbol configuration is an uplink symbol configuration, the symbol configuration set in the one or more time units does not include a first symbol configuration that is in the symbol configuration list and that meets the following condition: an uplink symbol corresponding to the first symbol configuration partially overlaps or completely overlaps a downlink symbol in each of the one or more time units, or an uplink symbol corresponding to the first symbol configuration partially overlaps or completely overlaps a downlink symbol in any of the one or more time units. The first symbol configuration may be understood as an ineffective uplink symbol configuration, or another symbol configuration may be an ineffective configuration. This is not limited in this application. It may be understood that the symbol configuration set includes a set of effective uplink symbol configurations. It should be noted that the symbol configuration set is a subset or a universal set of the symbol configuration set that does not include the first symbol configuration.

Specifically, if the symbol configuration is a downlink symbol configuration, the symbol configuration set in the one or more time units does not include a second symbol configuration that is in the symbol configuration list and that meets the following condition: a downlink symbol corresponding to the second symbol configuration partially overlaps or completely overlaps an uplink symbol in each of the one or more time units, or a downlink symbol corresponding to the second symbol configuration partially overlaps or completely overlaps an uplink symbol in any of the one or more time units. The second symbol configuration may be understood as an ineffective downlink symbol configuration, or another symbol configuration may be an ineffective configuration. This is not limited in this application. It may be understood that the symbol configuration set includes a set of effective downlink symbol configurations. It should be noted that the symbol configuration set is a subset or a universal set of the symbol configuration set that does not include the first symbol configuration.

Specifically, for uplink transmission, if a downlink symbol exists in symbols of an uplink symbol configuration corresponding to an uplink channel, the uplink channel cannot be sent, and therefore, the uplink symbol configuration is ineffective. For downlink transmission, if an uplink symbol exists in symbols of a downlink symbol configuration corresponding to a downlink channel, the downlink channel cannot be sent, and therefore, the downlink symbol configuration is ineffective.

In an implementation of this application, the first indication information indicates the time domain resource of the first reference signal. In this case, the terminal device determines the time domain resource of the first reference signal as the time domain resource of the reference signal based on the first indication information.

Optionally, the time domain resource of the first reference signal is one or more of the one or more candidate time domain resources that are obtained by the terminal device in step S101. For example, the one or more candidate time domain resources include a time domain resource index C1, a time domain resource index C2, a time domain resource index C3, and a time domain resource index C4. In this case, the time domain resource of the first reference signal is one or more of the four time domain resource indexes.

Compared with a case in which the time domain resource of the second reference signal is in the time domain resource of the first channel, the time domain resource of the first reference signal is more flexible. Specifically, the time domain resource of the first reference signal may be one or more symbols in one or more slots, the time domain resource of the first reference signal does not need to be in the time domain resource of the first channel, and the time domain resource of the first reference signal does not need to be related to a quantity of symbols in the time domain resource of the first channel.

In another implementation of this application, the first indication information indicates the time domain resource of the second reference signal, and the terminal device determines, based on the first indication information, that the time domain resource of the reference signal is the time domain resource of the second reference signal. The time domain resource of the second reference signal is one or more symbols in the time domain resource on which the first channel is located. The time domain resource on which the first channel is located may be a time domain resource in Table 1 to Table 5. Specifically, when the first indication information indicates the time domain resource of the second reference signal, the terminal device determines the time domain resource of the second reference signal based on information such as a quantity of consecutive symbols corresponding to a PDSCH or a PUSCH, additional DMRS position indication information, and a mapping type, and a predefined time domain resource of the reference signal in Table 1 to Table 5.

In still another implementation of this application, the first indication information indicates a time domain resource on which no reference signal exists in the one or more time units. If the first channel is an uplink channel, the terminal device does not send the reference signal in the one or more time units. If the first channel is a downlink channel, the terminal device does not receive the reference signal in the one or more time units. The time domain resource on which no reference signal exists in the one or more time units may be indicated by using a default value or a reserved value in the first indication information. Optionally, there is no time domain resource of a reference signal in the time domain resource on which the first channel is located.

Optionally, in this implementation, the method further includes the following step: receiving second configuration information, where the second configuration information is used to configure the network device to support a case in which there is no reference signal on the time domain resource of the first channel. After the terminal device receives the second configuration information, the first indication information received by the terminal device may indicate the time domain resource on which no reference signal exists in the one or more time units.

In this embodiment, transmission may be understood as sending or receiving.

Optionally, for downlink transmission, the method further includes: S103: The network device sends the first channel based on the downlink control information. Correspondingly, the terminal device receives the first channel based on the downlink control information.

Specifically, the network device further sends the first channel on the time domain resource on which the first channel is located. Correspondingly, the terminal device further receives the first channel on the time domain resource on which the first channel is located.

Optionally, when the first indication information indicates the time domain resource on which no reference signal exists in the one or more time units, the terminal device does not need to receive the reference signal in the one or more time units based on the downlink control information, and the terminal device may send the reference signal based on other downlink control information or higher layer signaling or in a predefined manner. Similarly, the network device does not need to send the reference signal in the one or more time units based on the downlink control information, and the network device may receive the reference signal based on other downlink control information or higher layer signaling or in a predefined manner.

Optionally, S103 further includes: The network device sends the reference signal based on the downlink control information. Correspondingly, the terminal device receives the reference signal based on the downlink control information.

The first indication information indicates the time domain resource of the first reference signal or the time domain resource of the second reference signal. The network device sends the reference signal based on the first indication information. Correspondingly, the first indication information indicates the time domain resource of the first reference signal or the time domain resource of the second reference signal. The terminal device receives the reference signal based on the first indication information.

In uplink transmission, as an alternative step of S103, the method further includes: The terminal device sends the first channel based on the downlink control information. Correspondingly, the network device receives the first channel. Optionally, an alternative step of S103 further includes: The terminal device sends the reference signal based on the downlink control information. Correspondingly, the network device receives the reference signal. For specific implementation, refer to downlink transmission. Details are not described herein.

Optionally, before S101, the method may further include the following step: The network device sends first configuration information. Correspondingly, the terminal device receives the first configuration information. The first configuration information is used to configure the terminal device to support transmission of the reference signal on the one or more candidate time domain resources; or is used to configure the terminal device to support receiving of the first indication information in the downlink control information.

Optionally, in step S101, if the one or more candidate time domain resources are configured by using higher layer signaling, any of the following implementations may be used:

Possible implementation 1: The higher layer signaling is configured for a slot.

Specifically, the network device configures the one or more candidate time domain resources for a slot transmission direction and/or a slot set. For example, that the network device configures the one or more candidate time domain resources for the slot transmission direction includes: sending first higher layer signaling, where the first higher layer signaling is used to configure one or more candidate time domain resources for transmitting a reference signal in an uplink slot; and/or sending second higher layer signaling, where the second higher layer signaling is used to configure one or more candidate time domain resources for transmitting a reference signal in a downlink slot. For another example, that the network device configures the one or more candidate time domain resources for the slot set includes: sending first higher layer signaling, where the first higher layer signaling is used to configure one or more candidate time domain resources for transmitting a reference signal in a first slot set and/or a second slot set. That is, different slot sets may be used to configure different time domain resources of the reference signal. A slot set includes one or more slots. The plurality of slots may be consecutive or nonconsecutive. This is not limited in this embodiment. According to this method, the time domain resource of the reference signal can be configured more flexibly. For example, an uplink transmission requirement and a downlink transmission requirement are different. Therefore, the time domain resource of the reference signal can be configured differently. If system resources of different slots are used differently, the time domain resource of the reference signal can be configured differently.

Possible implementation 2: The higher layer signaling is configured for a downlink control information format.

Specifically, the network device configures the one or more candidate time domain resources for the downlink control information format. The downlink control information format includes DCI format 0_1, DCI format 0_0, DCI format 1_0, and DCI format 1_1, or may be another format. This is not limited in this application. For example, first higher layer signaling is sent. The first higher layer signaling is used to configure one or more candidate time domain resources for transmitting a reference signal that correspond to a first DCI format. Second higher layer signaling is sent. The second higher layer signaling is used to configure one or more candidate time domain resources for transmitting a reference signal that correspond to a second DCI format. It may be understood that when a DCI format received by the terminal device is the first DCI format, the terminal device may determine that the one or more candidate time domain resources are the one or more candidate time domain resources that correspond to the first DCI format. On the contrary, when a DCI format received by the terminal device is the second DCI format, the terminal device may determine that the one or more candidate time domain resources are the one or more candidate time domain resources that correspond to the second DCI format. That is, different downlink control information may be used to configure candidate time domain resources of different reference signals. Herein, the first DCI format and the second DCI format each may be one of the foregoing several DCI formats. According to this method, the network device preconfigures a correspondence between a DCI format and one or more candidate time domain resources for transmitting a reference signal, and candidate time domain resources of different reference signals can be implicitly indicated by using the DCI format. In this way, an indicated range of the time domain resource of the reference signal is increased without further increasing a quantity of bits in the DCI. Therefore, system flexibility is improved, and system efficiency is improved. In particular, for an ultra-reliable and low latency communications (URLLC) service, a new DCI format may be introduced, so that the network device may configure, for DCI of the format, a time domain resource that is of a reference signal and that is applicable to the URLLC service, thereby improving transmission efficiency of URLLC information.

Possible implementation 3: The higher layer signaling is configured for a radio network temporary identifier (radio network temporary identifier, RNTI).

Specifically, the network device configures the one or more candidate time domain resources for the RNTI. The downlink control information is scrambled by using the RNTI before being transmitted, and it may be considered that DCI scrambled by using different RNTIs has different content and/or purposes. For example, first higher layer signaling is sent. The first higher layer signaling is used to configure one or more candidate time domain resources for transmitting a reference signal that correspond to a first RNTI. Second higher layer signaling is sent. The second higher layer signaling is used to configure one or more candidate time domain resources for transmitting a reference signal that correspond to a second RNTI. It may be understood that when the terminal device receives DCI scrambled by using the first RNTI, the terminal device determines that the one or more candidate time domain resources are the one or more candidate time domain resources that correspond to the first RNTI. On the contrary, when the terminal device receives DCI scrambled by using the second RNTI, the terminal device determines that the one or more candidate time domain resources are the one or more candidate time domain resources that correspond to the second RNTI. That is, different downlink control information may be used to configure different time domain resources of the reference signal. According to this method, the network device preconfigures a correspondence between an RNTI and one or more candidate time domain resources for transmitting a reference signal, and candidate time domain resources of different reference signals can be implicitly indicated by using the RNTI. In this way, an indicated range of the one or more candidate time domain resources is increased without further increasing a quantity of bits in the DCI. Therefore, system flexibility is improved, and system efficiency is improved. Optionally, modulation and coding scheme MCS information in the DCI scrambled by using the first RNTI corresponds to a first MCS table, and the first MCS table includes one piece of MCS information whose spectral efficiency is 0.0586. The second RNTI is an RNTI other than the first RNTI, for example, a cell radio network temporary identifier (C-RNTI). The first MCS table may be Table 8 or Table 9 below. It can be seen that the spectral efficiency 0.0586 in Table 8 or Table 9 corresponds to an MCS index 0. The foregoing is merely an example. In other examples, the MCS information whose spectral efficiency is 0.0586 may alternatively be represented in another form. This is not limited in this embodiment of this application. Based on the higher layer signaling, a value of q in Table 9 may be 1 or 2. In some examples, the first RNTI may be referred to as a modulation and coding scheme cell radio network temporary identifier (modulation and coding scheme C-RNTI, MCS-C-RNTI). The MCS-C-RNTI may indicate lower spectral efficiency, for example, may be applied to a URLLC service. When the first RNTI may be used to identify a service type, a more suitable time domain resource of a reference signal may be configured for the URLLC service, thereby improving transmission efficiency of URLLC information.

TABLE 8

| MCS index $I_{MCS}$ | Modulation order $Q_m$ | Target coding rate Rx[1024] | Spectral efficiency |
| --- | --- | --- | --- |
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | Reserved value | |
| 30 | 4 | Reserved value | |
| 31 | 6 | Reserved value | |

TABLE 9

| MCS index $I_{MCS}$ | Modulation order $Q_m$ | Target coding rate Rx[1024] | Spectral efficiency |
| --- | --- | --- | --- |
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |

TABLE 9-continued

| MCS index $I_{MCS}$ | Modulation order $Q_m$ | Target coding rate Rx[1024] | Spectral efficiency |
|---|---|---|---|
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | Reserved value | |
| 29 | 2 | Reserved value | |
| 30 | 4 | Reserved value | |
| 31 | 6 | Reserved value | |

Possible implementation 4: The higher layer signaling is configured for a mapping type of the first channel.

Specifically, the network device configures the one or more candidate time domain resources for the mapping type of the first channel. The first channel includes a PDSCH and/or a PUSCH. The mapping type of the first channel includes the foregoing mapping type A and the foregoing mapping type B, or may be another mapping type. This is not limited in this application. For example, first higher layer signaling is sent. The first higher layer signaling is used to configure one or more candidate time domain resources for transmitting a reference signal that correspond to a first mapping type. Second higher layer signaling is sent. The second higher layer signaling is used to configure one or more candidate time domain resources for transmitting a reference signal that correspond to a second mapping type. It may be understood that when a mapping type of the first channel received by the terminal device is the first mapping type, the terminal device may determine that the one or more candidate time domain resources that correspond to the first channel are the one or more candidate time domain resources that correspond to the first mapping type. On the contrary, when a mapping type of the first channel received by the terminal device is the second mapping type, the terminal device may determine that the one or more candidate time domain resources that correspond to the first channel are the one or more candidate time domain resources that correspond to the second mapping type. Currently, time domain resources that are of reference signals and that correspond to different mapping types are predefined. According to this method, the network device preconfigures a correspondence between a mapping type and one or more candidate time domain resources for transmitting a reference signal, and one or more candidate time domain resources of different reference signals can be implicitly indicated by using the mapping type. In this way, an indicated range of the time domain resource of the reference signal is increased without further increasing a quantity of bits in the DCI. Therefore, system flexibility is improved, and system efficiency is improved. In particular, for a URLLC service, a new DCI format may be introduced, so that the network device may configure, for DCI of the format, a time domain resource that is of a reference signal and that is applicable to the URLLC service, thereby improving transmission efficiency of URLLC information.

Possible implementation 5: The higher layer signaling is configured for a search space of the downlink control information.

Specifically, the network device configures the one or more candidate time domain resources for the search space of the downlink control information. The search space of the downlink control information includes a common search space and a UE-specific search space. For example, first higher layer signaling is sent. The first higher layer signaling is used to configure one or more candidate time domain resources for transmitting a reference signal that correspond to a first search space. Second higher layer signaling is sent. The second higher layer signaling is used to configure one or more candidate time domain resources for transmitting a reference signal that correspond to a second search space. The first search space and the second search space may be the foregoing common search space or the foregoing UE-specific search space. It may be understood that when a search space in which the DCI received by the terminal device is located is the first search space, the terminal device may determine that the one or more candidate time domain resources that correspond to the first channel are the one or more candidate time domain resources that correspond to the first search space. On the contrary, when a search space in which the DCI received by the terminal device is located is the second search space, the terminal device may determine that the one or more candidate time domain resources that correspond to the first channel are the one or more candidate time domain resources that correspond to the second search space. Specifically, if DCI detected in the common search space is common DCI, the reference signal may be sparsely configured; or if DCI detected in the UE-specific search space is a special service, the reference signal may be densely configured.

According to the communications method provided in this embodiment of this application, the network device uses the first configuration information to enable the terminal device to select the time domain resource of the reference signal to transmit the reference signal by using the solution in this application. When the terminal device does not receive the first configuration information, or the terminal device receives the second configuration information of the network device, and the second configuration information is used to configure a case in which the terminal device cannot transmit the reference signal on the one or more candidate time domain resources, the terminal device may transmit the reference signal by using the time domain resource of the reference signal in Table 1 to Table 5. In another communications method, the network device uses the first configuration information to enable the terminal device to support receiving of the first indication information in the downlink reference signal. When the terminal device does not receive the first configuration information, or the terminal device receives the second configuration information of the network device, and the second configuration information is used to configure a case in which the terminal device cannot receive the first indication information in the downlink reference signal, the terminal device may receive the reference signal by using the time domain resource of the reference signal in Table 1 to Table 5. It may be understood that in uplink transmission, that the terminal device transmits the reference signal is that the terminal device sends the reference signal, and in downlink transmission, that the terminal device transmits the reference signal is that the terminal device receives the reference signal. The first configuration information and the second configuration information are higher layer signaling. Therefore, the network device can accurately indicate a flexibly configured time domain resource of a reference signal by using relatively low overheads, and the terminal device can accurately determine information about the flexibly configured time domain resource of the reference signal, thereby improving system transmission efficiency.

Figure 5:
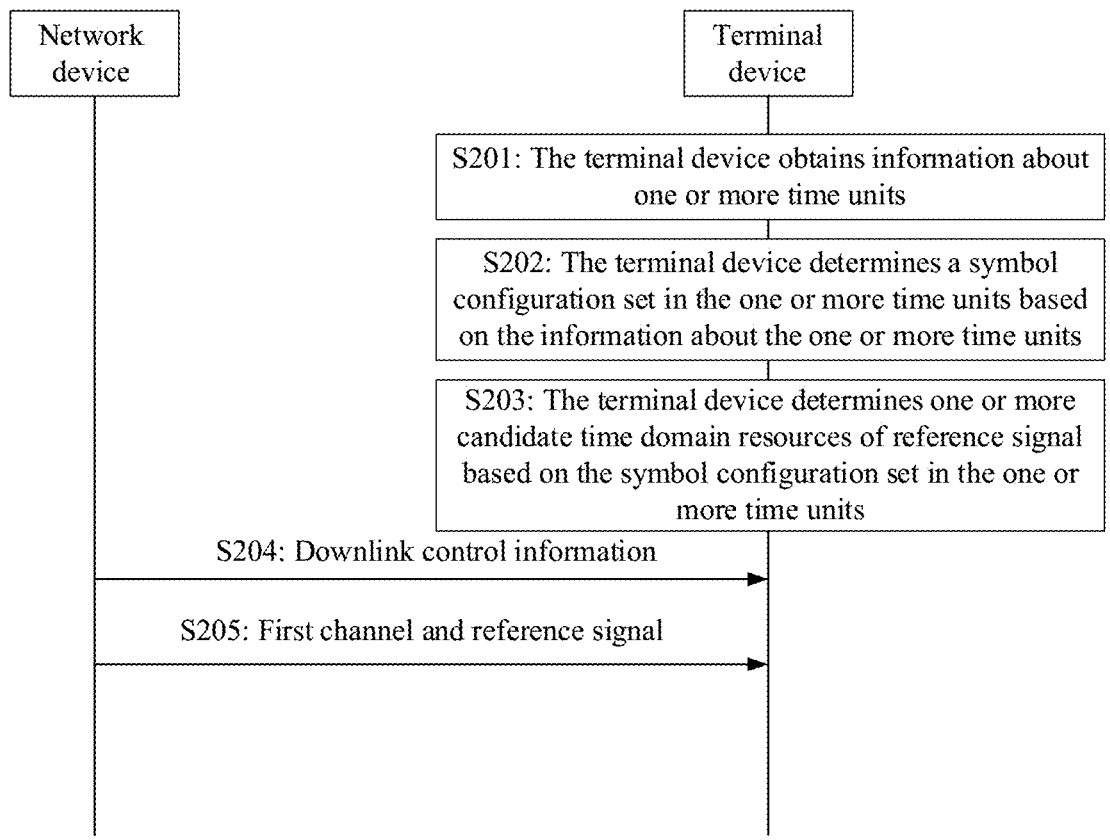
FIG. 5 is a schematic diagram of an interaction process of another communications method according to an embodiment of this application.

FIG. 5 is a schematic flowchart of another communications method according to an embodiment of this application. The method may include the following steps.

S201: A terminal device obtains information about one or more time units.

A length of one time unit may include one or more time domain resources. The one or more time units may be configured by using higher layer signaling, may be predefined, or may be determined based on DCI.

Optionally, the terminal device receives higher layer signaling or DCI, and the higher layer signaling or the DCI is used to determine the information about the one or more time units. In this embodiment of this application, the higher layer signaling or the DCI may explicitly indicate the information about the one or more time units, or implicitly indicate the information about the one or more time units. This is not limited in this embodiment. For explicit indication, the higher layer signaling or the DCI may include a dedicated information field or bit field for indicating the information about the one or more time units. For implicit indication, the higher layer signaling or the DCI does not include a dedicated information field or bit field for indicating the information about the one or more time units. Instead, the information about the one or more time units may be obtained by using information in another information field or bit field.

Optionally, the one or more time units may be predefined, and the terminal device obtains information that is about the predefined one or more time units and that is stored by the terminal device.

Optionally, the one or more time units may include one or more of the following: a slot in which a first channel is located, a slot adjacent to the slot in which the first channel is located, and a slot that is separated by E5 slots from the slot in which the first channel is located, where E5 is a non-negative integer. For example, E5 is one of 0, 1, 2, 3, 4, 5, 6, 7, 8, 9, and 10. Optionally, a value of E5 is related to a subcarrier spacing index of the first channel. Specifically, there is a linear relationship between the value of E5 and the subcarrier spacing index of the first channel. For example, E5 is 1*(the subcarrier spacing index of the first channel+1), 2*(the subcarrier spacing index of the first channel+1), 3*(the subcarrier spacing index of the first channel+1), 4*(the subcarrier spacing index of the first channel+1), or the like. In this embodiment of this application, a subcarrier spacing index corresponding to a subcarrier spacing of 15 kHz is 0, a subcarrier spacing index corresponding to a subcarrier spacing of 30 kHz is 1, a subcarrier spacing index corresponding to a subcarrier spacing of 60 kHz is 2, and a subcarrier spacing index corresponding to a subcarrier spacing of 120 kHz is 3. In this embodiment of this application, there may be another correspondence between a subcarrier spacing and an index number. This is not limited in this embodiment of this application.

S202: The terminal device determines a symbol configuration set in the one or more time units based on the information about the one or more time units.

It may be understood that the one or more time units are a time domain range of the symbol configuration set. Specifically, a symbol configuration list (which includes an uplink symbol configuration list and a downlink symbol configuration list) may be a symbol configuration list predefined or preconfigured by using the higher layer signaling. The symbol configuration set is a subset or a universal set of the symbol configuration list.

Optionally, a union set is obtained for an effective symbol configuration set corresponding to each of the one or more time units, to obtain the symbol configuration set corresponding to the one or more time units.

Optionally, for each symbol configuration in the symbol configuration list, effectiveness of the symbol configuration in a plurality of time units corresponding to the one or more time units is compared to determine whether the downlink symbol configuration is effective, thereby further determining a symbol configuration set corresponding to the one or more time units and including effective symbol configurations.

For detailed description of the symbol configuration set and the symbol configuration list, refer to related content of the embodiment shown in FIG. 3. Details are not described herein.

S203: The terminal device determines one or more candidate time domain resources for transmitting a reference signal based on the symbol configuration set in the one or more time units.

The one or more candidate time domain resources may be one or more symbols in the symbol configuration set: the $1^{st}$ symbol in a symbol configuration corresponding to an earliest start symbol in the symbol configuration set; the last symbol in a symbol configuration corresponding to a latest start symbol in the symbol configuration set; the last symbol in the symbol configuration corresponding to the earliest start symbol in the symbol configuration set; the $1^{st}$ symbol in the symbol configuration of the latest start symbol in the symbol configuration set; the $1^{st}$ symbol in the symbol configuration corresponding to the earliest end symbol in the symbol configuration set; the last symbol in the symbol configuration corresponding to the latest end symbol in the symbol configuration set; the last symbol in the symbol configuration corresponding to the earliest end symbol in the symbol configuration set; the $1^{st}$ symbol in the symbol configuration of the latest end symbol in the symbol configuration set; the $1^{st}$ symbol in each symbol configuration in the symbol configuration set; and the last symbol in each symbol configuration in the symbol configuration set.

Optionally, S203 includes the following step: dividing the symbol configuration set into one or more symbol configuration subsets; and determining the one or more candidate time domain resources based on the one or more symbol configuration subsets.

Specifically, each symbol configuration subset includes one or more symbol configurations. In a specific implementation, the terminal device may classify overlapped effective symbol configurations in the symbol configuration set into one symbol configuration subset.

In a possible manner 1, a network device and the terminal device may group symbol configurations in the symbol configuration set GROUP in the following method, to obtain a plurality of symbol configuration subsets Subset (j). Herein, j is an index of the symbol configuration subset Subset (j) in GROUP, and j is a non-negative integer.

(1) An initial value of j is set to 0.

(2) It is determined that a minimum value in a symbol index of the last symbol corresponding to a symbol configuration in GROUP is n. It may be understood that the symbol index of the last symbol corresponding to the symbol configuration is determined based on index information of a start symbol in the symbol configuration and information about a quantity of consecutive symbols. In other words, the symbol index of the last symbol is a sum of an index of the start symbol and the quantity of consecutive symbols minus one.

(3) A symbol configuration in which a symbol index of a start symbol is less than or equal to n in GROUP is assigned to a same symbol configuration subset Subset (j).

GROUP is updated: A symbol configuration in Subset (j) is deleted from GROUP.

The value of j is updated to j+1.

(4) Steps (2) and (3) are repeated until GROUP becomes an empty set.

In a possible manner 2, the network device and the terminal device may group symbol configurations in the symbol configuration set GROUP in the following method, to obtain a plurality of symbol configuration subsets Subset (j). Herein, j is an index of the symbol configuration subset Subset (j) in GROUP, and j is a non-negative integer.

(1) An initial value of j is set to 0.

(2) It is determined that a maximum value in a symbol index of the $1^{st}$ symbol corresponding to a symbol configuration in GROUP is m. It may be understood that the symbol index of the $1^{st}$ symbol corresponding to the symbol configuration is determined based on index information of a start symbol in the symbol configuration. In other words, the symbol index of the $1^{st}$ symbol is an index of the start symbol.

(3) A symbol configuration in which a symbol index of a start symbol is greater than or equal to m in GROUP is assigned to a same symbol configuration subset Subset (j).

GROUP is updated: A symbol configuration in Subset (j) is deleted from GROUP.

The value of j is updated to j+1.

(4) Steps (2) and (3) are repeated until GROUP becomes an empty set.

Figure 6:
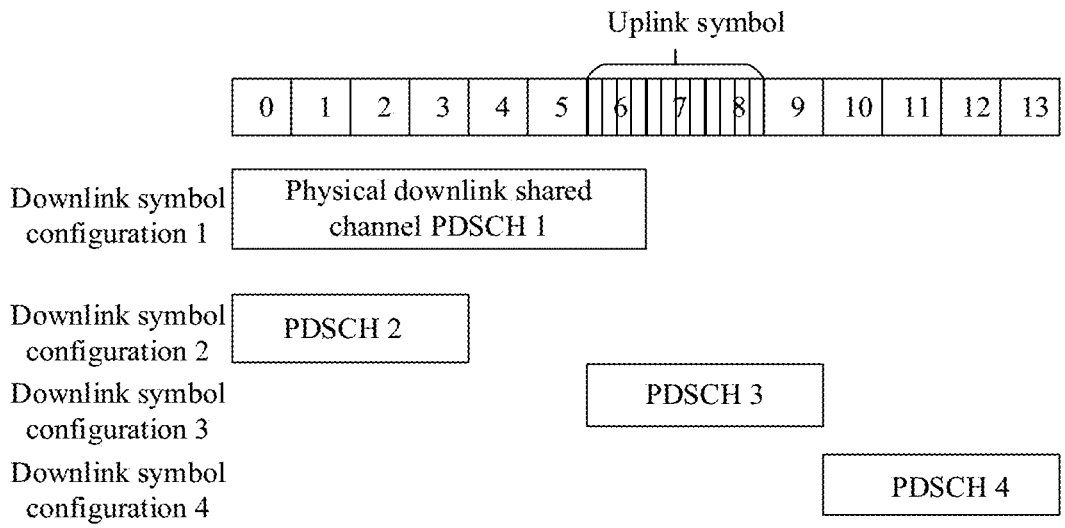
FIG. 6 is a schematic diagram of an example symbol configuration set.
Figure 7:
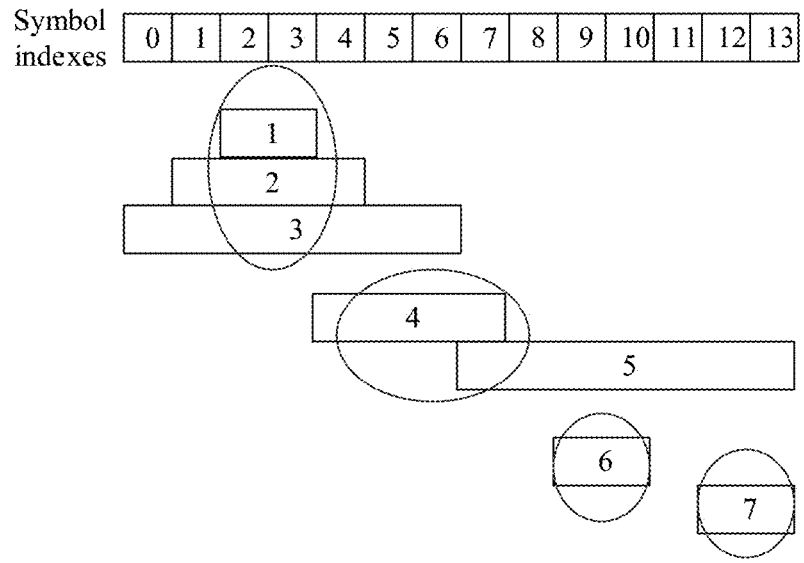
FIG. 7 is a schematic diagram of example division into a symbol configuration subset.

In the foregoing process of grouping the symbol configurations in the symbol configuration set GROUP, GROUP may be assigned to a temporary variable GROUP_TEMP before grouping, and the operation on GROUP in the foregoing process is replaced with an operation on GROUP_TEMP, so that GROUP remains unchanged in the grouping process. The possible manner 1 or manner 2 is used, and FIG. 6 is used as an example. The symbol configuration set includes four symbol configurations, and effective symbol configurations include two symbol configurations: a PDSCH 2 and a PDSCH 4. The terminal device may classify overlapped effective symbol configurations into one symbol configuration subset, and one time domain resource in each subset is a candidate time domain resource of reference signal. FIG. 7 is used as an example, and four subsets are obtained through division. Specifically, in the foregoing description, uplink transmission is used as an example. The symbol configuration subset is an uplink symbol configuration subset, the symbol configuration set is an uplink symbol configuration set, the symbol configuration is an uplink symbol configuration, the last symbol is the last uplink symbol, and the start symbol is a start uplink symbol. Similarly, downlink transmission is used as an example. The symbol configuration subset is a downlink symbol configuration subset, the symbol configuration set is a downlink symbol configuration set, the symbol configuration is a downlink symbol configuration, the last symbol is the last downlink symbol, and the start symbol is a start downlink symbol.

The one or more candidate time domain resources may be predefined as one or more symbols in each symbol configuration subset in the symbol configuration set, or one or more symbols in all symbols in the symbol configuration set. For example, the one or more candidate time domain resources are one or more of the following symbols in the one or more symbol configuration subsets: the $1^{st}$ symbol in an earliest symbol configuration subset in the one or more symbol configuration sets; the last symbol in the last symbol configuration subset in the one or more symbol configuration sets; the last symbol in the earliest symbol configuration subset in the one or more symbol configuration sets; the $1^{st}$ symbol in the last symbol configuration subset in the one or more symbol configuration sets; the $1^{st}$ symbol in each symbol configuration subset in the one or more symbol configuration sets; and the last symbol in each symbol configuration subset in the one or more symbol configuration sets. The earliest symbol configuration subset may be a symbol configuration subset with a smallest subset index number, a symbol configuration subset with a largest subset index number, a symbol configuration subset corresponding to the earliest start symbol, or a symbol configuration subset corresponding to the earliest end symbol. The last symbol configuration subset may be the symbol configuration subset with the smallest subset index number, the symbol configuration subset with the largest subset index number, the symbol configuration subset corresponding to the latest start symbol, or the symbol configuration subset corresponding to the latest end symbol.

The one or more candidate time domain resources may be configured by using higher layer signaling, and specifically, are one or more symbols in each symbol configuration subset configured by using the higher layer signaling in the symbol configuration set, or one or more symbols in all symbols configured by using the higher layer signaling in the symbol configuration set. Specifically, the higher layer signaling may be used to determine a ranking of a symbol that is in each symbol configuration subset and on which the one or more candidate time domain resources are located, or a ranking of a symbol in all symbols in the symbol configuration set, may be used to determine a symbol index and/or a slot index of the one or more candidate time domain resources in the symbol configuration set, or may be used to determine a period and/or a symbol index of the one or more candidate time domain resources in the symbol configuration set.

S204: The network device sends downlink control information.

Correspondingly, the terminal device receives the downlink control information.

The downlink control information includes first indication information. The first indication information is used to indicate one or more pieces of the following information: a time domain resource of a first reference signal, where the time domain resource of the first reference signal is one or more time domain resources in the one or more candidate time domain resources; a time domain resource of a second reference signal, where the time domain resource of the second reference signal is one or more symbols in a time domain resource on which the first channel is located; or a time domain resource on which no reference signal exists in the one or more time units.

The one or more candidate time domain resources are the time domain resource determined based on the symbol configuration set in the one or more time units in S203, or the time domain resource determined based on the one or more symbol configuration subsets in S203. Optionally, the one or more candidate time domain resources include a plurality of time domain resources, and in this step, the downlink control information is used to specifically indicate one of the time domain resources.

Optionally, for downlink transmission, the method further includes: S205: The network device sends the first channel based on the downlink control information. Correspondingly, the terminal device receives the first channel based on the downlink control information. Optionally, S205 further includes: The network device sends a reference signal based on the first indication information. Correspondingly, the terminal device receives the reference signal based on the first indication information. For details, refer to the descriptions in the foregoing embodiment. Details are not described herein.

Optionally, for uplink transmission, an alternative step of S205 includes: The network device receives the first channel. Correspondingly, the terminal device sends the first channel. Optionally, S205 further includes: The network device receives the reference signal based on the first indication information. Correspondingly, the terminal device sends the reference signal based on the first indication information. For details, refer to the descriptions in the foregoing embodiment. Details are not described herein.

According to the communications method provided in this embodiment of this application, when a plurality of PUSCH or PDSCH lengths are flexibly configured in an NR system, the effective symbol configuration is used to determine the one or more candidate time domain resources, to avoid a reverse symbol position (for example, a PDSCH avoids an uplink symbol and a PUSCH avoids a downlink symbol), so that an effective position at which the reference signal can be sent can be flexibly determined.

Figure 8:
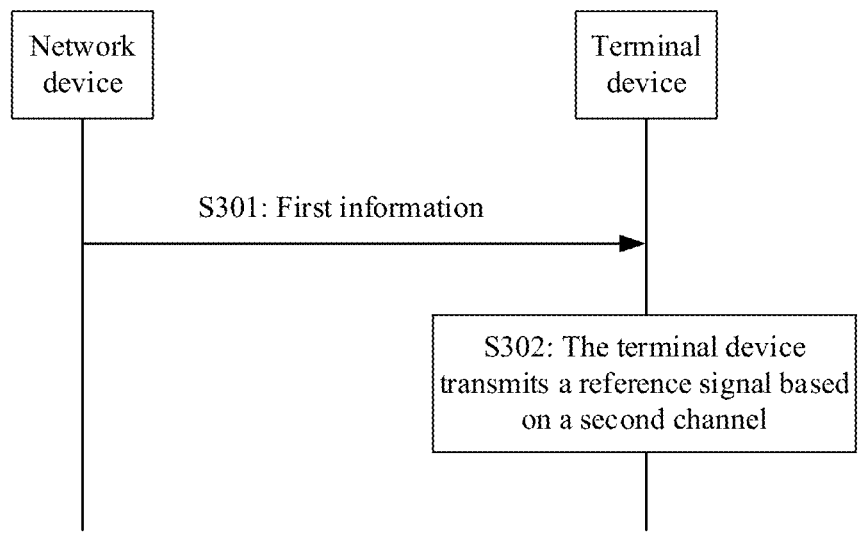
FIG. 8 is a schematic diagram of an interaction process of still another communications method according to an embodiment of this application.

FIG. 8 is a schematic flowchart of still another communications method according to an embodiment of this application. The method may include the following steps.

S301: A network device sends first information.

Correspondingly, a terminal device receives the first information.

The first information is used to indicate the terminal device to transmit N first channels. N is an integer greater than or equal to 2. Herein, transmitting a channel includes receiving a channel or sending a channel. The first information may be downlink control information and/or higher layer signaling. As shown in FIG. 4a, for downlink transmission, the network device sends the first channel based on the first information, and the terminal device receives the first channel based on the first information. As shown in FIG. 4b, for uplink transmission, the terminal device sends the first channel based on the first information, and the network device receives the first channel based on the first information. For specific sending and receiving of the downlink control information, refer to S102 in the embodiment shown in FIG. 3. Details are not described herein. For example, the first channel is a PUSCH channel.

In uplink transmission, S302: The terminal device sends a reference signal based on a second channel.

Correspondingly, the network device receives the reference signal.

The second channel is the $X^{th}$ first channel in the N first channels in time domain order in a time unit. X is an integer greater than or equal to 1, and X is less than or equal to N.

The time unit may be one or more symbols, may be one or more slots, or may be a time unit in which the N first channels are located.

Optionally, the second channel is the $X^{th}$ first channel in the N first channels in time domain order in each time unit. It may be understood that when a time domain resource of the N first channels includes a plurality of time units, the reference signal is transmitted on a second channel in each time unit. It may be understood that X corresponding to the second channel in all the time units may have a same value, or different values.

Optionally, S302 includes: The terminal device sends, based on the second channel, the reference signal on a first symbol in a time domain resource on which the second channel is located. Alternatively, S302 includes: The terminal device sends, based on the second channel, the reference signal on a first symbol before a time domain resource on which the second channel is located.

As an alternative step of S302, in downlink transmission, the network device sends the reference signal based on the second channel.

Correspondingly, the terminal device receives the reference signal based on the second channel.

Optionally, S302 includes: The terminal device receives, based on the second channel, the reference signal on the first symbol in the time domain resource on which the second channel is located. Alternatively, S302 includes: The terminal device receives, based on the second channel, the reference signal on the first symbol before the time domain resource on which the second channel is located.

Optionally, the first symbol is the $Y^{th}$ symbol in time domain order in the time domain resource on which the second channel is located, Y is a positive integer greater than or equal to 1, and a quantity of the first symbols is less than or equal to N. For example, if the time domain resource on which the second channel is located is a symbol 7 to a symbol 11, and Y is 2, the first symbol is a symbol 8.

Optionally, the first symbol is the $Y^{th}$ symbol before the time domain resource on which the second channel is located. In other words, the first symbol is the $Y^{th}$ symbol before a start symbol of the second channel. Herein, Y is a positive integer greater than or equal to 1, and a quantity of first symbols is less than or equal to N. For example, if the start symbol of the second channel is a symbol 7, and Y is 1, the first symbol is a symbol 6.

In an implementation, the first information indicates two or more first channels. The two or more first channels carry a same transport block, and a time domain resource of the reference signal includes a first symbol in a time domain resource on which a second channel in the two or more first channels is located. The second channel is a first channel that meets one or more of the following conditions: an earliest first channel in time domain, a first channel corresponding to a first redundancy version, and the $X^{th}$ first channel, where X is a quantity of channels less than or equal to a quantity of the two or more first channels. It may be understood that the earliest first channel in time domain may be understood as a first channel corresponding to an earliest start symbol or end symbol in time domain. For the first channel corresponding to the first redundancy version, it may be understood that a redundancy version corresponding to data transmitted on the first channel is the first redundancy version. The first symbol is one or more of the following: the $1^{st}$ symbol, the last symbol, and the first X1 symbols. X1 is a positive integer greater than or equal to 1, and X1 is less than or equal to the quantity of the two or more first channels. The first symbol and the second channel may be other cases. This is not limited in this application.

Optionally, a symbol interval between start symbols in time domain resources on which at least two first channels in the two or more first channels are located is less than 14 symbols. Optionally, there are at least a first channel A and a first channel B in the two or more first channels, and a start symbol of a time domain resource on which the first channel A is located is the P t symbol after an end symbol of a time domain resource on which the first channel B is located.

Optionally, the first information includes a repetition quantity of the first channel and/or information about a time domain resource on which one or more of the N first channels are located. Optionally, time domain resources on which a plurality of first channels are located may have same information, and the first information may include information about a time domain resource on which one first channel is located.

It may be understood that the second channel is an effective channel. The effective channel includes an effective uplink channel and an effective downlink channel. The effective uplink channel means that if the first channel is an uplink channel, a time domain resource on which a specific channel is located does not include any downlink symbol. The effective downlink channel means that if the first channel is a downlink channel, a time domain resource on which a specific channel is located does not include any uplink symbol. The first symbol is an effective symbol. The effective symbol means that if the first channel is an uplink channel, the first symbol is an uplink symbol; or if the first channel is a downlink channel, the first symbol is a downlink symbol.

Alternatively, the first redundancy version may be 0 and/or 3. It may be understood that when a redundancy version corresponding to the first channel is not the redundancy version 0 and/or the redundancy version 3, there may or may not be a reference signal on the time domain resource on which the first channel is located; when a redundancy version corresponding to the first channel is the redundancy version 0 and/or the redundancy version 3, there may be a reference signal on or before the time domain resource on which the first channel is located. The redundancy version 0 and the redundancy version 3 in the NR system correspond to data transmission that carries all decoding information. Therefore, the data transmission corresponding to the redundancy version 0 and the redundancy version 3 is relatively important. In other words, the first channel corresponding to the two redundancy versions carries a reference signal, so that a receiving device demodulates and decodes the data transmission by using the reference signal. Further, in an implementation, the $1^{st}$ symbol on a first channel corresponding to the redundancy version 0 and/or a first channel corresponding to the redundancy version 3 is used to transmit a DMRS. In another implementation, the first X2 symbols before a start symbol of a time domain resource on which a first channel corresponding to the redundancy version 0 is located and/or a start symbol of a time domain resource on which a first channel corresponding to the redundancy version 3 is located are used to transmit a DMRS. It may be understood that no reference signal is transmitted on a first channel in the plurality of first channels that does not correspond to the first redundancy version. In another implementation, the first redundancy version is 1 and/or 2.

Optionally, the $1^{st}$ symbol in the foregoing examples may be the $(X2)^{th}$ symbol, and X2 is a positive integer greater than or equal to 1. Optionally, X2 is one or more of 1, 2, 3, 4, 5, 6, 7, 8, 9, 10, 11, 12, 13, and 14. X2 may be predefined or configured by using higher layer signaling. Optionally, the $1^{st}$ symbol in the foregoing examples may be the last symbol on a specific channel. This is not limited in this application. It may be understood that no reference signal is transmitted on another symbol of the specific channel.

Optionally, before the network device or the terminal device transmits the reference signal, the method further includes: The terminal device sends capability information to the network device. The capability information is used to indicate that the terminal device has a capability of transmitting the reference signal on some of the N first channels. Correspondingly, the network device receives the capability information. In other words, it may be understood that the terminal device has a capability of transmitting the reference signal on or before the time domain resource on which the second channel is located. Further, the capability information may alternatively be used to indicate that the terminal device does not have the capability of transmitting the reference signal on some of the N first channels. To be specific, the terminal device needs to transmit the reference signal on each of the N first channels.

Optionally, the method further includes: The network device sends second information. Correspondingly, the terminal device receives the second information. The second information is used to indicate that some of the N first channels are available to the terminal device to transmit the reference signal.

Optionally, the terminal device receives third information, and the third information is used to indicate that some of the N first channels are not available to the terminal to transmit the reference signal. When the terminal device receives the third information, the terminal device needs to transmit the reference signal on each of the N first channels.

The second information and the third information may be information in the downlink control information or information in the higher layer signaling. This is not limited in this application.

Optionally, before S302, the method further includes the following step: The network device sends first indication information. The first indication information is used to indicate to transmit the reference signal. Correspondingly, the terminal device receives the first indication information. It may be understood that in this step, if the first indication information received by the terminal device does not indicate to transmit the reference signal, the terminal device does not transmit the reference signal on a specific channel.

It may be understood that in the implementation shown in FIG. 8, the reference signal may be one or more of the candidate reference signals in another implementation of this application. For a method for obtaining the time domain resource of the reference signal, refer to specific descriptions in another implementation of this application. Details are not described herein.

According to the communications method provided in this embodiment of this application, the network device sends the first information, the first information indicates two or more first channels, and the reference signal is transmitted on a time domain resource of the reference signal on one of the two or more first channels. Therefore, the network device can accurately indicate the time domain resource of the reference signal by using relatively low overheads, and the network device/the terminal device transmits the reference signal on the time domain resource of the reference signal, thereby improving system transmission efficiency. For example, when the first channel is repeatedly transmitted, if the foregoing communications method is used, the reference signal does not need to be transmitted on each first channel, thereby reducing system overheads, and improving transmission efficiency.

Figure 9:
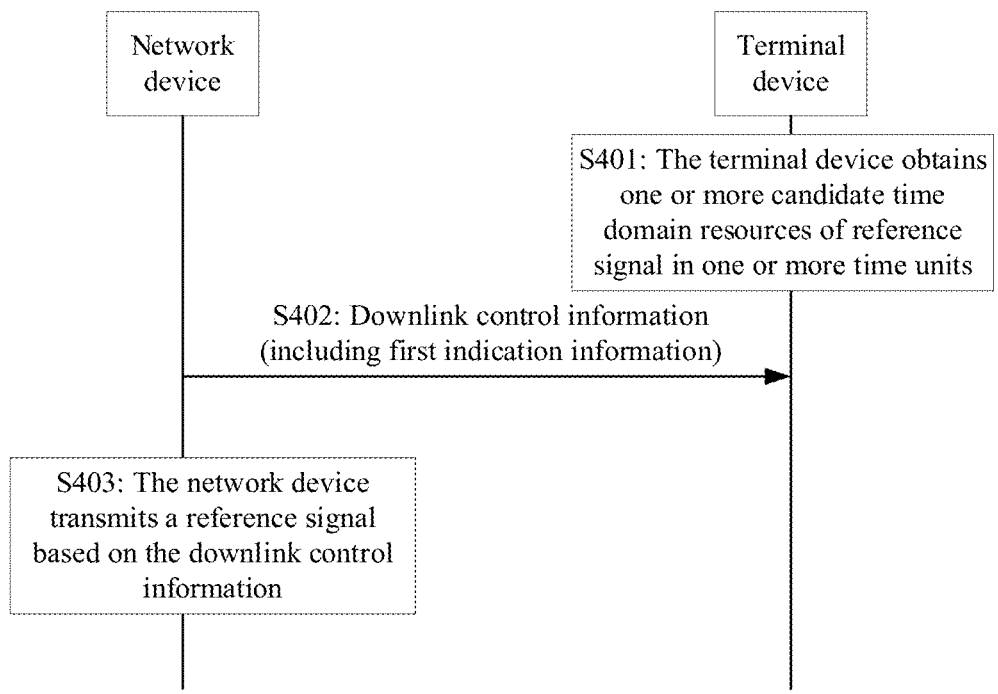
FIG. 9 is a schematic diagram of an interaction process of still another communications method according to an embodiment of this application.

FIG. 9 is a schematic flowchart of still another communications method according to an embodiment of this application. The method may include the following steps.

S401: A terminal device obtains one or more candidate time domain resources for transmitting a reference signal in one or more time units.

In downlink transmission, a network device needs to send a reference signal, and the terminal device needs to receive the reference signal. In S401, the terminal device and/or the network device obtain/obtains the one or more candidate time domain resources in the one or more time units. Correspondingly, in uplink transmission, the terminal device needs to send a reference signal, and the network device needs to receive the reference signal. Therefore, the network device and/or the terminal device obtain/obtains the one or more candidate time domain resources in the one or more time units.

For specific implementation of step S401, refer to step S101 in the embodiment shown in FIG. 3. Details are not described herein.

S402: The network device sends downlink control information.

Correspondingly, the terminal device receives the downlink control information.

The downlink control information includes first indication information.

The first indication information is used to indicate one or more pieces of the following information:
- a time domain resource of a first reference signal, where the time domain resource of the first reference signal is one or more time domain resources in the one or more candidate time domain resources;
- a time domain resource of a second reference signal, where the time domain resource of the second reference signal is one or more symbols in a time domain resource on which a first channel is located; or
- a time domain resource on which no reference signal exists in the one or more time units.

In this embodiment, a time domain resource used to transmit the reference signal may be the time domain resource of the first reference signal, or may be the time domain resource of the second reference signal. In addition, there may also be a time domain resource on which no reference signal exists in the one or more time units. An index of a time domain resource of a reference signal in Table 1 to Table 5 is predefined, and the one or more candidate time domain resources are obtained by the terminal device before receiving the reference signal.

Different from the embodiment shown in FIG. 3, the downlink control information includes the first indication information, but does not include transmission information of a first uplink channel. For another specific implementation of step S402, refer to step S102 in the embodiment shown in FIG. 3. Details are not described herein.

In an implementation of this application, the first indication information indicates the time domain resource of the first reference signal, and the terminal device determines, based on the first indication information, that the time domain resource of the reference signal is the time domain resource of the first reference signal.

In another implementation of this application, the first indication information indicates the time domain resource of the second reference signal, and the terminal device determines, based on the first indication information, that the time domain resource of the reference signal is the time domain resource of the second reference signal.

In still another implementation of this application, the first indication information indicates a time domain resource on which no reference signal exists in the one or more time units. If the first channel is an uplink channel, the terminal device does not send the reference signal in the one or more time units. If the first channel is a downlink channel, the terminal device does not receive the reference signal in the one or more time units.

Because the downlink control information includes only the first indication information in step S402, optionally, in downlink transmission, the method further includes: S403: The network device sends the reference signal based on the downlink control information. Correspondingly, the terminal device receives the reference signal based on the downlink control information.

In uplink transmission, as an alternative step of S403, the method further includes: The terminal device sends the reference signal based on the downlink control information. Correspondingly, the network device receives the reference signal.

For a specific implementation of step S403, refer to step S103 in the embodiment shown in FIG. 3. Details are not described herein.

According to the communications method provided in this embodiment of this application, the network device indicates, by using the downlink control information, the time domain resource used to transmit the reference signal; or the time domain resource on which no reference signal exists in the one or more time units. The network device can accurately indicate a flexibly configured time domain resource of a reference signal by using relatively low overheads, and the terminal device can accurately determine information about the flexibly configured time domain resource of the reference signal, thereby improving system transmission efficiency. In some implementations of this application, the first indication information further includes an offset value between the time domain resource of the first reference signal and the time domain resource of the first channel, and the offset value includes one or more of the following:
- a slot offset value between a slot in which the time domain resource of the first reference signal is located and a slot in which the first channel is located;
- a symbol offset value between a start symbol of the time domain resource of the first reference signal and a start symbol of the first channel;
- a symbol offset value between a start symbol of the time domain resource of the first reference signal and an end symbol of the first channel; and
- a symbol offset value between an end symbol of the time domain resource of the first reference signal and an end symbol of the first channel.

In some implementations of this application, when the first indication information is used to indicate the time domain resource of the first reference signal, the first indication information further includes slot information and/or symbol information. The slot information includes one or more of the following: an absolute slot index and a slot offset index relative to the slot in which the first channel is located. The symbol information includes one or more of the following: an absolute symbol index, a symbol offset index relative to the start symbol of the first channel, and a symbol offset index relative to the end symbol of the first channel.

The slot information is the absolute slot index. For example, if the absolute slot index is a slot index D1, the time domain resource that is of the reference signal and that is indicated by the first indication information is one or more symbols on the slot index D1 in the one or more time units. Herein, D1 is a non-negative integer.

The slot information is the slot offset index relative to the slot in which the first channel is located. For example, the slot information is the $(D3)^{th}$ slot after the slot in which the first channel is located, or the $(D2)^{th}$ slot before the slot in which the first channel is located. Herein, D2 and D3 are non-negative integers.

The symbol information is an absolute symbol index. For example, if the absolute symbol index is a symbol index E1, the first indication information indicates that the time domain resource of the first reference signal is the symbol index E1 in one or more slots in the one or more time units. In other words, it may be understood that the $(E1+1)^{th}$ symbol in the one or more slots is the time domain resource that is of the reference signal and that is indicated by the first indication information. Herein, E1 is a non-negative integer. For example, E1 may be one of 0, 1, 2, 3, 4, 5, 6, 7, 8, 9, 10, 11, 12, and 13.

The symbol information is the symbol offset index relative to the start symbol or the end symbol of the first channel. For example, the symbol information is the $1^{st}$ symbol of the time domain resource in which the first channel is located, the last symbol of the time domain resource in which the first channel is located, the $1^{st}$ symbol after an end symbol of the time domain resource in which the first channel is located, the $(E2)^{th}$ symbol before a start symbol of the time domain resource in which the first channel is located, or the $(E2)^{th}$ symbol after an end symbol of the time domain resource in which the first channel is located. Herein, E2 is a positive integer. For example, E2 may be one of 1, 2, 3, 4, 5, 6, 7, 8, 9, 10, 11, 12, 13, 1*14, 2*14, and 3*14.

It should be noted that in this application, the one or more candidate time domain resources are a time domain resource in a same direction as the first channel. The same direction herein means that information transmission in a same direction is controlled. Directions herein include an uplink direction and a downlink direction. The uplink direction is a direction of sending from the terminal device to the network device, and the downlink direction is a direction of sending from the network device to the terminal device.

If the first channel is a downlink channel, the one or more candidate time domain resources are a downlink symbol and/or a downlink slot. For example, it may be understood that the $1^{st}$ symbol in the last time unit in a time sequence in the one or more time units is the $1^{st}$ downlink symbol in the last time unit in a time sequence in the one or more time units.

If the first channel is an uplink channel, the one or more candidate time domain resources are an uplink symbol and/or an uplink slot. It may be understood that the $1^{st}$ symbol in an earliest time unit in a time sequence in the one or more time units is the P t uplink symbol in the earliest time unit in the time sequence in the one or more time units.

Optionally, the first channel is an uplink channel, and the network device demodulates and decodes the first channel by using a last received reference signal before the first channel. Optionally, the first channel is a downlink channel, and the terminal device demodulates and decodes the first channel by using a last received reference signal before the first channel. It may be understood that the received reference signal herein is a reference signal indicated by the first indication information.

Optionally, the first channel is a downlink channel. If no reference signal is received on the $(E3)^{th}$ symbol before the start symbol of the time domain resource on which the first channel is located, no reference signal is received on a symbol in the time domain resource on which the first channel is located, and/or no reference signal is received before the $(E4)^{th}$ symbol after the end symbol of the time domain resource on which the first channel is located, the terminal device does not demodulate the first channel. Herein, E3 and E4 are non-negative integers, and values of E3 and E4 are greater than or equal to 0. Optionally, the values of E3 and E4 are less than or equal to a first threshold value, and the first threshold value may be one of 14, 28, 42, and 56, or may be another value. This is not limited in this application. Further, a decoding result that is of the first channel and that is fed back by the terminal device to the network device is a NACK.

Optionally, in some implementations of this application, a bit state value and/or a quantity of bits corresponding to the first indication information is/are further determined. The network device or the terminal device may determine the first indication information based on the bit state value corresponding to the first indication information. The following describes in detail the bit state value and/or the quantity of bits of the first indication information:

The quantity of bits of the first indication information may be a positive integer greater than or equal to 1, for example, 1, 2, 3, 4, 5, and 6. The quantity of bits of the first indication information may be determined in at least one of the following manners: determining the quantity of bits by using the one or more candidate time domain resources, predefining the quantity of bits, and configuring the quantity of bits by using higher layer signaling. The one or more candidate time domain resources are determined in the manner described in step S101. Details are not described herein.

Optionally, the quantity of bits of the first indication information is related to a quantity of candidate time domain resources for transmitting a reference signal. Specifically, the terminal device or the network device may determine the quantity of bits of the first indication information based on the quantity of candidate time domain resources of reference signal. A specific implementation may be any one of the following implementations F1 to F4.

In the implementation F1, there are ceiling(log 2(1+Z1)) bits of the first indication information. Herein, ceiling means rounding up, and Z1 is the quantity of candidate time domain resources of reference signal. It may be understood that 1 represents that information indicated by the first indication information further includes information about the time domain resource of the second reference signal or represents information about a time domain resource no which no reference signal exists. Therefore, in this case, the information indicated by the first indication information is one of 1+Z1 pieces of information. Correspondingly, there are ceiling(log 2(1+Z1)) bits of the first indication information. Therefore, a relatively small quantity of bits are used, so that the quantity of bits occupied by the first indication information can be reduced. Z1 is a positive integer greater than or equal to 1. For example, Z1 may be one of 1, 2, 3, 4, 5, 6, 7, 8, and 9. Z1 is predefined, configured by using higher layer signaling, determined based on a symbol configuration set, or determined based on a symbol configuration subset. This is not limited herein.

Optionally, if 2 to a power of n is greater than 1+Z1, there is one or more reserved (reserved) values, where n is the quantity of bits of the first indication information.

In a specific implementation, the one or more candidate time domain resources may be predefined. For example, the quantity of candidate time domain resources of reference signal is 3. Table 10 is used as an example. The first indication information may represent one piece of information in Table 10. Information corresponding to a bit state value 00 is a time domain resource on which no reference signal exists in the one or more time units or the time domain resource of the second reference signal. Information corresponding to a bit state value 01 is a time domain resource 1 of the first reference signal, and for example, may be the $1^{st}$ symbol in an earliest time unit in a time sequence in a plurality of time units. Information corresponding to a bit state value 10 is a time domain resource 2 of the first reference signal, and for example, may be the last symbol in the last time unit in a time sequence in a plurality of time units. Information corresponding to a bit state value 11 is a time domain resource 3 of the first reference signal; in other words, the last symbol in each of the one or more time units. Table 11 shows another example correspondence between a bit state value of the first indication information and information indicated by the first indication information. In Table 11, information corresponding to a bit state value 11 is a time domain resource on which no reference signal exists in the one or more time units or the time domain resource of the second reference signal. It may be understood that the time domain resource of the second reference signal is a time domain resource corresponding to a reference signal in Table 1 to Table 5. Further, if the information indicated by the first indication information is the resource of the second reference signal, it may be understood that the reference signal is not shared in this case. In other words, the time domain resource of the reference signal is determined in a manner in the prior art.

It may be understood that the correspondence between a bit state value of the first indication information and information indicated by the first indication information in Table 10 and Table 11 may be another correspondence, and the information indicated by the first indication information may be another value. This is not limited herein.

TABLE 10

| Bit state value of first indication information | Information indicated by first indication information |
| --- | --- |
| 00 | Time domain resource on which no reference signal exists in one or more time units or a time domain resource of a second reference signal |
| 01 | Time domain resource 1 of a first reference signal |
| 10 | Time domain resource 2 of a first reference signal |
| 11 | Time domain resource 3 of a first reference signal |

TABLE 11

| Bit state value of first indication information | Information indicated by first indication information |
| --- | --- |
| 00 | Time domain resource 1 of a first reference signal |
| 01 | Time domain resource 2 of a first reference signal |
| 10 | Time domain resource 3 of a first reference signal |
| 11 | Time domain resource on which no reference signal exists in one or more time units or a time domain resource of a second reference signal |

In a specific implementation, the one or more candidate time domain resources may be predefined and/or configured by using higher layer signaling. For example, the quantity of candidate time domain resources of reference signal is 2. Table 12 is used as an example. The first indication information may represent one piece of information in Table 12. Information corresponding to a bit state value 00 is a time domain resource on which no reference signal exists in the one or more time units or the time domain resource of the second reference signal. Information corresponding to a bit state value 01 is a time domain resource 1 of the first reference signal, and for example, may be the $(X1)^{th}$ symbol in a plurality of time units or in each time unit. Information corresponding to a bit state value 10 is a time domain resource 2 of the first reference signal, and for example, may be the $(X2)^{th}$ symbol in a plurality of time units or in each time unit. Information corresponding to a bit state value 11 is a reserved value.

In an example, the $(X1)^{th}$ symbol may be counted starting from a symbol 0 in a slot (slot). When X1=1, 01 corresponds to the symbol 0. In another example, the $(X1)^{th}$ symbol may alternatively be the $(X1)^{th}$ symbol in the $Z^{th}$ effective symbol configuration. For example, Z=2, and the $(X1)^{th}$ symbol may be the $(X1)^{th}$ symbol in the $2^{nd}$ effective symbol configuration. As shown in FIG. 6, the $(X1)^{th}$ symbol is the $(X1)^{th}$ symbol in a PDSCH 4. When X1=1, 01 corresponds to the symbol 10. In still another example, for uplink transmission, the $(X1)^{th}$ symbol may be counted starting from the $1^{st}$ symbol of each frequency hopping transmission.

It may be understood that the correspondence between a bit state value of the first indication information and information indicated by the first indication information in Table 12 may be another correspondence, and the information indicated by the first indication information may be another value. This is not limited herein.

TABLE 12

| Bit state value of first indication information | Information indicated by first indication information |
| --- | --- |
| 00 | Time domain resource on which no reference signal exists in one or more time units or a time domain resource of a second reference signal |
| 01 | Time domain resource 1 of a first reference signal |
| 10 | Time domain resource 2 of a first reference signal |
| 11 | Reserved value |

Figure 10:
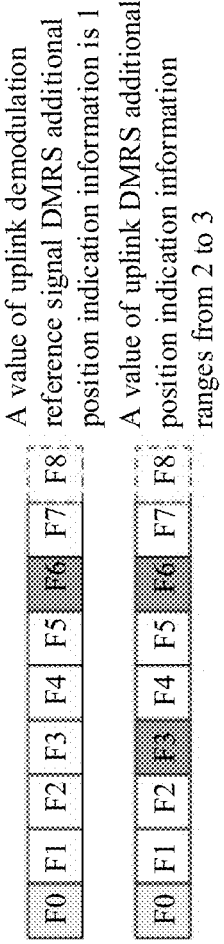
FIG. 10 is a schematic diagram of an example time domain resource of a second reference signal.

In a specific implementation, the one or more candidate time domain resources may be determined based on the first channel. It may be understood that the one or more candidate time domain resources may be determined based on the time domain resource of the second reference signal, and the one or more candidate time domain resources are a symbol in the time domain resource of the second reference signal. For example, that additional DMRS position indication information A is used to indicate the one or more candidate time domain resources on the first channel is predefined or configured by using higher layer signaling. For example, A=3. As shown in FIG. 10, if a quantity of symbols of the first channel is 8 and a PUSCH mapping type B is used, according to Table 1, time domain resources of the second reference signal are F0, F3 and F6, and candidate time domain resources of reference signal are F0, F3 and F6, and respectively correspond to the $1^{st}$ symbol, the $4^{th}$ symbol, and the $7^{th}$ symbol that are currently scheduled. The time domain resource of the first reference signal is one of F0, F3 and F6. The correspondence between a bit state value of the first indication information and information indicated by the first indication information is shown in Table 13.

Table 13 is used as an example, the quantity of candidate time domain resources of reference signal is 3, and the first indication information may represent one piece of information in Table 13. Information corresponding to a bit state value 00 is a time domain resource on which no reference signal exists in the one or more time units or the time domain resource of the second reference signal. Information corresponding to a bit state value 01 is a time domain resource 1 of the first reference signal, for example, may be F0 (corresponding to the currently scheduled P t symbol). Information corresponding to a bit state value 10 is a time domain resource 2 of the first reference signal, for example, may be F3 (corresponding to the currently scheduled $4^{th}$ symbol). Information corresponding to a bit state value 11 is a time domain resource 3 of the first reference signal, for example, may be F6 (corresponding to the currently scheduled $7^{th}$ symbol).

It may be understood that the correspondence between a bit state value of the first indication information and information indicated by the first indication information in Table 13 may be another correspondence, and the information indicated by the first indication information may be another value. This is not limited herein.

TABLE 13

| Bit state value of first indication information | Information indicated by first indication information |
| --- | --- |
| 00 | Time domain resource on which no reference signal exists in one or more time units or a time domain resource of a second reference signal |
| 01 | Time domain resource 1 of a first reference signal (F0) |
| 10 | Time domain resource 2 of a first reference signal (F3) |
| 11 | Time domain resource 3 of a first reference signal (F6) |

In the implementation F2, there are ceiling(log 2(2+Z1)) bits of the first indication information. Herein, ceiling means rounding up, and Z1 is the quantity of candidate time domain resources of reference signal. It may be understood that 2 represents information about the time domain resource of the second reference signal and information indicating a time domain resource on which no reference signal exists. Therefore, the first indication information may be used to indicate one of 2+Z1 pieces of information, and there are ceiling(log 2(2+Z1)) bits of the first indication information. Therefore, a relatively small quantity of bits are used, so that the quantity of bits occupied by the first indication information can be reduced.

In comparison with the implementation F1, in this implementation, one bit state is added. To be specific, the information indicated by the first indication information further includes two types of information: the time domain resource of the second reference signal and a time domain resource on which no reference signal exists in the one or more time units. For example, in Table 14, information corresponding to a bit state value 00 is the time domain resource on which no reference signal exists in the one or more time units, and information corresponding to a bit state value 11 is the time domain resource of the second reference signal. For the correspondence between another bit state value and information indicated by the first indication information; and the one or more candidate time domain resources, refer to the implementation F1. Details are not described herein.

In a specific implementation, the one or more candidate time domain resources may be predefined and/or configured by using higher layer signaling. A difference between Table 14 and Table 10 to Table 13 lies in that a bit state value 00 is used to represent the time domain resource on which no reference signal exists in the one or more time units, and a bit state value 11 is used to represent the time domain resource of the second reference signal. It may be understood that the correspondence between a bit state value of the first indication information and information indicated by the first indication information in Table 14 may be another correspondence, and the information indicated by the first indication information may be another value. This is not limited herein.

TABLE 14

| Bit state value of first indication information | Information indicated by first indication information |
| --- | --- |
| 00 | Time domain resource on which no reference signal exists in one or more time units |
| 01 | Time domain resource 1 of a first reference signal |
| 10 | Time domain resource 2 of a first reference signal |
| 11 | Time domain resource of a second reference signal |

Optionally, if 2 to a power of n is greater than 2+Z1, there is one or more reserved values, where n is the quantity of bits of the first indication information. As shown in Table 15, the quantity of candidate time domain resources of reference signal is 4, and the first indication information may represent one piece of information in Table 15. In comparison with Table 14, two reserved values are added in Table 15. To be specific, bit state values 101 and 110 respectively represent the two reserved values.

TABLE 15

| Bit state value of first indication information | Information indicated by first indication information |
| --- | --- |
| 000 | Time domain resource on which no reference signal exists in one or more time units |
| 001 | Time domain resource 1 of a first reference signal |
| 010 | Time domain resource 2 of a first reference signal |
| 011 | Time domain resource 3 of a first reference signal |
| 100 | Time domain resource 4 of a first reference signal |
| 101 | Reserved value |
| 110 | Reserved value |
| 111 | Time domain resource of a second reference signal |

For another example, as shown in Table 16, the quantity of candidate time domain resources of reference signal is 6. A difference between Table 16 and Table 15 lies in that the time domain resource of the first reference signal may be predefined and/or configured by using higher layer signaling in Table 16. For example, information corresponding to a bit state value 001 is a time domain resource 1 of the first reference signal. The time domain resource 1 of the first reference signal is configured by using higher layer signaling. For another example, time domain resources 2 to 6 of the first reference signal are predefined. For example, the time domain resource 1 of the first reference signal is the $2^{nd}$ symbol or the $3^{rd}$ symbol configured by using higher layer signaling, and the time domain resources 2 to 6 of the first reference signal may be the $1^{st}$ symbol after the end symbol of the time domain resource of the first channel, or the $Y^{th}$ symbol in a time unit.

TABLE 16

| Bit state value of first indication information | Information indicated by first indication information |
| --- | --- |
| 000 | Time domain resource on which no reference signal exists in one or more time units |

TABLE 16-continued

| Bit state value of first indication information | Information indicated by first indication information |
|---|---|
| 001 | Time domain resource 1 of a first reference signal |
| 010 | Time domain resource 2 of a first reference signal |
| 011 | Time domain resource 3 of a first reference signal |
| 100 | Time domain resource 4 of a first reference signal |
| 101 | Time domain resource 5 of a first reference signal |
| 110 | Time domain resource 6 of a first reference signal |
| 111 | Time domain resource of a second reference signal |

In the implementation F3, there are 1+Z1 bits of the first indication information. Z1 is the quantity of candidate time domain resources of reference signal. It may be understood that 1 represents that the information indicated by the first indication information further includes information about the time domain resource of the second reference signal or represents information indicating a time domain resource on which no reference signal exists. Therefore, in this case, 1+Z1 pieces of information need to be indicated by the first indication information, so that there are 1+Z1 bits of the first indication information. There is a one-to-one correspondence between bits of the first indication information and 1+Z1 pieces of information. The implementation F3 is relatively flexible. The network device may simultaneously notify candidate time domain resources of a plurality of reference signals by using the first indication information. When the terminal device is in a high-speed moving scenario or needs to transmit a high-reliability service, the network device may notify the candidate time domain resources of the plurality of reference signals by using the first indication information, so that the terminal device sends the plurality of reference signals in uplink transmission to increase channel estimation accuracy of the network device, and the network device sends the plurality of reference signals in downlink transmission to increase channel estimation accuracy of the terminal device, thereby increasing a system transmission success rate.

For example, Z1=2. As shown in Table 17, it may be understood that there are 3 bits of the first indication information. Herein, 1 bit corresponds to a time domain resource on which no reference signal exists in the one or more time units or the time domain resource of the second reference signal, and the remaining 2 bits respectively correspond to the time domain resource 1 of the first reference signal and the time domain resource 2 of the first reference signal. It may be understood that when the first indication information indicates both the time domain resource of the first reference signal and the time domain resource of the second reference signal, the network device or the terminal device may send only one of the reference signals, may send both of the reference signals, or may send neither of the reference signals. In Table 17, sending both of the reference signals is used as an example.

TABLE 17

| Bit state value of first indication information | Information indicated by first indication information |
|---|---|
| 000 | Time domain resource on which no reference signal exists in one or more time units |
| 001 | Time domain resource of a second reference signal |
| 010 | Time domain resource 1 of a first reference signal |
| 011 | Time domain resource 1 of a first reference signal and a time domain resource of a second reference signal |

TABLE 17-continued

| Bit state value of first indication information | Information indicated by first indication information |
|---|---|
| 100 | Time domain resource 2 of a first reference signal |
| 101 | Time domain resource 2 of a first reference signal and a time domain resource of a second reference signal |
| 110 | Time domain resource 1 of a first reference signal and a time domain resource 2 of the first reference signal |
| 111 | Time domain resource 1 of a first reference signal, a time domain resource 2 of the first reference signal, and a time domain resource of a second reference signal |

In the implementation F4, there are Z1 bits of the first indication information, or there may be ceiling(log 2(Z1)) bits. When there are ceiling(log 2(Z1)) bits of the first indication information, for example, Z1=4, a case is shown in Table 18. A difference from the foregoing implementations lies in that the information indicated by the first indication information herein is only the time domain resource of the first reference signal. When there are Z1 bits of the first indication information, for example, Z1=2, a case is shown in Table 19. The correspondence between a bit state value of the first indication information and information indicated by the first indication information may be another correspondence. This is not limited herein.

TABLE 18

| Bit state value of first indication information | Information indicated by first indication information |
|---|---|
| 00 | Time domain resource 1 of a first reference signal |
| 01 | Time domain resource 2 of a first reference signal |
| 10 | Time domain resource 3 of a first reference signal |
| 11 | Time domain resource 4 of a first reference signal |

TABLE 19

| Bit state value of first indication information | Information indicated by first indication information |
|---|---|
| 00 | Time domain resource on which no reference signal exists in one or more time units |
| 01 | Time domain resource 1 of a first reference signal |
| 10 | Time domain resource 2 of a first reference signal |
| 11 | Time domain resource 1 of a first reference signal and a time domain resource 2 of the first reference signal |

Optionally, the quantity of bits of the first indication information is related to a quantity of symbol configuration subsets. Specifically, the terminal device or the network device may determine the quantity of bits of the first indication information based on the quantity of symbol configuration subsets. A specific implementation may be one of the following implementations F5 to F8.

In the implementation F5, there are ceiling(log 2(1+Z2)) bits of the first indication information. Z2 is the quantity of symbol configuration subsets. It may be understood that 1 represents that the information indicated by the first indication information includes information about the time domain resource of the second reference signal or represents information indicating a time domain resource on which no reference signal exists. In a specific implementation, the one or more candidate time domain resources are one or more of the following symbols in one or more symbol configuration subsets. For details, refer to S203. Details are not described herein. The symbol configuration subset may be determined in the manner in the foregoing steps, and details are not described herein.

For example, the quantity of symbol configuration subsets is 3. Table 20 is used as an example, and the first indication information may represent one piece of information in Table 20. Information corresponding to a bit state value 00 is a time domain resource on which no reference signal exists in the one or more time units or the time domain resource of the second reference signal. Information corresponding to a bit state value 01 is a time domain resource 1 of the first reference signal. For example, the time domain resource 1 of the first reference signal corresponds to a first symbol configuration set subset, for example, may be the $1^{st}$ symbol in a first symbol configuration subset. Information corresponding to a bit state value 10 is a time domain resource 2 of the first reference signal. For example, the time domain resource 2 of the first reference signal corresponds to a second symbol configuration set subset, for example, may be the $1^{st}$ symbol in a second symbol configuration subset. Information corresponding to a bit state value 11 is a time domain resource 3 of the first reference signal. For example, the time domain resource 3 of the first reference signal corresponds to a third symbol configuration set subset, for example, may be the $1^{st}$ symbol in a third symbol configuration subset. The time domain resource of the second reference signal is the same as that described in the foregoing manner. Details are not described herein. Table 21 shows another example correspondence between a bit state value of the first indication information and information indicated by the first indication information. In Table 21, information corresponding to a bit state value 11 is a time domain resource on which no reference signal exists in the one or more time units or the time domain resource of the second reference signal. It may be understood that a correspondence between a bit state value of the first indication information and information indicated by the first indication information in Table 20 and Table 21 may be other correspondence. This is not limited herein. The bit state value of the first indication information may correspond to another symbol in the first symbol configuration subset. This is not limited herein.

TABLE 20

| Bit state value of first indication information | Information indicated by first indication information |
|---|---|
| 00 | Time domain resource on which no reference signal exists in the one or more time units or a time domain resource of a second reference signal |
| 01 | Time domain resource 1 of a first reference signal (corresponding to the first symbol configuration subset) |
| 10 | Time domain resource 2 of a first reference signal (corresponding to the second symbol configuration subset) |
| 11 | Time domain resource 3 of a first reference signal (corresponding to the third symbol configuration subset) |

TABLE 21

| Bit state value of first indication information | Information indicated by first indication information |
|---|---|
| 00 | Time domain resource 1 of a first reference signal (corresponding to the first symbol configuration subset) |
| 01 | Time domain resource 2 of a first reference signal (corresponding to the second symbol configuration subset) |
| 10 | Time domain resource 3 of a first reference signal (corresponding to the third symbol configuration subset) |
| 11 | Time domain resource on which no reference signal exists in the one or more time units or a time domain resource of a second reference signal |

Alternatively, if 2 to a power of n is greater than 1+Z2, there is one or more reserved values, where n is the quantity of bits of the first indication information. As shown in Table 22, in comparison with Table 20 and Table 21, three bits correspond to eight states in Table 22, and herein, only five pieces of information can be indicated. Therefore, a bit state value is added, and information corresponding to the bit state value is a reserved value. Optionally, the reserved value herein may be used to indicate a time domain resource on which no reference signal exists in the one or more time units. In Table 22, information corresponding to a bit state value 000 is the time domain resource of the second reference signal. In another example, the information corresponding to the bit state value 000 may alternatively be a time domain resource on which no reference signal exists in the one or more time units. In addition, a correspondence between a bit state value of the first indication information and information indicated by the first indication information in Table 22 may be another correspondence. This is not limited herein. Optionally, in this application, an all-0 bit state or an all-1 bit state may be a time domain resource on which no reference signal exists in the one or more time units or the time domain resource of the second reference signal.

TABLE 22

| Bit state value of first indication information | Information indicated by first indication information |
|---|---|
| 000 | Time domain resource of a second reference signal |
| 001 | Time domain resource 1 of a first reference signal (corresponding to the first symbol configuration subset) |
| 010 | Time domain resource 2 of a first reference signal (corresponding to the second symbol configuration subset) |
| 011 | Time domain resource 3 of a first reference signal (corresponding to the third symbol configuration subset) |
| 100 | Time domain resource 4 of a first reference signal (corresponding to a fourth symbol configuration subset) |
| 101 | Reserved value |
| 110 | Reserved value |
| 111 | Reserved value |

In the implementation F6, there are ceiling(log 2(2+Z2)) bits of the first indication information. Herein, ceiling means rounding up, and Z2 is the quantity of symbol configuration subsets. It may be understood that 2 represents that the information indicated by the first indication information includes information about the time domain resource of the second reference signal and represents information indicating a time domain resource on which no reference signal exists. Therefore, the first indication information may be used to indicate one of 2+Z2 pieces of information, and there are ceiling(log 2(2+Z2)) bits of the first indication information. Therefore, a relatively small quantity of bits are used, so that the quantity of bits occupied by the first indication information can be reduced.

In comparison with the implementation F5, in this implementation, one state is added. To be specific, the information indicated by the first indication information includes two types of information: the time domain resource of the second reference signal and the time domain resource on which no reference signal exists in the one or more time units. For example, in Table 23, information corresponding to a bit state value 000 is the time domain resource on which no reference signal exists in the one or more time units, and information corresponding to a bit state value 111 is the time domain resource of the second reference signal. For the correspondence between another bit state value and information indicated by the first indication information; and the one or more candidate time domain resources, refer to the implementation F5. Details are not described herein.

TABLE 23

| Bit state value of first indication information | Information indicated by first indication information |
|---|---|
| 000 | Time domain resource on which no reference signal exists in one or more time units |
| 001 | Time domain resource 1 of a first reference signal (corresponding to the first symbol configuration subset) |
| 010 | Time domain resource 2 of a first reference signal (corresponding to the second symbol configuration subset) |
| 011 | Time domain resource 3 of a first reference signal (corresponding to the third symbol configuration subset) |
| 100 | Time domain resource 4 of a first reference signal (corresponding to the fourth symbol configuration subset) |
| 101 | Reserved value |
| 110 | Reserved value |
| 111 | Time domain resource of a second reference signal |

In the implementation F7, there are 1+Z2 bits of the first indication information. Z2 is the quantity of symbol configuration subsets. It may be understood that 1 represents that the information indicated by the first indication information includes information about the time domain resource of the second reference signal or represents information indicating a time domain resource on which no reference signal exists. Therefore, in this case, 1+Z2 pieces of information need to be indicated by the first indication information. Therefore, there are 1+Z2 bits of the first indication information. There is a one-to-one correspondence between bits of the first indication information and 1+Z2 pieces of information. This indication implementation is flexible. The network device may simultaneously notify a plurality of symbol configuration subsets by using the first indication information. When the terminal device is in a high-speed moving scenario or needs to transmit a high-reliability service, the network device may notify the plurality of symbol configuration subsets, so that the terminal device sends a plurality of reference signals in uplink transmission to increase channel estimation accuracy of the network device, and the network device sends a plurality of reference signals in downlink transmission to increase channel estimation accuracy of the terminal device, thereby improving system transmission efficiency.

In the implementation F8, there are Z2 bits of the first indication information, or there may be ceiling(log 2(Z2)) bits. When there are ceiling(log 2(Z2)) bits of the first indication information, an example is shown in Table 24. A difference from the foregoing implementations lies in that the information indicated by the first indication information is only a symbol configuration subset. When there are Z2 bits of the first indication information, for example, Z2=2, a case is shown in Table 25. The correspondence between a bit state value of the first indication information and information indicated by the first indication information may be another correspondence. This is not limited herein.

TABLE 24

| Bit state value of first indication information | Information indicated by first indication information |
|---|---|
| 00 | Time domain resource 1 of a first reference signal (corresponding to the first symbol configuration subset) |
| 01 | Time domain resource 2 of a first reference signal (corresponding to the second symbol configuration subset) |
| 10 | Time domain resource 3 of a first reference signal (corresponding to the third symbol configuration subset) |
| 11 | Time domain resource 4 of a first reference signal (corresponding to the fourth symbol configuration subset) |

TABLE 25

| Bit state value of first indication information | Information indicated by first indication information |
|---|---|
| 00 | Time domain resource on which no reference signal exists in one or more time units |
| 01 | Time domain resource 1 of a first reference signal (corresponding to the first symbol configuration subset) |
| 10 | Time domain resource 2 of a first reference signal (corresponding to the second symbol configuration subset) |
| 11 | Time domain resource 1 of a first reference signal (corresponding to the first symbol configuration subset), and time domain resource 2 of a first reference signal (corresponding to the second symbol configuration subset) |

Optionally, the quantity of bits of the first indication information is related to a quantity of symbol configurations in the symbol configuration set. Specifically, the terminal device or the network device may determine the quantity of bits of the first indication information based on the quantity of symbol configurations in the symbol configuration set. A specific implementation may be one of the following implementations F9 to F12.

In the implementation F9, there are ceiling(log 2(1+Z3)) bits of the first indication information. Z3 is the quantity of symbol configurations in the symbol configuration set. It may be understood that 1 represents that the information indicated by the first indication information includes information about the time domain resource of the second reference signal or represents information indicating a time domain resource on which no reference signal exists. Therefore, in this case, the first indication information is used to indicate one of 1+Z3 pieces of information, and correspondingly, there are ceiling(log 2(1+Z3)) bits of the first indication information. Therefore, a relatively small quantity of bits are used, so that the quantity of bits occupied by the first indication information can be reduced.

In a specific implementation, the one or more candidate time domain resources may be one or more of the following symbols in the symbol configuration set: the $1^{st}$ symbol in an earliest symbol configuration in the symbol configuration set; the last symbol in a last symbol configuration in the symbol configuration set; the last symbol in the earliest symbol configuration in the symbol configuration set; the $1^{st}$ symbol in the last symbol configuration in the symbol configuration set; the $1^{st}$ symbol in each symbol configuration in the symbol configuration set; and the last symbol in each symbol configuration in the symbol configuration set. The earliest symbol configuration may be a symbol configuration with a smallest symbol configuration index number, a symbol configuration with a largest symbol configuration index number, a symbol configuration corresponding to an earliest start symbol, or a symbol configuration corresponding to an earliest end symbol. The last symbol configuration may be a symbol configuration with a smallest symbol configuration index number, a symbol configuration with a largest symbol configuration index number, a symbol configuration corresponding to a latest start symbol, or a symbol configuration corresponding to a latest end symbol.

For example, the quantity of symbol configurations in the symbol configuration set is 3. Table 26 is used as an example. The first indication information may represent one piece of information in Table 26. Information corresponding to a bit state value 00 is a time domain resource on which no reference signal exists in the one or more time units or the time domain resource of the second reference signal. Information corresponding to a bit state value 01 is a time domain resource 1 of the first reference signal, for example, may be the $1^{st}$ symbol configuration. Information corresponding to a bit state value 10 is a time domain resource 2 of the first reference signal, and for example, may be the $2^{nd}$ symbol configuration. Information corresponding to a bit state value 11 is a time domain resource 3 of the first reference signal, and for example, may be the $3^{rd}$ symbol configuration. Table 27 shows another example correspondence between a bit state value of the first indication information and information indicated by the first indication information. In Table 27, information corresponding to a bit state value 11 is the time domain resource of the second reference signal. The time domain resource of the second reference signal is the same as that described in the foregoing manner. Details are not described herein. It may be understood that a correspondence between a bit state value of the first indication information and information indicated by the first indication information in Table 26 and Table 27 may be another correspondence. This is not limited herein.

TABLE 26

| Bit state value of first indication information | Information indicated by first indication information |
| --- | --- |
| 00 | Time domain resource on which no reference signal exists in one or more time units or a time domain resource of a second reference signal |
| 01 | Time domain resource 1 of a first reference signal (corresponding to the $1^{st}$ symbol configuration) |
| 10 | Time domain resource 2 of a first reference signal (corresponding to the $2^{nd}$ symbol configuration) |

TABLE 26-continued

| Bit state value of first indication information | Information indicated by first indication information |
| --- | --- |
| 11 | Time domain resource 3 of a first reference signal (corresponding to the $3^{rd}$ symbol configuration) |

TABLE 27

| Bit state value of first indication information | Information indicated by first indication information |
| --- | --- |
| 00 | Time domain resource 1 of a first reference signal (corresponding to the $1^{st}$ symbol configuration) |
| 01 | Time domain resource 2 of a first reference signal (corresponding to the $2^{nd}$ symbol configuration) |
| 10 | Time domain resource 3 of a first reference signal (corresponding to the $3^{rd}$ symbol configuration) |
| 11 | Time domain resource of a second reference signal |

Alternatively, if 2 to a power of n is greater than 1+Z3, there is one or more reserved values, where n is the quantity of bits of the first indication information. An example is shown in Table 28. A difference from Table 26 and Table 27 lies in that because 3 bits correspond to eight states in Table 28 and only five pieces of information can be indicated herein, bit state values 101, 110, and 111 are added, and correspond to reserved values. Optionally, the reserved value may be used to indicate a time domain resource on which no reference signal exists in the one or more time units. Certainly, other information may alternatively be indicated.

TABLE 28

| Bit state value of first indication information | Information indicated by first indication information |
| --- | --- |
| 000 | Time resource of a second reference signal |
| 001 | Time resource 1 of a first reference signal (corresponding to the $1^{st}$ symbol configuration) |
| 010 | Time resource 2 of a first reference signal (corresponding to the $2^{nd}$ symbol configuration) |
| 011 | Time resource 3 of a first reference signal (corresponding to the $3^{rd}$ symbol configuration) |
| 100 | Time resource 4 of a first reference signal (corresponding to the $4^{th}$ symbol configuration) |
| 101 | Reserved value |
| 110 | Reserved value |
| 111 | Reserved value |

In the implementation F10, there are ceiling(log 2(2+Z3)) bits of the first indication information. Z3 is the quantity of symbol configurations in the symbol configuration set. It may be understood that 2 represents that the information indicated by the first indication information includes information about the time domain resource of the second reference signal and represents information indicating a time domain resource on which no reference signal exists. Therefore, the first indication information may be used to indicate one of 2+Z3 pieces of information, and there are ceiling(log 2(2+Z3)) bits of the first indication information. Therefore, a relatively small quantity of bits are used, so that the quantity of bits occupied by the first indication information can be reduced.

In comparison with the implementation F9, in this implementation, one state is added. To be specific, the information indicated by the first indication information includes two types of information: the time domain resource of the second reference signal and the time domain resource on which no reference signal exists in the one or more time units. For example, in Table 29, information corresponding to a bit state value 00 is the time domain resource on which no reference signal exists in the one or more time units, and information corresponding to a bit state value 11 is the time domain resource of the second reference signal. For a correspondence between another bit state value and information indicated by the first indication information; and the one or more candidate time domain resources, refer to the implementation F9. Details are not described herein.

TABLE 29

| Bit state value of first indication information | Information indicated by first indication information |
| --- | --- |
| 00 | Time domain resource on which no reference signal exists in one or more time units |
| 01 | Time domain resource 1 of a first reference signal (corresponding to the $1^{st}$ symbol configuration) |
| 10 | Time domain resource 2 of a first reference signal (corresponding to the $2^{nd}$ symbol configuration) |
| 11 | Time domain resource of a second reference signal |

Optionally, if 2 to a power of n is greater than 2+Z3, there is one or more reserved values, and n is the quantity of bits of the first indication information. As shown in Table 30, the quantity of symbol configurations is 4, and the first indication information may represent one piece of information in Table 30. In comparison with Table 29, two reserved values are added in Table To be specific, bit state values 101 and 110 respectively represent the two reserved values.

TABLE 30

| Bit state value of first indication information | Information indicated by first indication information |
| --- | --- |
| 000 | Time domain resource on which no reference signal exists in one or more time units |
| 001 | Time domain resource 1 of a first reference signal (corresponding to the $1^{st}$ symbol configuration) |
| 010 | Time domain resource 2 of a first reference signal (corresponding to the $2^{nd}$ symbol configuration) |
| 011 | Time domain resource 3 of a first reference signal (corresponding to the $3^{rd}$ symbol configuration) |
| 100 | Time domain resource 4 of a first reference signal (corresponding to the $4^{th}$ symbol configuration) |
| 101 | Reserved value |
| 110 | Reserved value |
| 111 | Time domain resource of a second reference signal |

In the implementation F11, there are 1+Z3 bits of the first indication information. Z3 is the quantity of symbol configurations in the symbol configuration set. It may be understood that 1 represents that the information indicated by the first indication information includes information about the time domain resource of the second reference signal or represents information indicating a time domain resource on which no reference signal exists. Therefore, in this case, 1+Z3 pieces of information need to be indicated by the first indication information. Therefore, there are 1+Z3 bits of the first indication information. The bits of the first indication information are in a one-to-one correspondence with the 1+Z3 pieces of information. This indication manner is flexible. The network device may simultaneously notify time domain resources of a plurality of reference signals by using the first indication information. When the terminal device is in a high-speed moving scenario or needs to transmit a high-reliability service, the network device may notify the time domain resources of the plurality of reference signals by using the first indication information, so that the terminal device sends the plurality of reference signals in uplink transmission to increase channel estimation accuracy of the network device, and the network device sends the plurality of reference signals in downlink transmission to increase channel estimation accuracy of the terminal device, thereby improving a system transmission efficiency.

In the implementation F12, there are Z3 bits of the first indication information, or there may be ceiling(log 2(Z3)) bits. When there are ceiling(log 2(Z3)) bits of the first indication information, an example is shown in Table 31. A difference from the foregoing implementations is that the information indicated by the first indication information herein is only a symbol configuration in the symbol configuration set. When there are Z3 bits of the first indication information, for example, Z3=2, an example is shown in Table 32. The correspondence between a bit state value of the first indication information and information indicated by the first indication information may be another correspondence. This is not limited herein.

TABLE 31

| Bit state value of first indication information | Information indicated by first indication information |
| --- | --- |
| 00 | Time domain resource 1 of a first reference signal (corresponding to the $1^{st}$ symbol configuration) |
| 01 | Time domain resource 2 of a first reference signal (corresponding to the $2^{nd}$ symbol configuration) |
| 10 | Time domain resource 3 of a first reference signal (corresponding to the $3^{rd}$ symbol configuration) |
| 11 | Time domain resource 4 of a first reference signal (corresponding to the $4^{th}$ symbol configuration) |

TABLE 32

| Bit state value of first indication information | Information indicated by first indication information |
| --- | --- |
| 00 | Time domain resource on which no reference signal exists in one or more time units |
| 01 | Time domain resource 1 of a first reference signal (corresponding to the $1^{st}$ symbol configuration) |
| 10 | Time domain resource 2 of a first reference signal (corresponding to the $2^{nd}$ symbol configuration) |
| 11 | Time domain resource 1 of a first reference signal (corresponding to the $1^{st}$ symbol configuration) and time domain resource 2 of the first reference signal (corresponding to the $2^{nd}$ symbol configuration) |

In some implementations of this application, the bit state value corresponding to the first indication information is further related to a time sequence of the time domain resource of the first reference signal in the one or more candidate time domain resources.

In a possible implementation, the time sequence may be in ascending order of time. Specifically, time domain resources in the one or more candidate time domain resources may be sorted in ascending order of time. The ascending order of time may be understood as first-to-last order. The sorted candidate time domain resources of reference signal respectively correspond to bit state values of the bits of the first indication information. Specifically, a bit state value corresponding to an earlier time domain resource is smaller than a bit state value corresponding to a later time domain resource.

For example, in Table 12, that the time domain resource 1 of the first reference signal is earlier than the time domain resource 2 of the first reference signal may be understood as that a start moment of the time domain resource 1 of the first reference signal is earlier than that of the time domain resource 2 of the first reference signal. Similarly, the time domain resource 2 of the first reference signal is earlier than the time domain resource 3 of the first reference signal. Based on the time sequence of the time domain resources of the reference signal, the information corresponding to the bit state value 01 is the time domain resource 1 of the first reference signal, the information corresponding to the bit state value 10 is the time domain resource 2 of the first reference signal, and the information corresponding to the bit state value 11 is the time domain resource 3 of the first reference signal.

In another possible implementation, the time sequence may be in descending order of time. Specifically, time domain resources in the one or more candidate time domain resources may be sorted in descending order of time. The descending order of time may be understood as last-to-first order. The sorted candidate time domain resources of reference signal respectively correspond to bit state values of the bits of the first indication information. Specifically, a bit state value corresponding to a later time domain resource is smaller than a bit state value corresponding to an earlier time domain resource.

Optionally, when the first indication information is used to indicate the time domain resource of the first reference signal, the bit state value corresponding to the first indication information is related to a time sequence of a symbol configuration in which the time domain resource of the first reference signal is located. For details, refer to the case in which the bit state value corresponding to the first indication information is related to the time sequence of the time domain resource of the first reference signal in the one or more candidate time domain resources. Details are not described.

In some implementations of this application, the bit state value corresponding to the first indication information is further related to an index of the time domain resource of the first reference signal in a symbol configuration subset or an index of a symbol configuration in which the time domain resource of the first reference signal is located.

Optionally, when the first indication information is used to indicate the time domain resource of the first reference signal, the bit state value corresponding to the first indication information is related to the index of the time domain resource of the first reference signal in the symbol configuration subset.

Optionally, when the first indication information is used to indicate the time domain resource of the first reference signal, the bit state value corresponding to the first indication information is related to the index of the symbol configuration in which the time domain resource of the first reference signal is located.

Specifically, the bit state value corresponding to the first indication information is related to an index number of a symbol configuration subset, in which the time domain resource of the first reference signal is located, in the symbol configuration set.

In a possible implementation, bit state values that are in ascending order correspond to index numbers that are in ascending order. Specifically, symbol configuration subsets in the symbol configuration set may be sorted in ascending order of index numbers. The sorted symbol configuration subsets respectively correspond to bit state values of the bits of the first indication information. Specifically, a bit state value corresponding to a symbol configuration subset with a smaller index number is smaller than a bit state value corresponding to a symbol configuration subset with a larger index number.

In another possible implementation, bit state values that are in ascending order correspond to index numbers that are in descending order. Specifically, symbol configuration subsets in the symbol configuration set may be sorted in descending order of index numbers. The sorted symbol configuration subsets respectively correspond to bit state values of the bits of the first indication information. Specifically, a bit state value corresponding to a symbol configuration subset with a larger index number is smaller than a bit state value corresponding to a symbol configuration subset with a smaller index number.

Optionally, when the first indication information is used to indicate the time domain resource of the second reference signal, the bit state value corresponding to the first indication information is predefined or configured by using higher layer signaling.

Specifically, the bit state value is predefined as an all-0 state value or an all-1 bit state value.

Optionally, when the first indication information is used to indicate that there is no reference signal in the one or more time units, the bit state value corresponding to the first indication information is predefined or configured by using higher layer signaling.

Specifically, the bit state value is predefined as an all-0 state value or an all-1 bit state value. Alternatively, a default value or a reserved value in the bit state value may indicate that there is no reference signal in the one or more time units.

It may be understood that when the first indication information includes two bit state values, and the two bit state values respectively correspond to that there is no reference signal in the one or more time units and the time domain resource of the second reference signal, the two bit state values have different values. For example, that there is no reference signal in the one or more time units corresponds to the all-0 state value, and the time domain resource of the second reference signal corresponds to the all-1 state value. For example, that there is no reference signal in the one or more time units corresponds to the all-1 state value, and the time domain resource of the second reference signal corresponds to the all-0 state value.

The one or more candidate time domain resources in this embodiment may be configured by using higher layer signaling, may be predefined, or may be determined based on the symbol configuration set. For a specific description of each implementation, refer to related content of other embodiments of this application, for example, the embodiment shown in FIG. 3. Details are not described herein.

The method in the embodiments of this application is described in detail above, and an apparatus in the embodiments of this application is provided below.

Figure 11:
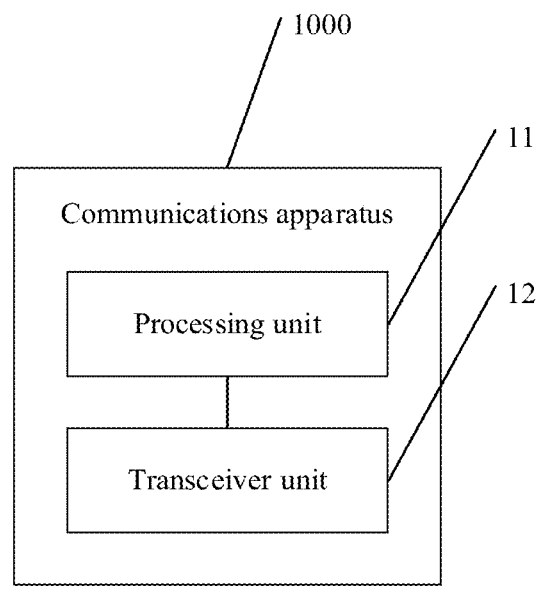
FIG. 11 is a schematic structural diagram of a communications apparatus according to an embodiment of this application.

Based on a same concept of the communications method in the foregoing embodiments, as shown in FIG. 11, an embodiment of this application further provides a communications apparatus 1000. The communications apparatus may be applied to the communications method shown in FIG. 3. The communications apparatus 1000 may be the terminal device 200 shown in FIG. 1, or may be a component (for example, a chip) applied to the terminal device 200.

The communications apparatus 1000 includes a processing unit 11 and a transceiver unit 12.

The processing unit 11 is configured to obtain one or more candidate time domain resources for transmitting a reference signal in one or more time units.

The transceiver unit 12 is configured to receive downlink control information. The downlink control information includes first indication information and transmission information of a first channel, and the first indication information is used to indicate one or more pieces of the following information:

- a time domain resource of a first reference signal, where the time domain resource of the first reference signal is one or more time domain resources in the one or more candidate time domain resources;
- a time domain resource of a second reference signal, where the time domain resource of the second reference signal is one or more symbols in a time domain resource on which the first channel is located; or
- a time domain resource on which no reference signal exists in the one or more time units.

In an implementation, when the one or more candidate time domain resources include a time domain resource determined based on a symbol configuration set in the one or more time units:

- the processing unit 11 is further configured to divide the symbol configuration set into one or more symbol configuration subsets; and
- the processing unit 11 is further configured to determine the one or more candidate time domain resources based on the one or more symbol configuration subsets.

In another implementation, the transceiver unit 12 is configured to receive first configuration information. The first configuration information is used to configure a network device to support transmission of the reference signal on the one or more candidate time domain resources.

For more detailed descriptions of the processing unit 11 and the transceiver unit 12, directly refer to related descriptions of the terminal device in the method embodiment shown in FIG. 3. Details are not described herein.

Figure 12:
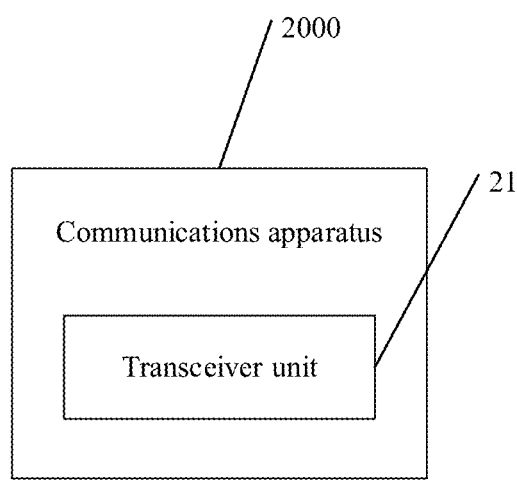
FIG. 12 is a schematic structural diagram of another communications apparatus according to an embodiment of this application.

Based on a same concept of the communications method in the foregoing embodiments, as shown in FIG. 12, an embodiment of this application further provides a communications apparatus 2000. The communications apparatus may be applied to the communications method shown in FIG. 3. The communications apparatus 2000 may be the network device 100 shown in FIG. 1, or may be a component (for example, a chip) applied to the network device 100. The communication apparatus 2000 includes a transceiver unit 21.

The transceiver unit 21 is configured to send downlink control information. The downlink control information includes first indication information and transmission information of a first channel, and the first indication information is used to indicate one or more pieces of the following information:

- a time domain resource of a first reference signal, where the time domain resource of the first reference signal is one or more time domain resources in the one or more candidate time domain resources;
- a time domain resource of a second reference signal, where the time domain resource of the second reference signal is one or more symbols in a time domain resource on which the first channel is located; or
- a time domain resource on which no reference signal exists in one or more time units.

The transceiver unit 21 is further configured to transmit the reference signal based on the first indication information.

In an implementation, the transceiver unit 21 is further configured to send first configuration information. The first configuration information is used to configure the network device to support transmission of the reference signal on the one or more candidate time domain resources.

For more detailed descriptions of the transceiver unit 21, directly refer to related descriptions of the network device in the method embodiment shown in FIG. 3. Details are not described herein.

Figure 13:
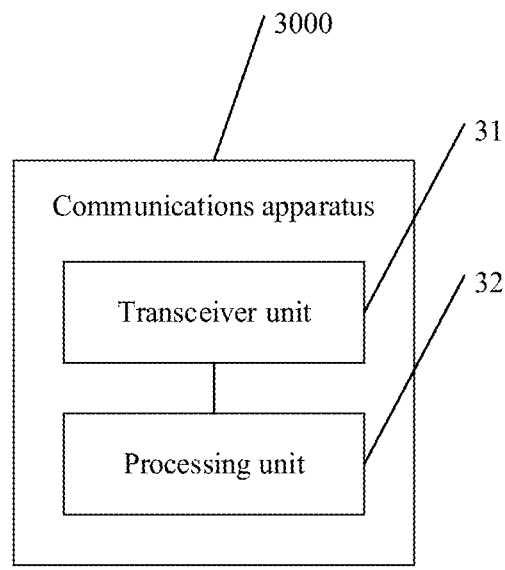
FIG. 13 is a schematic structural diagram of still another communications apparatus according to an embodiment of this application.

Based on a same concept of the communications method in the foregoing embodiments, as shown in FIG. 13, an embodiment of this application further provides a communications apparatus 3000. The communications apparatus may be applied to the communications method shown in FIG. 5. The communications apparatus 3000 may be the terminal device 200 shown in FIG. 1, or may be a component (for example, a chip) applied to the terminal device 200. The communications apparatus 3000 includes a transceiver unit 31 and a processing unit 32.

The transceiver unit 31 is configured to obtain information about one or more time units.

The processing unit 32 is configured to determine a symbol configuration set in the one or more time units based on the information about the one or more time units.

The processing unit 32 is further configured to determine one or more candidate time domain resources for transmitting a reference signal based on the symbol configuration set in the one or more time units.

The transceiver unit 31 is further configured to receive downlink control information.

The transceiver unit 31 is further configured to transmit a first channel and a reference signal based on the downlink control information.

In an implementation, the processing unit 32 is further configured to: divide the symbol configuration set into one or more symbol configuration subsets; and determine the one or more candidate time domain resources based on the one or more symbol configuration subsets.

For more detailed descriptions of the transceiver unit 31 and the processing unit 32, directly refer to related descriptions of the terminal device in the method embodiment shown in FIG. 5. Details are not described herein.

Figure 14:
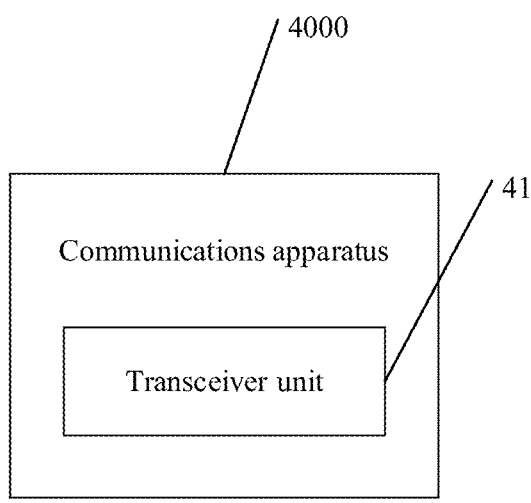
FIG. 14 is a schematic structural diagram of still another communications apparatus according to an embodiment of this application.

Based on a same concept of the communications method in the foregoing embodiments, as shown in FIG. 14, an embodiment of this application further provides a communications apparatus 4000. The communications apparatus may be applied to the communications method shown in FIG. 5. The communications apparatus 4000 may be the network device 100 shown in FIG. 1, or may be a component (for example, a chip) applied to the network device 100. The communications apparatus 4000 includes a transceiver unit 41.

The transceiver unit 41 is configured to send downlink control information.

The transceiver unit 41 is further configured to transmit a first channel and a reference signal based on the downlink control information.

For more detailed descriptions of the transceiver unit 41, directly refer to related descriptions of the network device in the method embodiment shown in FIG. 5. Details are not described herein.

Figure 15:
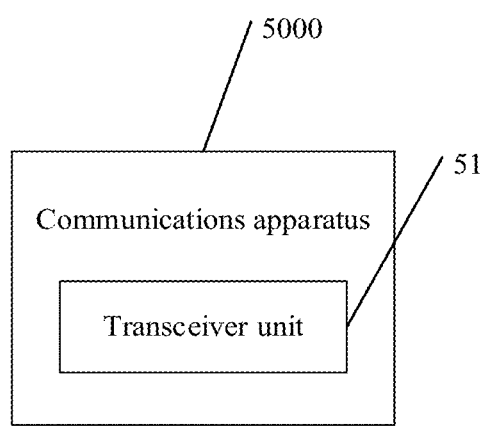
FIG. 15 is a schematic structural diagram of still another communications apparatus according to an embodiment of this application.

Based on a same concept of the communications method in the foregoing embodiments, as shown in FIG. 15, an embodiment of this application further provides a communications apparatus 5000. The communications apparatus may be applied to the communications method shown in FIG. 8. The communications apparatus 5000 may be the terminal device 200 shown in FIG. 1, or may be a component (for example, a chip) applied to the terminal device 200. The communications apparatus 5000 includes a transceiver unit 51.

The transceiver unit 51 is configured to receive first information. The first information is used to indicate the terminal device to transmit N first channels. N is an integer greater than or equal to 2.

The transceiver unit 51 is further configured to transmit a reference signal based on a second channel. The second channel is the $X^{th}$ first channel in the N first channels in time domain order in a time unit. X is an integer greater than or equal to 1, and X is less than or equal to N.

In an implementation, the transceiver unit 51 is further configured to send capability information to a network device. The capability information is used to indicate that the terminal device has a capability of transmitting the reference signal on some of the N first channels.

In another implementation, the transceiver unit 51 is further configured to receive second information. The second information is used to indicate that some of the N first channels are available to the terminal device to transmit the reference signal.

In still another implementation, the transceiver unit 51 is further configured to receive third information. The third information is used to some of the N first channels are not available to the terminal to transmit the reference signal.

For more detailed descriptions of the transceiver unit 51, directly refer to related descriptions of the terminal device in the method embodiment shown in FIG. 8. Details are not described herein.

Figure 16:
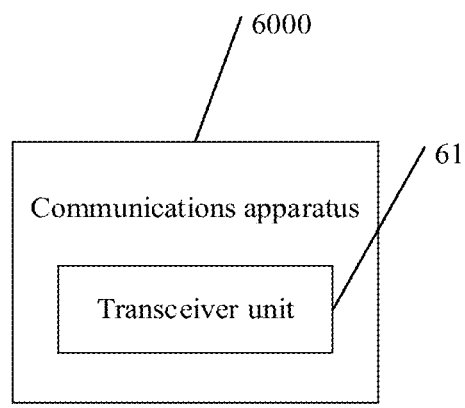
FIG. 16 is a schematic structural diagram of still another communications apparatus according to an embodiment of this application.

Based on a same concept of the communications method in the foregoing embodiments, as shown in FIG. 16, an embodiment of this application further provides a communications apparatus 6000. The communications apparatus may be applied to the communications method shown in FIG. 8. The communications apparatus 6000 may be the network device 100 shown in FIG. 1, or may be a component (for example, a chip) applied to the network device 100. The communications apparatus 6000 includes a transceiver unit 61.

The transceiver unit 61 is configured to send first information. The first information is used to indicate a terminal device to transmit N first channels. N is an integer greater than or equal to 2.

The transceiver unit 61 is further configured to transmit a reference signal based on a second channel. The second channel is the $X^{th}$ first channel in the N first channels in time domain order in a time unit. X is an integer greater than or equal to 1, and X is less than or equal to N.

In an implementation, the transceiver unit 61 is further configured to receive capability information from the terminal device. The capability information is used to indicate that the terminal device has a capability of transmitting the reference signal on some of the N first channels.

In another implementation, the transceiver unit 61 is further configured to send second information. The second information is used to indicate that some of the N first channels are available to the terminal device to transmit the reference signal.

In still another implementation, the transceiver unit 61 is further configured to send third information. The third information is used to indicate that some of the N first channels are not available to the terminal to transmit the reference signal.

For more detailed descriptions of the transceiver unit 61, directly refer to related descriptions of the network device in the method embodiment shown in FIG. 8. Details are not described herein.

Figure 17:
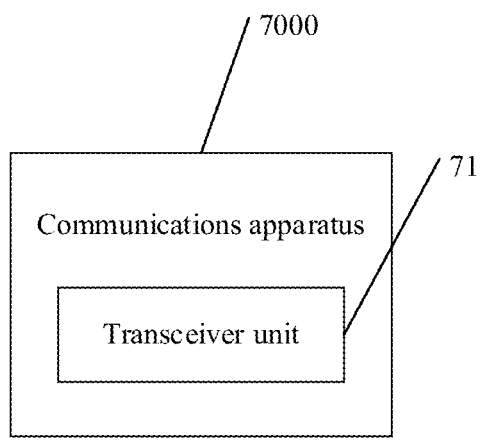
FIG. 17 is a schematic structural diagram of still another communications apparatus according to an embodiment of this application.

Based on a same concept of the communications method in the foregoing embodiments, as shown in FIG. 17, an embodiment of this application further provides a communications apparatus 7000. The communications apparatus may be applied to the communications method shown in FIG. 9. The communications apparatus 7000 may be the terminal device 200 shown in FIG. 1, or may be a component (for example, a chip) applied to the terminal device 200. The communications apparatus 7000 includes a transceiver unit 71.

The transceiver unit 71 is configured to obtain one or more candidate time domain resources for transmitting a reference signal in one or more time units.

The transceiver unit 71 is further configured to receive downlink control information. The downlink control information includes first indication information.

The first indication information is used to indicate one or more pieces of the following information:
  a time domain resource of a first reference signal, where the time domain resource of the first reference signal is one or more time domain resources in the one or more candidate time domain resources;
  a time domain resource of a second reference signal, where the time domain resource of the second reference signal is one or more symbols in a time domain resource on which a first channel is located; or
  a time domain resource on which no reference signal exists in the one or more time units.

The transceiver unit 71 is further configured to transmit a reference signal based on the downlink control information.

For more detailed descriptions of the transceiver unit 71, directly refer to related descriptions of the terminal device in the method embodiment shown in FIG. 9. Details are not described herein.

Figure 18:
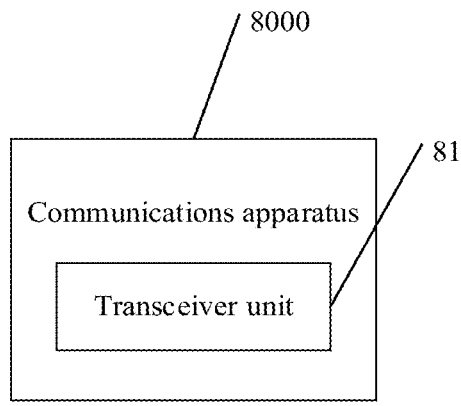
FIG. 18 is a schematic structural diagram of still another communications apparatus according to an embodiment of this application.

Based on a same concept of the communications method in the foregoing embodiments, as shown in FIG. 18, an embodiment of this application further provides a communications apparatus 8000. The communications apparatus may be applied to the communications method shown in FIG. 9. The communications apparatus 8000 may be the network device 100 shown in FIG. 1, or may be a component (for example, a chip) applied to the network device 100. The communications apparatus 8000 includes a transceiver unit 81.

The transceiver unit 81 is further configured to send downlink control information. The downlink control information includes first indication information.

The first indication information is used to indicate one or more pieces of the following information:
  a time domain resource of a first reference signal, where the time domain resource of the first reference signal is one or more time domain resources in the one or more candidate time domain resources;
  a time domain resource of a second reference signal, where the time domain resource of the second reference signal is one or more symbols in a time domain resource on which a first channel is located; or
  a time domain resource on which no reference signal exists in one or more time units.

The transceiver unit 81 is further configured to transmit the reference signal based on the downlink control information.

For more detailed descriptions of the transceiver unit 81, directly refer to related descriptions of the network device in the method embodiment shown in FIG. 9. Details are not described herein.

An embodiment of this application further provides a communications apparatus. The communications apparatus is configured to perform the foregoing communications methods. Some or all of the foregoing communications methods may be implemented by hardware or software.

Optionally, the communications apparatus may be a chip or an integrated circuit in a specific implementation.

Optionally, when some or all of the communications methods in the foregoing embodiments are implemented by software, the communications apparatus includes: a memory, configured to store a program; and a processor, configured to execute the program stored in the memory. When the program is executed, the communications apparatus can implement the communications methods provided in the foregoing embodiments.

Optionally, the memory may be a physically separate unit, or may be integrated with the processor.

Optionally, when some or all of the communications methods in the foregoing embodiments are implemented by software, the communication apparatus may alternatively include only the processor. The memory configured to store the program is located outside the communications apparatus, and the processor is connected to the memory through a circuit/wire, to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), general array logic (GAL), or any combination thereof.

The memory may include a volatile memory, for example, a random access memory (RAM). The memory may further include a nonvolatile memory (nonvolatile memory), for example, a flash memory, a hard disk drive (HDD), or a solid-state drive (SSD). The memory may further include a combination of the foregoing types of memories.

Figure 19:
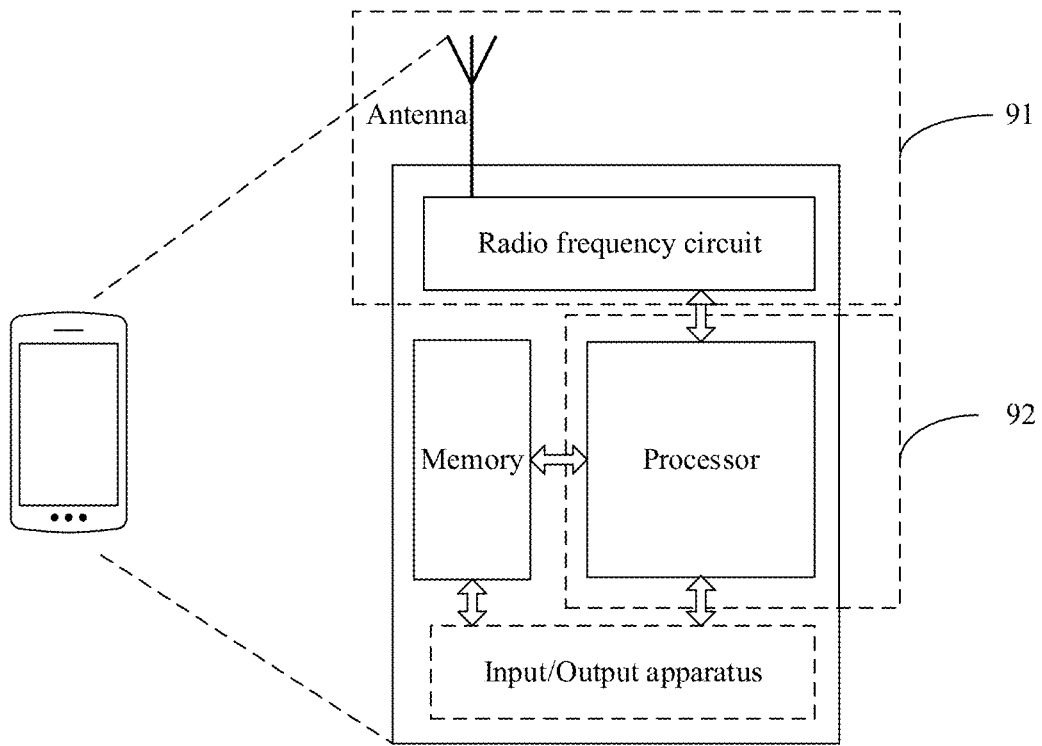
FIG. 19 is a schematic structural diagram of still another communications apparatus according to an embodiment of this application.

FIG. 19 is a schematic structural diagram of a simplified terminal device. To facilitate understanding and illustration, in FIG. 19, that the terminal device is a mobile phone is used as an example. As shown in FIG. 19, in an embodiment, the terminal device may include a processor. The processor is configured to implement the method performed by the terminal device in the foregoing embodiments.

The processor is mainly configured to: process a communications protocol and communications data, control the terminal device, execute a software program, process data of the software program, and the like. The terminal device may further include a memory, and the memory is mainly configured to store the software program and data. The terminal device may further include any one of a radio frequency circuit, an antenna, and an input/output apparatus. The radio frequency circuit is mainly configured to: convert a baseband signal and a radio frequency signal, and process the radio frequency signal. The antenna is mainly configured to receive and send a radio frequency signal in a form of an electromagnetic wave. The input/output apparatus, for example, a touchscreen, a display, and a keyboard, is mainly configured to: receive data entered by a user, and output data to the user. It should be noted that some types of terminal devices may not have the input/output apparatus.

In another embodiment, the terminal device includes a processor and a transceiver apparatus. The processor is coupled to the transceiver apparatus. The processor is configured to execute a computer program or instruction, to control the transceiver apparatus to receive and send information. When the processor executes the computer program or instruction, the processor is further configured to implement the method performed by the terminal device in the foregoing embodiments.

In this embodiment of this application, the antenna having a receiving/sending function and the radio frequency circuit may be considered as a receiving unit and a sending unit (which may also be collectively referred to as a transceiver unit) of the terminal device. The processor having a processing function may be considered as a processing unit of the terminal device. As shown in FIG. 19, the terminal device includes a transceiver unit 91 and a processing unit 92. The transceiver unit 91 may also be referred to as a receiver/transmitter, a receiver/transmitter circuit, or the like. The processing unit 92 may also be referred to as a processor, a processing board, a processing module, a processing apparatus, or the like.

For example, in an embodiment, the processing unit 92 is configured to perform step S101 in the embodiment shown in FIG. 3; and the transceiver unit 91 is configured to perform functions of the terminal device in steps S102 and S103 in the embodiment shown in FIG. 3. In another example, in another embodiment, the processing unit 92 is configured to perform steps S201 to S203 in the embodiment shown in FIG. 5; and the transceiver unit 91 is configured to perform functions of the terminal device in steps S204 and S205 in the embodiment shown in FIG. 5.

In another example, in still another embodiment, the transceiver unit 91 is configured to perform functions of the terminal device in step S301 in the embodiment shown in FIG. 8; and the processing unit 92 is configured to perform step S302 in the embodiment shown in FIG. 8.

In another example, in still another embodiment, the processing unit 92 is configured to perform step S401 in the embodiment shown in FIG. 9; and the transceiver unit 91 is configured to perform functions of the terminal device in step S402 in the embodiment shown in FIG. 9. In still another embodiment, the terminal device includes a processor and a memory. The memory stores a computer program or instruction. When the processor executes the computer program or instruction, the processor is configured to implement the method performed by the terminal device in the foregoing embodiments.

When data needs to be sent, the processor performs baseband processing on the to-be-sent data, and then outputs a baseband signal to the radio frequency circuit, and the radio frequency circuit performs radio frequency processing on the baseband signal, and then sends a radio frequency signal outwards in a form of an electromagnetic wave through the antenna. When data is to be sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of illustration, FIG. 19 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

In an embodiment, a communications apparatus is provided, including a processor and a transceiver apparatus. The processor is coupled to the transceiver apparatus, and the processor is configured to execute a computer program or instruction, to control the transceiver apparatus to receive and send information. When the processor executes the computer program or instruction, the processor is further configured to implement the method performed by the network device in the foregoing method embodiments.

Figure 20:
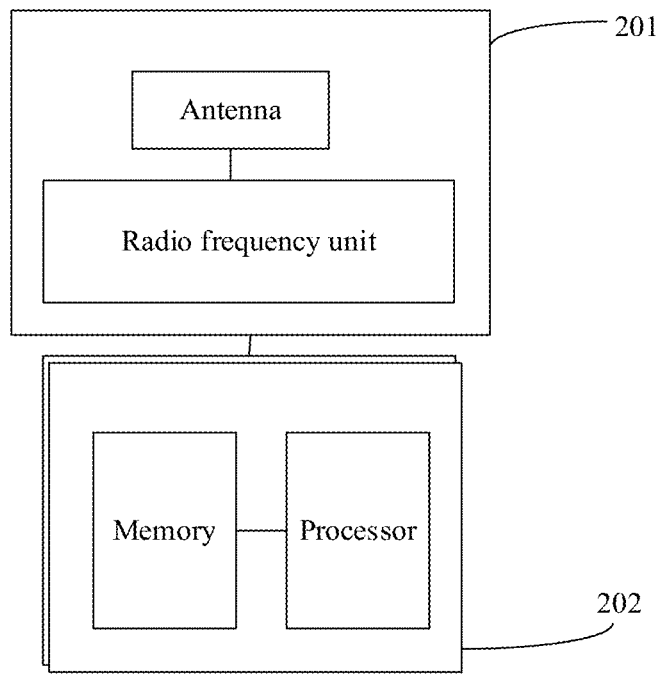
FIG. 20 is a schematic structural diagram of still another communications apparatus according to an embodiment of this application.

FIG. 20 is a schematic structural diagram of a simplified network device. The network device includes a radio frequency signal receiving, sending, and conversion part and a part 202. The radio frequency signal receiving, sending, and conversion part further includes a transceiver unit 201. The radio frequency signal receiving, sending, and conversion part is mainly configured to: receive and send a radio frequency signal, and convert a radio frequency signal and a baseband signal. The part 202 is mainly configured to: perform baseband processing, control the network device, and the like. The transceiver unit 201 may also be referred to as a receiver/transmitter, a receiver/transmitter circuit, or the like. The part 202 is usually a control center of the network device, and may be usually referred to as a processing unit, configured to control the network device to perform steps performed by the network device in FIG. 3, FIG. 5, FIG. 8, or FIG. 9. For details, refer to descriptions of the foregoing related part.

For example, in an embodiment, the transceiver unit 201 is configured to perform functions of the network device in steps S102 and S103 in the embodiment shown in FIG. 3. In another example, in another embodiment, the transceiver unit 201 is configured to perform functions of the network device in steps S204 and S205 in the embodiment shown in FIG.

In another example, in still another embodiment, the transceiver unit 201 is configured to perform functions of the network device in step S301 in the embodiment shown in FIG. 8.

In another example, in still another embodiment, the transceiver unit 201 is configured to perform functions of the network device in steps S402 and S403 in the embodiment shown in FIG. 9.

In another embodiment, a communications apparatus is provided, including a processor. The processor is configured to implement the method performed by the network device in the foregoing method embodiments.

In still another embodiment, a communications apparatus is provided, including a processor and a memory. The memory stores a computer program or instruction. When the processor executes the computer program or instruction, the processor is configured to implement the method performed by the network device in the foregoing method embodiments.

As shown in FIG. 20, the part 202 may include one or more boards, and each board may include one or more processors and one or more memories. The processor is configured to read and execute a program in the memory, to implement a baseband processing function and control the network device. If there are a plurality of boards, the boards can be interconnected to improve a processing capability. In an optional implementation, the plurality of boards may share one or more processors, or the plurality of boards share one or more memories, or the plurality of boards simultaneously share one or more processors.

An embodiment of this application further provides a computer-readable storage medium. The computer-readable storage medium stores a computer program or instruction. When the computer program or instruction is executed, the methods in the foregoing embodiments are implemented.

An embodiment of this application further provides a communications system, including the terminal device and the network device in the foregoing embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again. In addition, mutual reference may be made to the method embodiments and the apparatus embodiments, and mutual reference may be made to same or corresponding content in different embodiments. Details are not described.

In the several embodiments provided in this application, it should be understood that the disclosed system, apparatus, and method may be implemented in other manners. For example, division into units is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer-readable storage medium, or transmitted by using the computer-readable storage medium. The computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The available media may be a read-only memory (ROM), a random access memory (RAM), a magnetic medium, for example, a floppy disk, a hard disk, a magnetic tape, a disk, or an optical medium, for example, a digital versatile disc (DVD), or a semiconductor medium, for example, a solid-state drive (SSD).

What is claimed is:

1. A communications apparatus, comprising a processor, wherein the processor is coupled to a memory, and configured to execute instructions stored in the memory, to enable the apparatus to implement the following:
   obtaining one or more candidate time domain resources for transmitting a reference signal in one or more time units; and
   receiving downlink control information, wherein the downlink control information comprises first indication information and transmission information of a first channel, and the first indication information is used to indicate one or more pieces of the following information:
   a time domain resource of a first reference signal, wherein the time domain resource of the first reference signal is one or more time domain resources in the one or more candidate time domain resources;
   a time domain resource of a second reference signal, wherein the time domain resource of the second reference signal is one or more symbols in a time domain resource on which the first channel is located; and
   a time domain resource on which no reference signal exists in the one or more time units;
   wherein the one or more candidate time domain resources comprise a time domain resource determined based on a symbol configuration set in the one or more time units;
   wherein the symbol configuration set is a subset or a universal set of a symbol configuration list, wherein each symbol configuration in the symbol configuration list includes index information of a start symbol, information about a quantity of consecutive symbols, and information about a slot offset value corresponding to a time domain resource occupied by an uplink channel or a downlink channel, or each symbol configuration in the symbol configuration list includes information about a slot offset value and a start and length indicator value corresponding to a time domain resource occupied by the uplink channel or the downlink channel, wherein the symbol configuration set is divided into one or more symbol configuration subsets, and the one or more candidate time domain resources are determined based on the one or more symbol configuration subsets; and
   wherein the first indication information indicates only a symbol configuration set; and wherein the apparatus is further enabled to implement:
      selecting one or more of the candidate time domain resources corresponding to the first and/or the second reference signal and checking whether uplink or downlink configuration of the selected one or more of the candidate time domain resources is consistent with the corresponding reference signal.

2. The apparatus according to claim 1, wherein when the one or more candidate time domain resources comprise a time domain resource determined based on a symbol configuration set in the one or more time units, wherein the memory further comprises instructions that, when executed by the processor, cause the apparatus to:
   divide the symbol configuration set into one or more symbol configuration subsets; and
   determine the one or more candidate time domain resources based on the one or more symbol configuration subsets.

3. The apparatus according to claim 1, wherein the memory further comprises instructions that, when executed by the processor, cause the apparatus to:
   receive first configuration information, wherein the first configuration information is used to configure a terminal device to support transmission of the reference signal on the one or more candidate time domain resources.

4. The apparatus according to claim 1, wherein the memory further comprises instructions that, when executed by the processor, cause the apparatus to:
   receive second configuration information, wherein the second configuration information is used to configure the terminal device to support a case in which there is no reference signal on the time domain resource of the first channel.

5. The apparatus according to claim 1, wherein a quantity of bits of the first indication information is related to a quantity of candidate time domain resources for transmitting a reference signal.

6. The apparatus according to claim 1, wherein the quantity of bits of the first indication information is related to a quantity of symbol configuration subsets.

7. The apparatus according to claim 1, wherein when the first indication information is used to indicate the time domain resource of the first reference signal, a bit state value corresponding to the first indication information is related to the time domain resource of the first reference signal.

8. The apparatus according to claim 1, wherein the downlink control information further comprises at least one of a first bit state value or a second bit state value, wherein the first bit state value corresponds to the first indication information, wherein the first bit state value is used to indicate that there is no reference signal in the one or more time units, and the first bit state value is predefined;
   the second bit state value corresponds to the first indication information, wherein the second bit state value is used to indicate the time domain resource of the second reference signal, and the second bit state value is predefined.

9. The apparatus according to claim 1, wherein the one or more candidate time domain resources are one or more of the following symbols in the one or more time units:
   the $1^{st}$ symbol in the earliest time unit in the one or more time units;
   the last symbol in a last time unit of the one or more time units;
   one or more predefined symbols in the one or more time units; or
   one or more symbols configured by using higher layer signaling in the one or more time units.

10. The apparatus according to claim 1, wherein the first indication information is used to indicate the time domain resource of the first reference signal, the first indication information further comprises an offset value, and the offset value comprises one or more of the following:
    a slot offset value between a slot in which the time domain resource of the first reference signal is located and a slot in which the first channel is located;
    a symbol offset value between a start symbol of the time domain resource of the first reference signal and a start symbol of the first channel;
    a symbol offset value between a start symbol of the time domain resource of the first reference signal and an end symbol of the first channel; or a symbol offset value between an end symbol of the time domain resource of the first reference signal and an end symbol of the first channel.

11. The apparatus according to claim 1, wherein the one or more candidate time domain resources comprise the time domain resource configured by using higher layer signaling or the predefined time domain resource, the first indication information is used to indicate the time domain resource of the first reference signal, the first indication information comprises symbol information and/or slot information, the symbol information is one or more of the following: an absolute symbol index, a symbol offset index relative to the start symbol of the first channel, or a symbol offset index relative to the end symbol of the first channel, and the slot information is one or more of the following: an absolute slot index or a slot offset index relative to the slot in which the first channel is located.

12. The apparatus according to claim 11, wherein the one or more candidate time domain resources comprise a time domain resource that is of a reference signal and that is configured by using higher layer signaling, and the time domain resource comprises one or more of the following:
a time domain resource configured for a slot by using higher layer signaling;
a time domain resource configured for a downlink control information format by using higher layer signaling;
a time domain resource configured for a radio network temporary identifier (RNTI) by using higher layer signaling;
a time domain resource configured for a mapping type of the first channel by using higher layer signaling; or
a time domain resource configured for a search space of the downlink control information by using higher layer signaling; and
the one or more candidate time domain resources are one or more of the following symbols in the one or more time units: the 1$^{st}$ symbol in the earliest time unit in the one or more time units; the last symbol in the last time unit of the one or more time units; the one or more predefined symbols in the one or more time units; or the one or more symbols configured by using higher layer signaling in the one or more time units.

13. A communications apparatus, comprising a processor, wherein the processor is coupled to a memory, and configured to execute instructions stored in the memory, to enable the apparatus to implement the following:
sending downlink control information, wherein the downlink control information comprises first indication information and transmission information of a first channel, and the first indication information is used to indicate one or more pieces of the following information:
a time domain resource of a first reference signal, wherein the time domain resource of the first reference signal is one or more time domain resources in one or more candidate time domain resources of reference signal;
a time domain resource of a second reference signal, wherein the time domain resource of the second reference signal is one or more symbols in a time domain resource on which the first channel is located; or
a time domain resource on which no reference signal exists in one or more time units; and
transmitting the reference signal based on the first indication information;
wherein the one or more candidate time domain resources comprise a time domain resource determined based on a symbol configuration set in the one or more time units;
wherein the symbol configuration set is a subset or a universal set of a symbol configuration list, wherein each symbol configuration in the symbol configuration list includes index information of a start symbol, information about a quantity of consecutive symbols, and information about a slot offset value corresponding to a time domain resource occupied by an uplink channel or a downlink channel, or each symbol configuration in the symbol configuration list includes information about a slot offset value and a start and length indicator value corresponding to a time domain resource occupied by the uplink channel or the downlink channel, wherein the apparatus is enabled to further implement:
dividing the symbol configuration set into one or more symbol configuration subsets; and
determining the one or more candidate time domain resources based on the one or more symbol configuration subsets;
wherein the first indication information indicates only a symbol configuration set; and wherein the apparatus is further enabled to implement:
selecting one or more of the candidate time domain resources corresponding to the first and/or the second reference signal and checking whether uplink or downlink configuration of the selected one or more of the candidate time domain resources are consistent with the corresponding reference signal.

14. The apparatus according to claim 13, wherein the memory further comprises instructions that, when executed by the processor, cause the apparatus to: send first configuration information, wherein the first configuration information is used to configure a terminal device to support transmission of the reference signal on the one or more candidate time domain resources.

15. The apparatus according to claim 13, wherein when the one or more candidate time domain resources comprise a time domain resource determined based on a symbol configuration set in the one or more time units, the memory further comprises instructions that, when executed by the processor, cause the apparatus to: divide the symbol configuration set into one or more symbol configuration subsets; and determine the one or more candidate time domain resources based on the one or more symbol configuration subsets.

16. The apparatus according to claim 13, wherein the memory further comprises instructions that, when executed by the processor, cause the apparatus to: send second configuration information, wherein the second configuration information is used to configure the terminal device when there is no reference signal on the time domain resource of the first channel.

17. A communications method, comprising:
obtaining one or more candidate time domain resources for transmitting a reference signal in one or more time units; and
receiving downlink control information, wherein the downlink control information comprises first indication information and transmission information of a first channel, and the first indication information is used to indicate one or more pieces of the following information:
a time domain resource of a first reference signal, wherein the time domain resource of the first reference signal is one or more time domain resources in the one or more candidate time domain resources;
a time domain resource of a second reference signal, wherein the time domain resource of the second reference signal is one or more symbols in a time domain resource on which the first channel is located; or
a time domain resource on which no reference signal exists in the one or more time units;
wherein the one or more candidate time domain resources comprise a time domain resource determined based on a symbol configuration set in the one or more time units;
wherein the symbol configuration set is a subset or a universal set of a symbol configuration list, wherein each symbol configuration in the symbol configuration list includes index information of a start symbol, information about a quantity of consecutive symbols, and information about a slot offset value corresponding to a time domain resource occupied by an uplink channel or a downlink channel, or each symbol configuration in the symbol configuration list includes information about a slot offset value and a start and length indicator value corresponding to a time domain resource occupied by the uplink channel or the downlink channel, wherein the apparatus is enabled to further implement:
dividing the symbol configuration set into one or more symbol configuration subsets; and
determining the one or more candidate time domain resources based on the one or more symbol configuration subsets;

wherein the first indication information indicates only a symbol configuration set; and wherein the apparatus is further enabled to implement:
selecting one or more of the candidate time domain resources corresponding to the first and/or the second reference signal and checking whether uplink or downlink configuration of the selected one or more of the candidate time domain resources is consistent with the corresponding reference signal.

18. The method according to claim 17, wherein when the one or more candidate time domain resources comprise a time domain resource determined based on a symbol configuration set in the one or more time units, the method further comprises:
dividing the symbol configuration set into one or more symbol configuration subsets; and
determining the one or more candidate time domain resources based on the one or more symbol configuration subsets.

19. The method according to claim 17, further comprising: receiving first configuration information, wherein the first configuration information is used to configure a terminal device to support transmission of the reference signal on the one or more candidate time domain resources.

20. The method according to claim 17, further comprising: receiving second configuration information, wherein the second configuration information is used to configure the terminal device to support a case in which there is no reference signal on the time domain resource of the first channel.

* * * * *